(12) United States Patent
Chan et al.

(10) Patent No.: US 12,379,256 B2
(45) Date of Patent: Aug. 5, 2025

(54) READOUT CIRCUITS AND METHODS

(71) Applicant: Obsidian Sensors, Inc., San Diego, CA (US)

(72) Inventors: Edward Chan, San Diego, CA (US); Bing Wen, San Diego, CA (US); John Hong, San Diego, CA (US); Tallis Chang, San Diego, CA (US); Seung-Tak Ryu, Daejeon (KR)

(73) Assignee: Obsidian Sensors, Inc., San Diego, CA (US)

( * ) Notice: Subject to any disclaimer, the term of this patent is extended or adjusted under 35 U.S.C. 154(b) by 174 days.

(21) Appl. No.: 18/097,138

(22) Filed: Jan. 13, 2023

(65) Prior Publication Data

US 2023/0236067 A1     Jul. 27, 2023

Related U.S. Application Data

(63) Continuation of application No. 17/048,046, filed as application No. PCT/US2019/027982 on Apr. 17, 2019, now Pat. No. 11,555,744.

(60) Provisional application No. 62/819,376, filed on Mar. 15, 2019, provisional application No. 62/757,078, (Continued)

(51) Int. Cl.
| | |
|---|---|
| *G01J 5/24* | (2006.01) |
| *G01J 1/42* | (2006.01) |
| *G01J 1/46* | (2006.01) |
| *G01J 5/02* | (2022.01) |
| *H04N 23/23* | (2023.01) |
| *G01J 1/44* | (2006.01) |
| *G01J 5/80* | (2022.01) |

(52) U.S. Cl.
CPC .............. *G01J 5/24* (2013.01); *G01J 1/4228* (2013.01); *G01J 1/46* (2013.01); *G01J 5/024* (2013.01); *H04N 23/23* (2023.01); *G01J 2001/444* (2013.01); *G01J 5/80* (2022.01)

(58) Field of Classification Search
None
See application file for complete search history.

(56) References Cited

U.S. PATENT DOCUMENTS

| | | | |
|---|---|---|---|
| 6,188,069 B1 * | 2/2001 | Endoh | G01J 5/20 348/E5.081 |
| 10,127,940 B1 * | 11/2018 | Wessel | G11B 7/13 |
| 11,555,744 B2 | 1/2023 | Chan et al. | |

(Continued)

FOREIGN PATENT DOCUMENTS

| | | |
|---|---|---|
| CN | 105493633 A | 4/2016 |
| EP | 2015038 A1 | 1/2009 |

(Continued)

*Primary Examiner* — Marcus H Taningco
(74) *Attorney, Agent, or Firm* — Procopio, Cory, Hargreaves & Savitch LLP

(57) ABSTRACT

Methods of sensor readout and calibration and circuits for performing the methods are disclosed. In some embodiments, the methods include driving an active sensor at a voltage. In some embodiments, the methods include use of a calibration sensor, and the circuits include the calibration sensor. In some embodiments, the methods include use of a calibration current source and circuits include the calibration current source. In some embodiments, a sensor circuit includes a Sigma-Delta ADC. In some embodiments, a column of sensors is readout using first and second readout circuits during a same row time.

20 Claims, 18 Drawing Sheets

Related U.S. Application Data filed on Nov. 7, 2018, provisional application No. 62/659,048, filed on Apr. 17, 2018.

(56) References Cited

U.S. PATENT DOCUMENTS

| | | | |
|---|---|---|---|
| 2005/0040865 A1* | 2/2005 | Zafarana | H03K 5/082 |
| | | | 327/78 |
| 2006/0118729 A1* | 6/2006 | Chin | G01J 1/46 |
| | | | 348/E5.079 |
| 2010/0001173 A1* | 1/2010 | Hanson | G01W 1/08 |
| | | | 250/214 A |
| 2010/0181485 A1 | 7/2010 | Legras | |
| 2010/0193706 A1 | 8/2010 | Shen | |
| 2012/0206150 A1 | 8/2012 | Holzer | |
| 2013/0182164 A1 | 7/2013 | Duggal et al. | |
| 2014/0061472 A1 | 3/2014 | Salvestrini et al. | |
| 2017/0041564 A1* | 2/2017 | Konstantatos | H04N 25/63 |

FOREIGN PATENT DOCUMENTS

| | | |
|---|---|---|
| EP | 2469254 A1 | 6/2012 |
| JP | H10-304251 A | 11/1998 |
| JP | 2005-214639 A | 8/2005 |
| JP | 2009-145336 A | 7/2009 |
| JP | 2012-004879 A | 1/2012 |
| JP | 2012-132919 A | 7/2012 |
| JP | 2012-149964 A | 8/2012 |
| JP | 2012-525573 A | 10/2012 |
| JP | 6345370 B1 | 6/2018 |
| WO | 2015/090925 A1 | 6/2015 |

* cited by examiner

READOUT CIRCUITS AND METHODS

CROSS REFERENCE TO RELATED APPLICATIONS

This Application is a Continuation of U.S. patent application Ser. No. 17/048,046, filed Oct. 15, 2020, now patented as U.S. Pat. No. 11,555,744, issued Jan. 17, 2023, which is a national stage application under 35 U.S.C. § 371 of International Application No. PCT/US2019/027982, filed internationally on Apr. 17, 2019, which claims the benefit of U.S. Provisional Application No. 62/659,048, filed on Apr. 17, 2018, U.S. Provisional Application No. 62/757,078, filed on Nov. 7, 2018, and U.S. Provisional Application No. 62/819,376, filed on Mar. 15, 2019, the entire disclosures of which are herein incorporated by reference for all purposes.

FIELD OF THE INVENTION

This disclosure generally relates to MEMS sensors. More specifically, this disclosure relates to sensor readout circuits, calibration circuits, and methods corresponding to the circuits.

BACKGROUND OF THE INVENTION

A MEMS sensor array can convert a sensor image into a plurality of individual pixel signals. In a bolometer, for example, an array of bolometer pixels are exposed to a thermal image (e.g., a spectrum of waves in the Long Wavelength Infrared range, hereinafter "LWIR"). In response to the exposure, an impedance changes between two terminals in each bolometer pixel and the changes are then captured as signals representative of the thermal image.

SUMMARY OF THE INVENTION

MEMS sensors must contend with interference. In the bolometer example, interference can be overwhelming. Bolometer interference can manifest as large ambient interferences common to all the pixels in the array that arises from changes in the ambient condition and from self-heating of resistive elements (e.g., resistors in the circuit, the bolometer pixels themselves). These common mode changes are typically large (e.g., up to +/−50 K) compared to a minimum detectable thermal image signal on a given pixel (e.g., about 0.5 mK). In other words, bolometer noise dominates the intended signal by many orders of magnitude.

Sensor noise can affect the clarity of a sensor image. Noise in a bolometer array can include both temporal and spatially-patterned noise. Examples of noise include 1/f noise, thermal noise, and process dependent variations. When the signals in the array are read out by circuits arranged according to columns and rows, variations in the read out can lead to visible row-to-row and column-to-column stripes.

Under traditional configurations, common mode changes are undesirably outputted for measurement, reducing the dynamic range of subsequent measurement or sampling stages. Some known solutions add circuitry to reduce undesired common mode effects at measurement, but these solutions have a small environmental range of applicability and poor repeatability, require manual trimming or calibration, increase complexity, size, and cost, introduce more parasitics and unknowns, and consume more power, to name but a few disadvantages.

Examples of the disclosure are directed toward MEMS sensor readout circuits and methods that overcome the herein-identified drawbacks. In some embodiments, sensor readout circuits include a reference sensor, an active sensor, current sources, a voltage driver, and a readout element. In some embodiments, methods include providing a current to a reference sensor, generating a common mode-tracking bias voltage electrically coupled to an active sensor, and measuring a current change at a readout element.

As an exemplary advantage, the disclosed circuits and methods reduce common mode effects without the cost and complexity of additional circuitry. The circuits presented herein can efficiently and compactly track common mode changes in the sensor array. Thus, accuracy of the measured thermal image signal can be improved, and the input range requirement of subsequent analog-to-digital converters (ADC) can be reduced without additional components for compensation. By tracking common mode changes with a bias voltage, speed, and accuracy can be improved because column voltages can be nominally at fixed voltages and unaffected by column parasitic elements.

In some embodiments, a sensor readout circuit includes a readout element, a first current source, a second current source, a voltage driver, a reference sensor, and an active sensor. The readout element includes an input. The voltage driver includes an output. The reference sensor includes a first terminal and a second terminal; the first terminal is electrically coupled to the first current source and the second terminal is electrically coupled to the output of the voltage driver. The active sensor includes a first terminal and a second terminal; the first terminal is electrically coupled to the second current source and the input of the readout element and the second terminal is electrically coupled to the output of the voltage driver. The active sensor is configured for exposure to a sensor image.

In some embodiments, the first current source and the second current source are constant sources.

In some embodiments, the voltage driver generates a bias voltage for the active sensor.

In some embodiments, the active sensor is further configured to change a current from the first terminal of the active sensor to the input of the readout element when the active sensor is exposed to the sensor image.

In some embodiments, the active sensor is further configured to change an impedance of the active sensor when the active sensor is exposed to the sensor image.

In some embodiments, the reference sensor is a reference bolometer pixel and the active sensor is an active bolometer pixel.

In some embodiments, the circuit further includes a second reference sensor, a second active sensor, a first switch, a second switch, a third switch, and a fourth switch. The second reference sensor includes a first terminal and a second terminal; the first terminal is electrically coupled to the first current source and the second terminal is electrically coupled to the voltage driver. The second active sensor includes a first terminal and a second terminal; the first terminal is electrically coupled to the second current source outputting the second current and the second terminal is electrically coupled to the output of the voltage driver. The second active sensor is configured to change the current from the first terminal to the input of the readout element. The first switch is configured to selectively electrically couple the reference sensor to the first current source. The second switch is configured to selectively electrically couple the active sensor to the second source. The third switch is configured to selectively electrically couple the second reference sensor to the first current source. The fourth switch is configured to selectively electrically couple the second active sensor to the second current source.

In some embodiments, the circuit further includes a correlated double sampling (CDS) circuit that is configured to remove an offset.

In some embodiments, the voltage of the readout element is proportional to an impedance difference between the reference sensor and the active sensor.

In some embodiments, the circuit further includes an output of an op amp electrically coupled to the second terminal of the reference sensor.

In some embodiments, the circuit further includes a feedback element that is electrically coupled to the first and second terminals of the reference sensor.

In some embodiments, the circuit further includes a third reference sensor and a third current source. The third reference sensor includes a first terminal and a second terminal that is electrically coupled to the output of the voltage driver. The third current source is electrically coupled to the first terminal of the third reference sensor, and is configured to output a seventh current reflective of self-heating generated by the third reference sensor. The value of the second current adjusts in accordance with the seventh current.

In some embodiments, the circuit further includes an ADC that is configured to sample the change of the current from the first terminal to the input of the readout element.

In some embodiments, the first current source and the second current source are configured to output an equal magnitude of current in a same direction relative to the respective first terminals.

In some embodiments, the readout element includes a capacitive transimpedance amplifier (CTIA).

In some embodiments, the first current source and the second current source are selected from the group of an athermal voltage source and resistor, a high-impedance athermal transistor current source, and a Wilson current mirror.

In some embodiments, non-sensor elements of the readout circuit are designed to be substantively athermal and/or minimize the effects of self-heating.

In some embodiments, the circuit further includes an amplifier that outputs to the second terminal of the reference sensor. The first terminal of the reference sensor electrically couples to a negative input of the amplifier. The first current source is configured to generate a voltage drop across the negative input and the output.

In some embodiments, the reference sensor is a reference bolometer pixel, and the active sensor is a bolometer pixel configured to detect LWIR radiation.

In some embodiments, the readout element includes a Sigma-Delta ADC.

In some embodiments, a first stage of the Sigma-Delta ADC includes a CTIA.

In some embodiments, the reference sensor is shielded from a sensor image.

In some embodiments, the circuit further includes a voltage follower electrically coupled between the output of the voltage driver and the second terminal of the active sensor.

In some embodiments, the circuit further includes two or more current buffers, the two or more current buffers including a first current buffer electrically coupled between the first current source and the reference sensor and a second current buffer electrically coupled between the second current source and the active sensor.

In some embodiments, the circuit further includes a fifth switch configured to selectively electrically couple the active sensor to the voltage driver.

In some embodiments, a method of sensor readout includes: providing a first current to a first terminal of a reference sensor; generating, from the first current, a voltage at a second terminal of the reference sensor; providing a second current to a first terminal of an active sensor; driving, at the voltage, a second terminal of the active sensor; exposing the active sensor to a sensor image; and measuring a third current from the first terminal of the active sensor to an input of a readout element.

In some embodiments, the first current and the second current are constant.

In some embodiments, the voltage is a bias voltage for the active sensor.

In some embodiments, exposing the active sensor to the sensor image further includes changing the third current.

In some embodiments, exposing the active sensor to the sensor image further includes changing an impedance of the active sensor.

In some embodiments, the method further includes: providing a fourth current to a first terminal of a second reference sensor; generating, from the fourth current, a second voltage at a second terminal of the second reference sensor; providing a fifth current to a first terminal of a second active sensor; driving, at the second voltage, a second terminal of the second active sensor; exposing the second active sensor to the sensor image; and measuring a sixth current from the first terminal of the second active sensor to the input of a readout element.

In some embodiments, the method further includes: electrically uncoupling, from the reference sensor, a first current source providing the first current; coupling, to the second reference sensor, the first current source providing the fourth current; electrically uncoupling, from the active sensor, a second current source providing the second current; and coupling, to the second active sensor, the second current source providing the fifth current.

In some embodiments, the method further includes: determining an offset generated by the input of the readout element; and canceling the offset prior to measuring the current to the input of the readout element.

In some embodiments, a voltage at an output of the readout element is proportional to an impedance difference between the reference sensor and the active sensor.

In some embodiments, the voltage is driven by an op amp, and the first terminal of the reference sensor is electrically coupled to a negative input of the op amp.

In some embodiments, the method further includes feeding back from the second terminal of the reference sensor to the first terminal of the reference sensor.

In some embodiments, the method further includes: providing a seventh current to a first terminal of a third reference sensor, the seventh current reflective of self-heating generated by the third reference sensor; and adjusting a value of the second current in accordance with the seventh current.

In some embodiments, the method further includes sampling a voltage generated by the current to the input of a readout element.

In some embodiments, the first current and the second current are equal in magnitude and in a same direction relative to the respective first terminals of the reference sensor and active sensor.

In some embodiments, the method further includes converting the third current to a readout voltage of the readout element.

In some embodiments, providing the first current and providing the second current each includes providing at least one selected from the group of an athermal voltage source and resistor, a high-impedance athermal transistor current source, and a Wilson current mirror.

In some embodiments, driving the second terminal of the active sensor at the voltage further includes driving, from an output of a voltage driver, the second terminal of the reference sensor and the second terminal of the active sensor.

In some embodiments, the method further includes causing a voltage drop across the reference sensor from the first current; generating the voltage using an amplifier outputting to the second terminal of the reference sensor; and electrically coupling the first terminal of the reference sensor to a negative terminal of the amplifier.

In some embodiments, the reference sensor is a reference bolometer pixel and the active sensor is an active bolometer pixel.

In some embodiments, exposing the active sensor to the sensor image further includes exposing the active sensor to LWIR radiation.

In some embodiments, the readout element includes a Sigma-Delta ADC.

In some embodiments, a first stage of the Sigma-Delta ADC includes a CTIA.

In some embodiments, the method further includes exposing the reference sensor to an ambient condition common to the reference sensor and the active sensor; and shielding the reference sensor from the sensor image.

In some embodiments, driving the second terminal of the active sensor at the voltage further includes buffering between the second terminal of the active sensor and a voltage source providing the voltage.

In some embodiments, the method further includes: buffering the first current; and buffering the second current.

In some embodiments, a method of manufacturing a sensor readout circuit includes providing a readout element including an input; providing a first current source; providing a second current source; providing a voltage driver including an output; providing a reference sensor including a first terminal and a second terminal; electrically coupling the first terminal of the reference sensor to the first current source; electrically coupling the second terminal of the reference sensor to the output of the voltage driver; providing an active sensor including a first terminal and a second terminal, the active sensor configured for exposure to a sensor image; electrically coupling the first terminal of the active sensor to the second current source and the input of the readout element; and electrically coupling the second terminal of the active sensor to the output of the voltage driver.

In some embodiments, the first current and the second current sources are constant current sources.

In some embodiments, the voltage driver is configured to generate a bias voltage for the active sensor.

In some embodiments, the active sensor is further configured to change a current from the first terminal of the active sensor to the input of the readout element when the active sensor is exposed to the sensor image.

In some embodiments, the active sensor is further configured to change an impedance of the active sensor when the active sensor is exposed to the sensor image.

In some embodiments, the reference sensor is a reference bolometer pixel and the active sensor is an active bolometer pixel.

In some embodiments, the method of manufacturing further includes: providing a second reference sensor including a first terminal and a second terminal; electrically coupling the first terminal of the second reference sensor to the first current source; electrically coupling the second terminal of the second reference sensor to the voltage driver; providing a second active sensor including a first terminal and a second terminal, the second active sensor configured for exposure to the sensor image; electrically coupling the first terminal of the active sensor to the second current source; electrically coupling the second terminal of the active sensor to the output of the voltage driver, and the second active sensor is configured to change a current from the first terminal of the active sensor to the input of the readout element; and providing a first switch configured to selectively electrically couple the reference sensor to the first current source; providing a second switch configured to selectively electrically couple the active sensor to the second current source; providing a third switch configured to selectively electrically couple the second reference sensor to the first current source; and providing a fourth switch configured to selectively electrically couple the second active sensor to the second current source.

In some embodiments, the method of manufacturing further includes providing a CDS circuit configured to remove an offset.

In some embodiments, the readout element is configured to generate a voltage proportional to an impedance difference between the reference sensor and the active sensor.

In some embodiments, the method of manufacturing further includes: providing an op amp; and electrically coupling an output of an op amp to the second terminal of the reference sensor.

In some embodiments, the method of manufacturing further includes: providing a feedback element; and electrically coupling the feedback element to the first and second terminals of the reference sensor.

In some embodiments, the method of manufacturing further includes: providing a third reference sensor including a first terminal and a second terminal; electrically coupling the second terminal of the third reference sensor to the output of the voltage driver; providing a third current source configured to output a seventh current reflective of self-heating generated by the third reference sensor, and a value of the second current adjusts in accordance with the seventh current; and electrically coupling the third current source to the first terminal of the third reference sensor.

In some embodiments, the method of manufacturing further includes providing an ADC configured to sample the change of the current from the first terminal to the input of the readout element.

In some embodiments, the first current source and the second current source are configured to output an equal magnitude of current in a same direction relative to the respective first terminals.

In some embodiments, the readout element includes a CTIA.

In some embodiments, the first current source and the second current source are selected from the group of an athermal voltage source and resistor, a high-impedance athermal transistor current source, and a Wilson current mirror.

In some embodiments, the method of manufacturing further includes: providing an amplifier outputting to the second terminal of the reference sensor; and electrically coupling the first terminal of the reference sensor to a negative input of the amplifier, the first current source configured to generate a voltage drop across the negative input and the output.

In some embodiments, the reference sensor is a reference bolometer pixel and the active sensor is a bolometer pixel configured to detect LWIR radiation.

In some embodiments, the readout element includes a Sigma-Delta ADC.

In some embodiments, a first stage of the Sigma-Delta ADC includes a CTIA.

In some embodiments, the reference sensor is shielded from a sensor image.

In some embodiments, the method of manufacturing further includes: providing a voltage follower; and electrically coupling the voltage follower between the output of the voltage driver and the second terminal of the active sensor.

In some embodiments, the method of manufacturing further includes: providing two or more current buffers including a first current buffer and a second current buffer; electrically coupling the first current buffer between the first current source and the reference sensor; and electrically coupling the second current buffer between the second current source and the active sensor.

In some embodiments, the methods include measuring a voltage of the calibration sensor and computing a calibrated readout voltage based on the measured calibration sensor voltage. In some embodiments, the methods include measuring a readout voltage of a readout element electrically coupled to the calibration current source and computing an output based on the readout voltage caused by the calibration current. In some embodiments, the methods include measuring readout voltages when the shutter is closed and when the shutter is opened and computing a difference between the readout voltages.

In some instances, row-to-row pattern noises can be caused by noise in the bias voltage, which can be common for a row of sensors. Therefore, the noise of the bias voltage is observed for an entire row of sensors. In some instances, column-to-column pattern noises can be caused by mismatch and 1/f noise of skimming currents and ADC associated with specific columns of sensors.

Examples of the disclosure are directed toward MEMS sensor calibration circuits and methods that overcome the herein-identified drawbacks (e.g., pattern noises). In some embodiments, the sensor calibration circuits include a calibration sensor and a calibration readout element. In some embodiments, the sensor calibration circuits include a calibration current source. In some embodiments, a shutter is included with the sensor calibration circuits.

As an exemplary advantage, the disclosed circuits and methods remove noise at reduced costs. The circuits presented herein efficiently and compactly remove noises in the sensor array. Thus, the clarity of measured sensor images can be improved.

In some embodiments, a sensor circuit includes: a plurality of active sensors exposed to a sensor image and sharing a bias voltage node; a calibration readout element; and a calibration sensor shielded from the sensor image and including a first terminal electrically coupled to the bias voltage node and a second terminal electrically coupled to the calibration readout element.

In some embodiments, an impedance of the calibration sensor is the same as an impedance of an active sensor of the plurality of active sensors, and an electrical carrier count of the calibration sensor is greater than an electrical carrier count of the active sensor.

In some embodiments, the sensor circuit further includes: a readout element corresponding to an active sensor of the plurality of active sensors and configured to measure a readout voltage of the active sensor, the calibration readout element is configured to measure a readout voltage of the calibration sensor, and the sensor circuit is electrically coupled to: a processor; and a memory including instructions, which when executed by the processor, cause the processor to perform a method that includes: receiving the readout voltage of the active sensor; receiving the readout voltage of the calibration sensor; and computing a difference between (1) the readout voltage of the active sensor and (2) the readout voltage of the calibration sensor weighted by a ratio between an impedance of the calibration sensor and an impedance of the active sensor.

In some embodiments, the ratio is one.

In some embodiments, the ratio is temperature independent.

In some embodiments, the sensor circuit further includes: a readout element corresponding to an active sensor of the plurality of active sensors and configured to measure a readout voltage of the active sensor, the sensor circuit is electrically coupled to a processor and a memory including instructions, which when executed by the processor, cause the one or more processors to perform a method that includes: receiving a first readout voltage corresponding to a closed shutter; receiving a second readout voltage corresponding to an opened shutter; and computing a difference proportional to an impedance difference of the active sensor caused by the sensor image between (1) the first readout voltage and (2) the second readout voltage.

In some embodiments, the plurality of readout elements includes a plurality of ADCs.

In some embodiments, the calibration sensor and the plurality of active sensors are made from materials having a same thermal coefficient of resistance (TCR).

In some embodiments, the plurality of active sensors includes a plurality of columns of active sensors, the circuit further includes: a plurality of current sources, a current source of the plurality of current sources is electrically coupled to the second terminal of the calibration sensor and the calibration readout element; and a plurality of readout elements, each of the plurality of columns of active sensors is electrically coupled to: a corresponding current source of the plurality of current sources at a corresponding readout node, and a corresponding readout element of the plurality of readout elements at the corresponding readout node.

In some embodiments, the calibration readout element includes an analog-to-digital converter (ADC).

In some embodiments, the plurality of active sensors and the calibration sensor are bolometers, and the sensor image is a thermal image.

In some embodiments, a sensor circuit includes: a calibration current source providing a calibration current; an active sensor; a readout element; a first switch configured to selectively electrically couple the active sensor to the readout element; and a second switch configured to selectively electrically couple the calibration current source to the readout element.

In some embodiments, the second switch is configured to electrically uncouple the calibration current source from the first readout element when the first switch electrically couples the active sensor to the readout element, and the first switch is configured to electrically uncouple the active sensor from the first readout element when the second switch electrically couples the calibration current to the readout element, and the sensor circuit is electrically coupled to: a processor; and a memory including instructions, which when executed by the processor, cause the processor to perform a method including: receiving a first readout voltage of the active sensor; receiving a second readout voltage caused by the calibration current; and computing an output proportional to a readout current of the active sensor based on (1) the first readout voltage and (2) the second readout voltage.

In some embodiments, the sensor circuit further includes: a plurality of active sensors including the active sensor; and a plurality of readout elements including the first and second readout elements, each of the plurality of readout elements electrically coupled to a respective active sensor of the plurality of active sensors, the method further includes: receiving, from a readout element of the plurality of readout elements, a first readout voltage of the respective active sensor; receiving a second readout voltage caused by the calibration current on a respective readout element; and computing a respective output proportional to a readout current of the respective active sensor based on (1) the readout voltage of the respective sensor and (2) the second readout voltage caused by the calibration current on the respective readout element.

In some embodiments, the sensor circuit further includes a second active sensor belonging to a same column as the first active sensor, the method further includes, after computing the first output: receiving a third readout voltage of the second active sensor; and computing a second output proportional to a readout current of the fourth active sensor based on (1) the third readout voltage and (2) the second readout voltage caused by the calibration current.

In some embodiments, a time between successive receipts of the second readout voltage on the same column caused by the calibration current is a calibration period.

In some embodiments, the calibration period is one second.

In some embodiments, the calibration period is based on a drift of the readout element.

In some embodiments, different rows are readout during the successive receipts of the second readout voltage.

In some embodiments, the sensor circuit further includes: a second calibration current source; a third switch configured to selectively electrically couple the first calibration current source to the readout element; and a fourth switch configured to selectively electrically couple the second calibration current source to the readout element, and when the third switch electrically uncouples the readout element from the first calibration current source: the fourth switch is configured to electrically couple the readout element to the second calibration current source, and the method further includes receiving a third readout voltage caused by the second calibration current; and the output is further based on the third readout voltage caused by the second calibration current.

In some embodiments, the readout element includes an ADC.

In some embodiments, the sensor circuit is electrically coupled to: a processor; and a memory including instructions, which when executed by the processor, cause the one or more processors to perform a method that includes: receiving a first readout voltage corresponding to a closed shutter; receiving a second readout voltage corresponding to an opened shutter; and computing a difference proportional to an impedance difference of the first active sensor caused by a sensor image between (1) the first readout voltage and (2) the second readout voltage.

In some embodiments, the active sensor is a bolometer exposed to a thermal scene.

In some embodiments, the active sensor is exposed to a sensor image and shares a bias voltage node with a plurality of active sensors, and the sensor circuit further includes: a second readout element; and a calibration sensor shielded from the sensor image and including a first terminal electrically coupled to the bias voltage node and a second terminal electrically coupled to the second readout element.

Some embodiments include a method of manufacturing the above circuits.

In some embodiments, a method of calculating a calibrated voltage in a sensor circuit includes: electrically coupling a first terminal of a calibration sensor to a bias voltage node shared by a plurality of active sensors; electrically coupling a second terminal of the calibration sensor to a calibration readout element; exposing the plurality of active sensors to a sensor image; shielding the calibration sensor from the sensor image; measuring, with a readout element, a readout voltage of an active sensor of the plurality of active sensors; measuring, with the calibration readout element, a readout voltage of the calibration sensor; and computing the calibrated voltage as a difference between (1) the readout voltage of the active sensor and (2) the readout voltage of the calibration sensor weighted by a ratio between an impedance of the calibration sensor and an impedance of the active sensor.

In some embodiments, the impedance of the calibration sensor is the same as the impedance of the active sensor, and an electrical carrier count of the calibration sensor is greater than an electrical carrier count of the active sensor.

In some embodiments, the ratio is one.

In some embodiments, the ratio is temperature independent.

In some embodiments, the calibration sensor and the active sensor are made from materials having a same TCR.

In some embodiments, the method further includes: electrically coupling a current source of a plurality of current sources to the second terminal of the calibration sensor and to the calibration readout element; electrically coupling a column of a plurality of columns of active sensors to the readout element, the column of active sensors including the active sensor; and electrically coupling a second current source of the plurality of current sources to the readout element.

In some embodiments, the method further includes: closing a shutter; measuring, with the readout element, a first readout voltage corresponding to the closed shutter; and measuring, with the calibration readout element, a second readout voltage corresponding to the closed shutter; and after computing the calibrated voltage, computing a second difference between (1) the calibrated voltage and a difference between (2a) the first readout voltage and (2b) the second readout voltage weighted by the ratio, the second difference is a shutter calibrated voltage.

In some embodiments, the calibration readout element includes an ADC.

In some embodiments, the readout element includes an ADC.

In some embodiments, the plurality of active sensors and the calibration sensor are bolometers, and the sensor image is a thermal image.

In some embodiments, a method of calculating an output in a sensor circuit includes: electrically coupling a readout element to an active sensor; measuring, with the readout element, a first readout voltage of the active sensor; electrically uncoupling the readout element from the active sensor; electrically coupling a calibration current to the readout element; measuring, with the readout element, a second readout voltage caused by the calibration current; and computing the output based on (1) the first readout voltage and (2) the second readout voltage, the output proportional to a readout current of the active sensor.

In some embodiments, the method further includes: electrically coupling a respective active sensor of a plurality of active sensors to a readout element of a plurality of readout elements; measuring, with the respective readout element, a first readout voltage of the respective active sensor; electrically uncoupling the respective readout element from the respective active sensor; electrically coupling the calibration current to the respective readout element; measuring, with the respective readout element, a second readout voltage caused by the calibration current on the respective readout element; and computing an output proportional to a readout current of the respective active sensor based on (1) the first readout voltage of the respective active sensor and (2) the second readout voltage caused by the calibration current.

In some embodiments, the method further includes, after computing the first output: electrically uncoupling the calibration current source from the readout element; electrically coupling the readout element to a second active sensor, the second active sensor belonging to a same column as the first active sensor; measuring, with the readout element, a third readout voltage of the second active sensor; and computing a second output proportional to a readout current of the second active sensor based on (1) the third readout voltage and (2) the second readout voltage caused by the calibration current.

In some embodiments, a time between successive measurements of the second readout voltage on the same column caused by the calibration current is a calibration period.

In some embodiments, the calibration period is one second.

In some embodiments, the calibration period is based on a drift of the readout element.

In some embodiments, different rows are readout during the successive measurements of the second readout voltage.

In some embodiments, the method further includes: electrically uncoupling the readout element from the first calibration current source; electrically coupling the readout element to a second calibration current source; and measuring, with the readout element, a third readout voltage caused by the second calibration current on the readout element, the output is further based on the third readout voltage caused by the second calibration current.

In some embodiments, the readout element includes an ADC.

In some embodiments, the method further includes: closing a shutter; computing the output corresponding to a closed shutter; and computing a difference proportional to an impedance difference of the active sensor caused by a sensor image between (1) the output corresponding to an opened shutter and (2) the output corresponding to the closed shutter.

In some embodiments, the active sensor is a bolometer exposed to a thermal scene.

In some embodiments, the method further includes: electrically uncoupling the readout element from the calibration current source; electrically coupling a second readout element to the calibration current source; measuring, with the second readout element, a third readout voltage caused by the calibration current; electrically uncoupling the second readout element from the calibration current source; electrically coupling a first terminal of a calibration sensor to a bias voltage node shared by a plurality of active sensors and the active sensor; electrically coupling a second terminal of the calibration sensor to the second readout element; exposing the plurality of active sensors and the active sensor to a sensor image; shielding the calibration sensor from the sensor image; measuring, with the second readout element, a fourth readout voltage of the calibration sensor; computing a second output based on the third readout voltage and the fourth readout voltage; and computing a difference between (1) the first output and (2) the second output weighted by a ratio between an impedance of the calibration sensor and an impedance of the active sensor.

Examples of the disclosure are directed toward sensor circuits and methods that overcome the herein-identified drawbacks (e.g., power challenges, area challenges). In some embodiments, the sensor circuit includes a plurality of sensor pixels, a Sigma-Delta ADC, and a plurality of switches. In some embodiments, the sensor circuit includes columns of sensors, and different parts of a column of sensors are being read out at a same time.

In some embodiments, a sensor circuit, includes: a plurality of sensor pixels, each configured to store a charge; a Sigma-Delta ADC configured to receive the charge of each sensor; and a plurality of switches configured to sequentially couple each of the plurality of sensor pixels to the Sigma-Delta ADC, each switch corresponding to a respective one of the plurality of sensor pixels.

In some embodiments, the sensor circuit does not include a CTIA electrically positioned between the plurality of sensor pixels and the Sigma-Delta ADC.

In some embodiments, the sensor circuit further includes a variable resistor electrically positioned between the plurality of sensors and the Sigma-Delta ADC, wherein the plurality of switches are configured to sequentially couple each of the plurality of sensor pixels to the variable resistor.

In some embodiments, the variable resistor has a linearly decreasing resistance during a discharge time window; the variable resistor is at a lowest resistance at an end of the discharge time window; and the variable resistor has a resistance higher than the lowest resistance between the beginning and the end of the discharge time window.

In some embodiments, the variable resistor is a MOS transistor; and the initial resistance, the linearly decreasing resistance, and the lowest resistance of the MOS transistor are controlled with a control voltage electrically coupled to the MOS transistor.

In some embodiments, the discharge time window is between 10 microseconds and 1 millisecond.

In some embodiments, during the first discharge time window, a first switch electrically couples a first sensor pixel and the Sigma-Delta ADC; during a second discharge time window, a second switch electrically couples a second sensor pixel and the Sigma-Delta ADC; and the first and second discharge time windows correspond to readout times of the first and second sensor pixels.

In some embodiments, during the discharge time window, a constant current of the variable resistor is an initial voltage of the variable resistor divided by the initial resistance.

In some embodiments, a switch electrically couples a respective sensor pixel and the variable resistor during a respective discharge time window, the discharge time window equal to a capacitance of the sensor pixel multiplied by an initial resistance of the variable resistor.

In some embodiments, the variable resistor includes a weighted bank of resistors; the weighted bank of resistors include a plurality of resistors selectively electrically coupled in parallel or in series; and resistances of combinations of the selective electrically coupled resistors include an initial resistance at the beginning of a discharge time window, a linearly decreasing resistance, and a lowest resistance.

In some embodiments, a sensor pixel includes an x-ray sensor photodiode and the charge is indicative of the x-ray sensor photodiode's exposure to x-ray.

In some embodiments, a sensor pixel includes a storage capacitor storing the charge and the sensor pixel's exposure to x-ray generates the charge stored in the storage capacitor.

In some embodiments, the sensor circuit further includes a second plurality of sensor pixels and a second Sigma-Delta ADC, wherein the second plurality of sensor pixels are configured to sequentially couple to the second Sigma-Delta ADC and the first and second pluralities of sensor pixels belong to a same column.

In some embodiments, numbers of the first and second plurality of sensor pixels are equal.

In some embodiments, at a first row time, a first sensor pixel of the first plurality of sensor pixels and a second sensor pixel of the second plurality of sensor pixels are simultaneously readout.

In some embodiments, an input current to the Sigma-Delta ADC is constant.

In some embodiments, the sensor circuit further includes a digital filter configured to receive a signal from the Sigma-Delta ADC.

Some embodiments include a method of manufacturing the above circuits.

In some embodiments, a sensor circuit includes a plurality of sensor pixels, a Sigma-Delta ADC, and a plurality of switches, each switch corresponding to a respective one of the plurality of sensor pixels; a method of readout of the sensor circuit includes: storing respective charges in each of the plurality of sensor pixels; sequentially electrically coupling, using the plurality of switches, each of the plurality of sensor pixels to the Sigma-Delta ADC; and sequentially receiving, at the Sigma-Delta ADC, the respective charge of each sensor pixel.

In some embodiments, the sensor circuit does not include a CTIA electrically positioned between the plurality of sensor pixels and the Sigma-Delta ADC and the respective charge of each sensor pixel is not received by the CTIA.

In some embodiments, the sensor circuit further includes a variable resistor electrically positioned between the plurality of sensor pixels and the Sigma-Delta ADC and the method further includes sequentially electrically coupling, using the plurality of switches, each of the plurality of sensor pixels to the Sigma-Delta ADC further includes sequentially electrically coupling, using the plurality of switches, the each of the plurality of sensor pixels to the variable resistor.

In some embodiments, the method further includes linearly decreasing a resistance of the variable resistor during a discharge time window, wherein: the variable resistor is at a lowest resistance at an end of the discharge time window; and the variable resistor has a resistance higher than the lowest resistance between the beginning and the end of the discharge time window.

In some embodiments, the variable resistor is a MOS transistor electrically coupled to a control voltage and linearly decreasing the resistance of the variable resistor further includes driving the MOS transistor with the control voltage to generate the initial resistance, the linearly decreasing resistance, and the lowest resistance.

In some embodiments, the discharge time window is between 10 microseconds and 1 millisecond.

In some embodiments, sequentially electrically coupling, using the plurality of switches, each of the plurality of sensor pixels to the Sigma-Delta ADC further includes: during the first discharge time window, electrically coupling a first switch to a first sensor pixel and the Sigma-Delta ADC; during a second discharge time window, electrically coupling a second switch to a second sensor pixel and the Sigma-Delta ADC, wherein the first and second discharge time windows correspond to readout times of the first and second sensor pixels.

In some embodiments, during the discharge time window, a constant current of the variable resistor is an initial voltage of the variable resistor divided by the initial resistance.

In some embodiments, sequentially electrically coupling, using the plurality of switches, each of the plurality of sensor pixels to the Sigma-Delta ADC further includes electrically coupling a switch to a respective sensor pixel and the variable resistor during a respective discharge time window; and the discharge time window is equal to a capacitance of the sensor pixel multiplied by an initial resistance of the variable resistor.

In some embodiments, the variable resistor includes a weighted bank of resistors; the weighted bank of resistors include a plurality of resistors selectively electrically coupled in parallel or in series; and the method further includes linearly decreasing resistances of combinations of the plurality of resistors, from an initial resistance at a beginning of a discharge time window to a lowest resistance at an end of the discharge time window, by selective electrically coupling the resistors.

In some embodiments, a sensor pixel includes an x-ray sensor photodiode and the charge is indicative of the x-ray sensor photodiode's exposure to x-ray.

In some embodiments, storing respective charges in each of the plurality of sensor pixels further includes: exposing the each of the plurality of sensor pixels to x-ray and generating the respective charge; and storing the respective charges in a storage capacitor of the each of the plurality of sensor pixels.

In some embodiments, the sensor circuit further includes a second plurality of sensor pixels belonging to a same column as the first plurality of sensor pixels, a second plurality of switches, and a second Sigma-Delta ADC, the method further includes: sequentially electrically coupling, using the second plurality of switches, each of the plurality of sensor pixels to the second Sigma-Delta ADC; and sequentially receiving, at the second Sigma-Delta ADC, the respective charge of each sensor pixel of the second plurality of sensor pixels.

In some embodiments, numbers of the first and second plurality of sensor pixels are equal.

In some embodiments, at a first row time: the first Sigma-Delta ADC receives a first respective charge of a first sensor pixel of the first plurality of sensor pixels; and the second Sigma-Delta ADC receives a second respective charge of a second sensor pixel of the second plurality of sensor pixels.

In some embodiments, the Sigma-Delta ADC receives a constant current.

DETAILED DESCRIPTION OF EXEMPLARY EMBODIMENTS

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Examples of the disclosure are directed toward MEMS sensor readout circuits and methods that overcome the herein-identified drawbacks. In some embodiments, sensor readout circuits include a reference sensor, an active sensor, current sources, a voltage driver, and a readout element. In some embodiments, methods include providing a current to a reference sensor, generating a common mode-tracking bias voltage electrically coupled to an active sensor, and measuring a current change at a readout element.

As an exemplary advantage, the disclosed circuits and methods reduce common mode effects without the cost and complexity of additional circuitry. The circuits presented herein can efficiently and compactly track common mode changes in the sensor array. Thus, accuracy of the measured thermal image signal can be improved, and the input range requirement of subsequent analog-to-digital converters (ADC) can be reduced without additional components for compensation. By tracking common mode changes with a bias voltage, speed, and accuracy can be improved because column voltages can be nominally at fixed voltages and unaffected by column parasitic elements.

Figure 1:
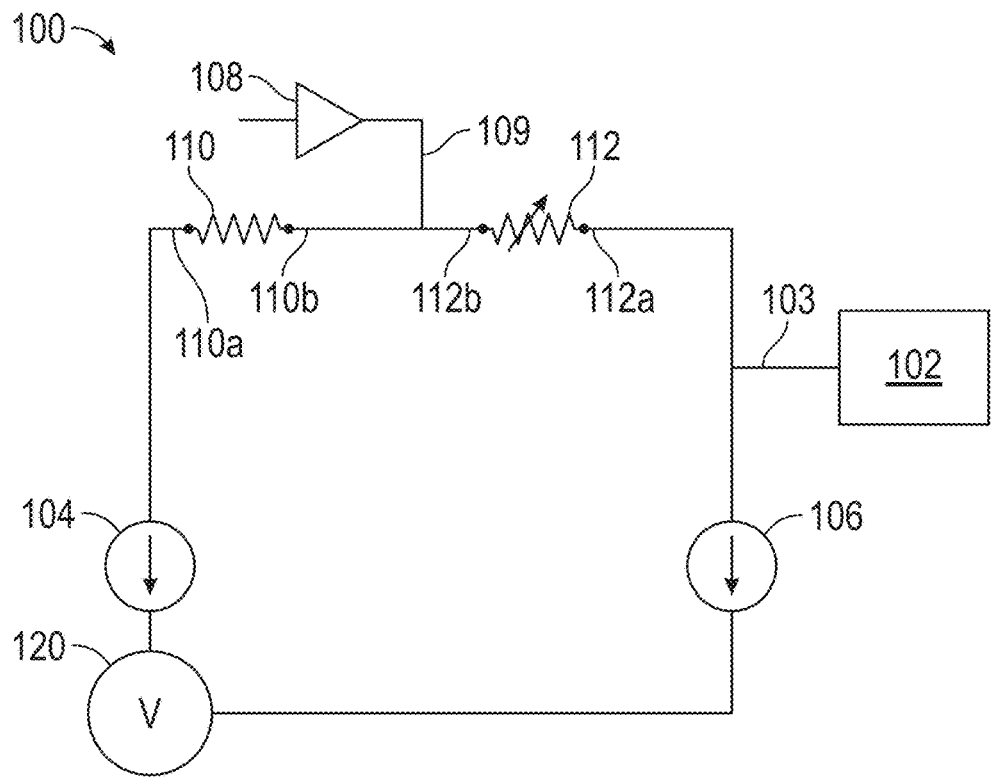
FIG. 1 illustrates a sensor readout circuit, in accordance with an embodiment.

FIG. 1 illustrates a sensor readout circuit 100, in accordance with an embodiment. The sensor readout circuit 100 includes a readout element 102, a first current source 104, a second current source 106, a voltage driver 108, a reference sensor 110, and an active sensor 112. Some embodiments include a method of manufacturing the readout circuit 100.

The readout element includes an input 103. The voltage driver includes an output 109. The reference sensor 110 includes a first terminal 110a and a second terminal 110b; the first terminal 110a is electrically coupled to the first current source 104 and the second terminal 110b is electrically coupled to the output 109 of the voltage driver 108. The active sensor 112 includes a first terminal 112a and a second terminal 112b; the first terminal 112a is electrically coupled to the second current source 106 and the input 103 of the readout element 102; and the second terminal 112b is electrically coupled to the output 109 of the voltage driver 108. The active sensor 112 is configured for exposure to a sensor image.

In some embodiments, a voltage follower (not shown) can be electrically coupled between output 109 and second terminal 112b. A voltage follower may advantageously buffer the voltage at output 109 from effects of capacitive loading.

The simplified topology, as exemplified in FIG. 1, requires one voltage driver, which provides a bias voltage. Without adding circuitry to reduce undesired common mode effects, the topology can reduce undesired common effects without increasing complexity, size, and cost, introducing more parasitics and unknowns, consuming more power, and adding noise inducing components.

In some embodiments, the reference sensor 110 is shielded from the sensor image. The reference sensor 110 can be exposed to an ambient condition common to the reference sensor and active sensor. For example, the reference sensor is a reference or blind bolometer pixel that is exposed to ambient temperatures, but is not exposed to a thermal scene, and the active sensor is an active bolometer pixel, which is exposed to both the ambient temperatures and the thermal scene. Generally, the sensors include two terminals and can have a variable impedance value between the two terminals that depends on a sensor image. Although resistor and variable resistor symbols are used to represent the sensors in this disclosure, it is understood that sensor properties and components are not limited to resistive elements between two terminals.

Although the term "bolometer" is used to exemplify the disclosed sensors, it is understood that the term "bolometer" is not limited to a single pixel or a single device. A bolometer can be any element that is configured to change an output characteristic in response to exposed radiation. In some examples, a bolometer can be one or more pixels. In other examples, a bolometer can be one more devices. Although the term "bolometer pixel" is used to exemplify the disclosed sensors, it is understood that the disclosed sensors can include more than one bolometer pixel without departing from the scope of this disclosure.

In some embodiments, the reference sensor 110 generates an adjustable bias voltage at output 109 that tracks both ambient conditions and self-heating. In such examples, the readout circuit operates in a constant current mode, compared to the constant voltage mode of other readout circuits. In other words, a first current provided by the first current source 104 is constant. Since no other branch is connected between the first current source and the reference sensor, the current traversing the reference sensor is also constant at the value of the first current.

Because the reference sensor is exposed to ambient conditions, the impedance of the reference sensor stabilizes according to a value that is reflective of the exposed ambient conditions. Although the impedance of the sensor is substantially fixed at a stable state, it is understood that the impedance of the reference sensor can vary according to the ambient conditions. A voltage drop is generated between first terminal 110a and second terminal 110b due to the first current and the reference sensor impedance. Due to the voltage drop, the voltage at the second terminal 110b is generated by the difference between the voltage at the first terminal 110a and the voltage drop across the two terminals.

The voltage at the second terminal 110b is driven by voltage driver 108 at output 109. In an embodiment, voltage driver 108 can act substantially as an ideal voltage source. In other words, the voltage driver 108 can provide (or absorb) the necessary current at output 109 to maintain the generated voltage at the second terminal 110b.

The symbol illustrating voltage driver 108 is used for illustrative purposes only. It is apparent to a person of ordinary skill in the art that different methods and circuits can be utilized to drive the voltage at the second terminal 110b. Although an input of the illustrative voltage driver 108 is shown as floating, it is understood that the input is merely representative and can be connected to a suitable element of the readout circuit to maintain the output voltage.

The voltage at the second terminal 110b is significant because it is reflective of common mode effects, such as self-heating and ambient conditions, observed by the reference sensor 110. By driving the second terminal 112b of active sensor 112 and biasing it at this voltage, the common mode effects (which can disadvantageously reduce the dynamic range of subsequent stages) have been effectively compensated because the biasing voltage is reflective of common mode conditions.

In some embodiments, the sensor readout circuit 100 is symmetrically constructed. In other words, active sensor 112 is substantially the same as reference sensor 110, and the second current source 106 can provide substantially the same current as the first current source 104.

In some embodiments, the first current source and the second current source are configured to output an equal magnitude of current in a same direction relative to the respective first terminals. In an example, currents provided by the first and second current sources can flow toward a reference potential 120. In some embodiments, the reference potential 120 is at a reference voltage. In another embodiment, the reference potential 120 is a ground.

In some examples, input 103 of the readout element 102 can have a low input resistance, such as an input of a charge amplifier. In these examples, if the reference and active sensors are exposed to substantially the same conditions, and the first and second current sources provide substantially the same currents, no current would enter or exit the input 103 because the current traversing the active sensor 112 would be the same as the current provided by the second current source 106. An example of this condition is when the exposed sensor image is the ambient condition itself.

Conversely, if the reference and active sensors are exposed to different conditions (i.e. the exposed sensor image is different than the ambient conditions), then a current would enter or exit the input 103 because the impedance of the active sensor 112 is different from the impedance of the reference sensor 110, and the values of the provided currents remain the same after exposure. The current or total charge entering or exiting the input 103 is captured and measured in the readout element 102.

Since common mode effects such as self-heating and ambient conditions have been compensated by the bias voltage, the measured current or charge is independent of these common mode components. As a result, the dynamic range of subsequent stages can be reduced.

Since the measured current or charge is independent of undesired common mode components, these common mode components are not part of the measurement. As an exemplary advantage, the disclosed circuits and methods remove common mode effects without the cost and complexity of additional circuitry. The circuits presented herein efficiently and compactly track common mode changes in the sensor array. Thus, accuracy of the measured thermal image signal can be improved and the input range requirement of subsequent ADCs can be reduced without additional components for compensation.

Additionally, the disclosed readout circuits and methods can tolerate greater variations of circuit elements. For example, since the common mode effects are removed, thermal dependency of the transistors and resistive components can be ignored.

Utilizing this mechanism, an array of active sensors can be measured. Based on the captured or measured currents or charges, a sensor image can be computed. Exemplary methods and circuits performing the measurements and computations are discussed later in this disclosure.

In an embodiment, the active sensors are active bolometer pixels exposed to a thermal scene, and the reference sensors are blind or reference bolometer pixels that are exposed to ambient temperatures, but not the thermal scene. In some embodiments, the active bolometer pixel is exposed to LWIR radiation. The reference bolometer pixel determines a bias voltage that compensates for common mode effects. In response to changes in the thermal scene, the impedance of the active bolometer pixel can change and the resulting change in current is measured or captured to determine the thermal image associated with the thermal scene. The measured current is compensated for common mode effects.

In some embodiments, the first current and the second current provided by the current sources 104 and 106 are constant. For example, the current sources are athermal. The values of the currents are substantially unaffected by temperature. Additionally or alternatively, the current sources can substantially act like an ideal current source. For example, a value of current provided by the current source is fixed regardless of an output voltage of the corresponding current source. As used herein, "constant current" means a current that is independent of other parameters (e.g., temperature, output voltage of a current source, driving load, driving speed). A person of ordinary skill in the art will understand that "constant current" does not require a same value at all times. For example, the current can have a first fixed value during a readout time and have a second fixed value during a non-readout period (e.g., calibration, sleep, low power, power off). In another example, the current can have a third fixed value during a first readout time and have a fourth fixed value during a second readout time.

In some embodiments, a first current buffer is coupled between the reference sensors and the first current source and a second current buffer is coupled between the active sensors and the input of the readout element. In some embodiments, the current buffers shield undesired effects at the input nodes (e.g., input of the readout element, an input of the voltage driver) from signals generated by the reference and active sensors. For example, undesired current can be injected into the input nodes and modulate the voltages at these nodes. The current buffers prevent the signal currents from being affected by the undesired injected currents.

Although current source symbols are used to illustrate the current sources in this disclosure, it is understood that the current source can be any one or more circuit elements that can provide a constant and/or athermal current. In some embodiments, the first current source and the second current source are one or more of an athermal voltage source and resistor, a high-impedance athermal transistor current source, and a Wilson current mirror.

As an exemplary advantage, since constant and athermal current sources can be used to provide the currents of the readout circuit, the output impedance of the current sources can be high compared to the sensors. Thus, the efficiency of the circuit increases because more signal current enters the readout element, instead of being divided by a resistive divider formed by reference and active sensors.

In some embodiments, the readout circuit is electrically coupled to a calibration circuit. The calibration circuit includes one or more calibration current sources, one or more fourth reference sensors, and a calibration readout element. The one or more calibration current sources are configured to provide one or more calibration currents to electrically coupled columns of active and reference sensors and the calibration readout element. In some embodiments, the calibration current sources are fixed current sources. The one or more fourth reference sensors are electrically coupled to the bias voltage and the calibration readout element. In some embodiments, the calibration readout element is a calibration ADC. In some embodiments, each of the one or more fourth references is physically larger than a reference sensor of the readout circuit and has a same impedance as a reference sensor of the readout circuit. The physically larger fourth reference sensor is less noisy than a reference sensor of the readout circuit.

In some embodiments, the readout element is an ADC; an ADC is associated with a column of active or reference sensors. Non-idealities such as gain mismatches, noise, and/or offset of the ADC are calibrated in a calibration mode. In some examples, the non-idealities cause undesired fixed patterns, distorting the sensor image. In the calibration mode, during readout of each row, some or all the voltage driver and readout element inputs are electrically decoupled from the reference and active sensors of the readout circuit, respectively. One or more calibration currents are electrically coupled to the voltage driver and readout element inputs that are electrically decoupled from the reference and active sensors of the readout circuit and the calibration readout element. During readout of each row, a measured value of the calibration readout element can be subtracted from one or more measured values of the readout element inputs electrically coupled to the one or more calibration currents. In some embodiments, the one or more calibration currents electrically couple to one or more different readout element inputs for each row readout period.

Although "electrically coupled" and "coupled" are used to describe the electrical connections between two elements of the readout circuit in this disclosure, it is understood that the electrical connections do not necessarily need direct connection between the terminals of the components being coupled together. Different combinations and connections of the recited components can achieve a constant current and adjustable bias voltage readout circuit without departing from the scope of this disclosure. For example, electrical routing connects between the terminals of the components being electrically coupled together. In another example, a closed (conducting) switch is connected between the terminals of the components being coupled together. In yet another example, additional elements connect between the terminals of the components being coupled together without affecting the constant current characteristics of the circuit. For example, buffers, amplifiers, and passive circuit elements can be added without affecting the characteristics of the readout circuit and departing from the scope of this disclosure.

In some embodiments, two electrically coupled components may be topologically coupled. As used herein, two components are "topologically coupled" if they provide an electrical influence on one another within a topology or a same part of a topology. For example, the reference sensor and the first current source of the disclosed readout circuits are electrically coupled on a same reference branch of the readout circuit.

Similarly, although "electrically uncoupled" is used to describe electrical disconnects between two elements of the readout circuit in this disclosure, it is understood that electrical disconnects do not necessarily need to be physically open between the terminals of the components being switched. It is also understood that "uncoupled" is not limited to mean prevention of electrical energy transfer between two elements. For example, high-impedance elements are connected between the terminals of the components being uncoupled. In another example, an opened (non-conducting) switch is connected between the terminals of the components being uncoupled, effectively uncoupling the components.

The arrows used in the figures are for illustrative purposes. It is understood that that the direction of current flow is not limited to the direction indicated on the drawings. For the sake of descriptiveness, terms such as "entering" and "exiting" are used to describe current flow. A person of ordinary skill in the art would recognize that the directions of current flow or the polarities of the voltages are not limited to the directions or polarities described or illustrated. In some embodiments, voltage polarity is determined by current direction and effective impedance of components traversed by the currents. In other embodiments, current direction is determined by voltage polarity and effective impedance of components traversed by the currents. In yet other embodiments, the current directions are determined by current sources and the voltage polarities are determined by voltage sources.

Figure 2:
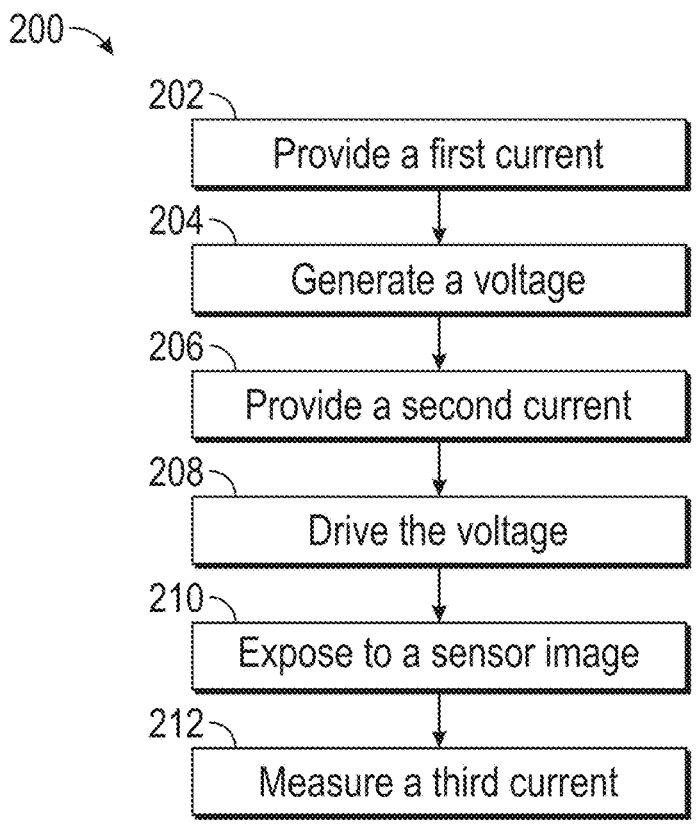
FIG. 2 illustrates a method of sensor readout, in accordance with an embodiment.

FIG. 2 illustrates a method 200 of sensor readout, in accordance with an embodiment. Method 200 includes providing a first current to a first terminal of a reference sensor (step 202). For example, referring to FIG. 1, a first current source 104 can provide a first current to the first terminal 110a of the reference sensor 110.

Method 200 includes generating, from the first current, a voltage at a second terminal of the reference sensor (step 204). For example, due to the first current and the impedance of the reference sensor, a voltage drop across the reference sensor 110 and a voltage at the second terminal 110b are generated.

Method 200 includes providing a second current to a first terminal of the active sensor (step 206). For example, a second current source 106 can provide a second current to the first terminal 112a of the active sensor 112.

In some embodiments, the first current and the second current are constant. In some embodiments, the first current source and the second current source are configured to output an equal magnitude of current in a same direction relative to the respective first terminals. For example, currents provided by the first current source 104 and second current source 106 can flow toward a reference potential 120. In some embodiments, the reference potential 120 is a reference voltage driven by a voltage source. In another embodiment, the reference potential 120 is a ground.

In some embodiments, the first current source and the second current source are selected from the group of an athermal voltage source and resistor, a high-impedance athermal transistor current source, and a Wilson current mirror.

Method 200 includes driving, at the voltage, a second terminal of an active sensor (step 208). For example, the second terminal 110b of the reference sensor 110 is electrically coupled to the second terminal 112b of the active sensor 112, and the voltage at this node is driven by voltage driver 108 at output 109. In some embodiments, the voltage is a bias voltage for the active sensor. For example, as described earlier, the bias voltage is reflective of common mode effects. By biasing the active sensor at the voltage, these common mode effects can be compensated.

In some embodiments, a voltage follower can be electrically coupled between output 109 and second terminal 112b. A voltage follower may advantageously buffer the voltage at output 109 from effects of capacitive loading.

Method 200 includes exposing the active sensor to a sensor image (step 210). For example, active sensor 112 is exposed to a sensor image. In some embodiments, exposing the active sensor to the sensor image further includes changing an impedance of the active sensor. For example, the active sensor is an active bolometer pixel. The active bolometer pixel is exposed to a thermal scene. The impedance of the active bolometer pixel can change in response to exposure to the thermal scene. In some embodiments, exposing the active sensor to the sensor image includes exposing the active sensor to LWIR radiation.

Method 200 includes measuring a third current from the first terminal of the active sensor to an input of a readout element (step 212). For example, a current entering or exiting input 103 of the readout element 102 is measured.

In some embodiments, exposing the active sensor to the sensor image further includes changing the third current. For example, the active sensor is an active bolometer pixel. The active bolometer pixel is exposed to a thermal scene. In response to exposure to the thermal scene, a current entering or exiting input 103 of the readout element 102 can change.

In some embodiments, method 200 further includes exposing the reference sensor to an ambient condition common to the reference sensor and active sensor; and shielding the reference sensor from the sensor image. In one example, the sensor is a bolometer pixel and the common conditions are self-heating and ambient temperature. The reference bolometer pixel is exposed to the common conditions, but is shielded from the thermal scene.

In some embodiments of method 200, the reference sensor is a reference bolometer pixel and the active sensor is an active bolometer pixel. In an embodiment, the active sensor is an active bolometer pixel exposed to a thermal scene, and the reference sensor is a blind or reference bolometer pixel that is exposed to ambient temperatures, but not the thermal scene. The reference bolometer pixel can determine a bias voltage that compensates for common mode effects. In response to changes of the thermal scene, the impedance of the active bolometer pixel can change and the resulting change in current is measured or captured to determine the thermal image associated with the thermal scene. The measured current is compensated for common mode effects.

In some embodiments, a first current buffer is coupled between the reference sensors and the first current source and a second current buffer is coupled between the active sensors and the input of the readout element. In some embodiments, the current buffers shield undesired effects at the input nodes (e.g., input of the readout element, an input of the voltage driver) from signals generated by the reference and active sensors. For example, undesired current can be injected into the input nodes and modulate the voltages at these nodes. The current buffers prevent the signal currents from being affected by the undesired injected currents.

Figure 3:
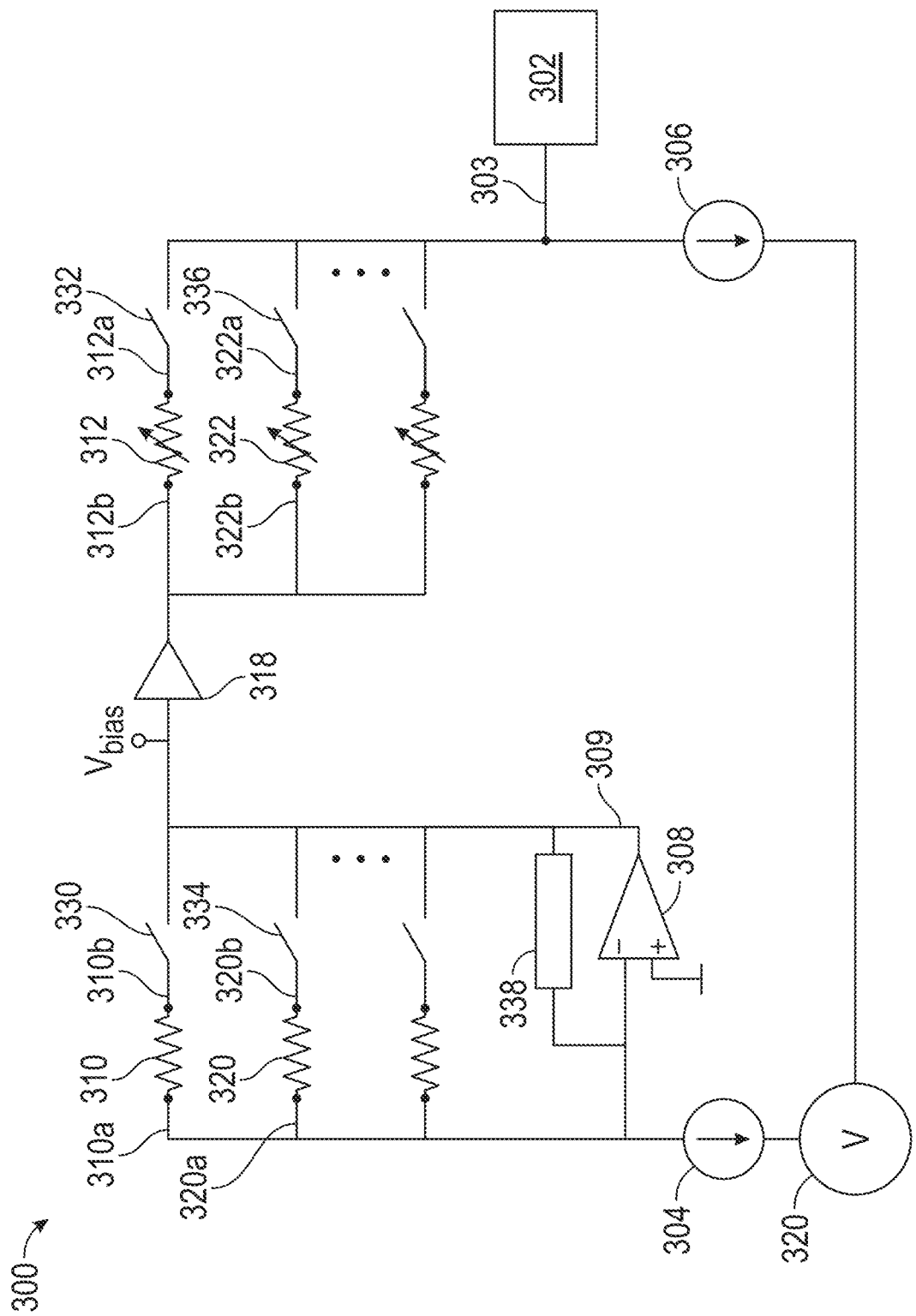
FIG. 3 illustrates a sensor readout circuit, in accordance with an embodiment.

FIG. 3 illustrates a sensor readout circuit, in accordance with an embodiment. The readout circuit 300 includes components that are substantially similar to those described in FIG. 1. Like components in FIG. 3 are given like numerals as the corresponding components in FIG. 1 (for example, read out element 102 and read out element 302). For the sake of brevity, those like components are not described again with respect to FIG. 3. Some embodiments include a method of manufacturing the readout circuit 300.

Circuit 300 further includes a second reference sensor 320, a second active sensor 322, a first switch 330, a second switch 332, a third switch 334, a fourth switch 336, and a voltage follower 318. The second reference sensor 320 includes a first terminal 320a and a second terminal 320b; the first terminal 320a is electrically coupled to the first current source 304 and the second terminal 320b is electrically coupled to output 309 of voltage driver 308. The second active sensor 322 includes a first terminal 322a and a second terminal 322b; the first terminal 322a is electrically coupled to the second current source 306 outputting the second current and the second terminal 322b is electrically coupled to voltage follower 318. The second active sensor 322 is configured to change the current from the first terminal 322 to the input 303 of the readout element 302.

A voltage follower 318 is electrically coupled between the output 309 and second terminal 312b of the active sensor 312. In some embodiments, the voltage follower 318 acts as a voltage buffer. The voltage follower 318 can reduce the output loading of the voltage driver 308. In some embodiments, an active column includes more than one active sensor (this configuration discussed below). In some embodiments, the bias voltage is driven to more than one active column. The loading (e.g., capacitive load) at the active bias voltage node increases as the size of the column and/or the number of columns being driven increases. The voltage follower 318 can maintain the size of the voltage driver 308 and a desirable active bias voltage response.

Although a voltage follower 318 is illustrated as being electrically coupled between the voltage driver 308 and the active sensor 312, it is understood that the readout circuit 300 can include no voltage follower (e.g., the voltage driver 308 is electrically coupled to both second terminals 310b and 312b, providing the active bias voltage) or more than one voltage followers (e.g., multi-stage voltage buffers, parallel voltage followers) without departing from the scope of this disclosure.

The symbol illustrating voltage follower 318 is used for illustrative purposes only. It is apparent to a person of ordinary skill in the art that different methods and circuits can be utilized to drive the voltage at the second terminal 312b.

The first switch 330 is configured to selectively electrically couple the reference sensor 310 to the first current source 304. The second switch 332 is configured to selectively electrically couple the active sensor 312 to the second current source 306. The third switch 334 is configured to selectively electrically couple the second reference sensor 320 to the first current source 304. The fourth switch is configured to selectively electrically couple the second active sensor 322 to the second current source 306. The switches can be any suitable components that can selectively electrically couple the circuit elements. For example, the switches are transistors. The switches can electrically couple to a controller that closes the appropriate switches based on a readout scheme.

The circuit 300 can be configured for readout operation of a sensor array including two or more rows. For example, the reference sensor 310 and the active sensor 312 are associated with a first row of the sensor array, and the second reference sensor 320 and the second active sensor 322 are associated with a second row of the sensor array. During readout of the array, the first row is selected for readout. When the first row is selected for readout, the first switch 330 and the second switch 332 are closed (conducting), coupling the reference sensor 310 to the first current source 304 and the active sensor 312 to the second current source 306, respectively. During this time, the third switch 334 and the fourth switch 336 are opened (not conducting), keeping the second reference and active sensors electrically uncoupled from their respective current sources.

When the first row transitions to the second row for readout, the first switch 330 and the second switch 332 are open (not conducting), electrically uncoupling the reference sensor 310 to the first current source 304, and the active sensor 312 to the second current source 306, respectively. During this time, the third switch 334 and the fourth switch 336 are closed (conducting), electrically coupling the second reference sensor 320 to the first current source 304 and the second active sensor 322 to the second current source 306, respectively.

The mechanism described in this disclosure can cause a current to enter or exit the input 303 of the readout element 302. Accordingly, the readout data of the currently selected active sensor can be subsequently processed. This process can be repeated for subsequent rows until the entire sensor array has been scanned or until the intended rows have been scanned.

Although row-to-row readout operation for an active sensor column is described, it is understood that the operation is not limited to one column. The operation can be performed in sequence or simultaneously for one or more columns of active sensors using one or more columns of reference sensors.

It is also understood that although the switches are configured as illustrated, the switches can be suitably connected in different manners without departing from the scope of this disclosure.

For example, in some embodiments, additional switches are electrically coupled between the second terminals and the voltage follower or the bias voltage node. In some embodiments, a voltage follower may be supplemented with or replaced by additional switches electrically coupled between the second terminals and voltage driver. When the additional switches are coupled between the second terminals and the voltage driver, the second terminals of the one or more active sensors are not the same node in the circuit (with or without the voltage follower). In these embodiments, a respective additional switch of a selected row is closed (conducting) while the other additional switches of the non-selected rows are open (not conducting). In these embodiments, the loading at the second terminal of the selected active sensor is reduced because the loading of the second terminals of the non-selected active sensors are effectively removed. These embodiments are especially beneficial in cases when selected active sensors from multiple columns are simultaneously driven and the loading at the second terminals of the selected active sensors from the multiple columns affects circuit response.

In some embodiments, the voltage driver 308 is an op amp. The output 309 of the op amp 308 is electrically coupled to the second terminals of the reference sensors. The negative input of the op amp can electrically couple to the first terminals of the reference sensors.

The selected reference sensor and the op amp can form an inverting amplifier. The amplifier can output a bias voltage to the second terminals of the reference sensors. The output bias voltage can be substantially the same as the bias voltage described elsewhere in this disclosure. The first terminals of the reference sensors electrically couple to a negative input of the amplifier. Since the first current source 304 provides the first current to the first terminal, a voltage drop across the negative input and the output is generated, and an appropriate bias voltage is driven by the amplifier based on the voltage drop. A reference voltage can electrically couple to the positive terminal of the op amp. For example, the reference voltage is a constant voltage or a ground voltage.

A feedback element 338 is electrically coupled to the first and second terminals of the reference sensor. In other words, the feedback element can provide an additional negative feedback path for the op amp 308. In an embodiment, the feedback element is a capacitor. In another embodiment, the feedback element is a sensor substantially similar to the reference sensor. The feedback element 338 can keep the feedback loop of the voltage driver closed during row transitions, thus preventing the voltage driver 308 from railing or saturating at an open loop situation. The capacitor can be sized appropriately such that the voltage at output 309 will be the desired voltage at the start of the readout of the next row. A person of ordinary skill in the art will recognize that other suitable feedback elements can be used without departing from the scope of the disclosure.

In some embodiments, a first current buffer is coupled between the reference sensors and the first current source and a second current buffer is coupled between the active sensors and the input of the readout element. In some embodiments, the current buffers shield undesired effects at the input nodes (e.g., input of the readout element, negative terminal of voltage driver 308) from signals generated by the reference and active sensors. For example, undesired current can be injected into the input nodes and modulate the voltages at these nodes. The current buffers prevent the signal currents from being affected by the undesired injected currents.

Figure 4:
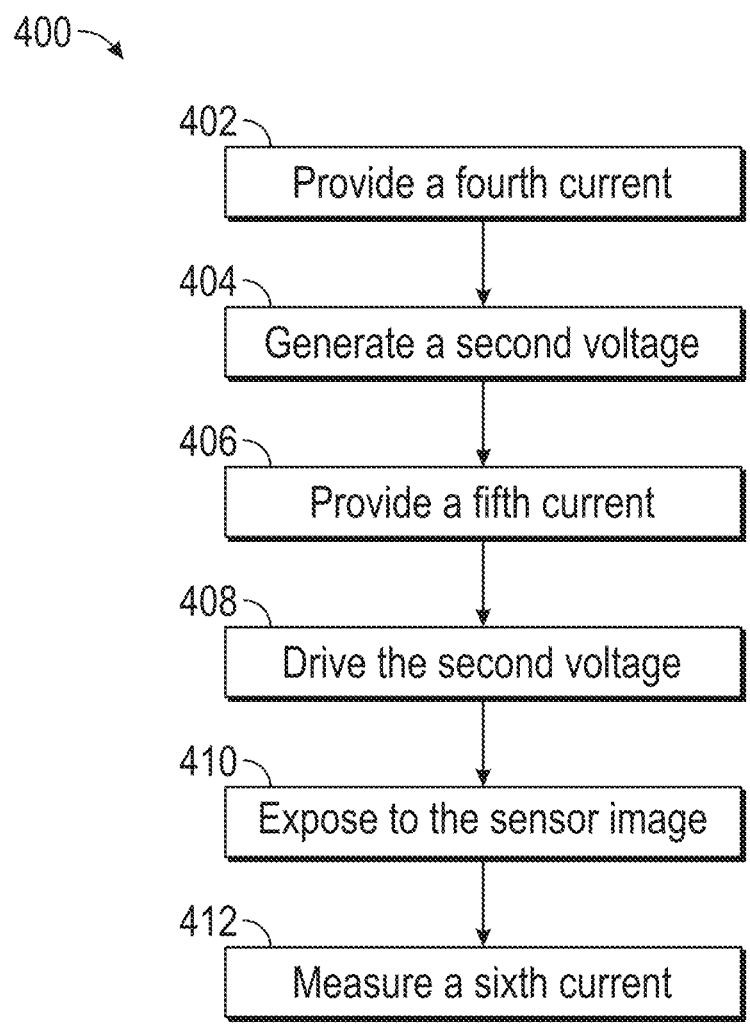
FIG. 4 illustrates a method of sensor readout, in accordance with an embodiment.

FIG. 4 illustrates a method 400 of sensor readout, in accordance with an embodiment. In some embodiments, method 400 is used in conjunction with method 200. In some embodiments, method 400 is performed using the readout circuits described in this disclosure. Method 400 includes providing a fourth current to a first terminal of a second reference sensor (step 402). For example, referring to FIG. 3, a first current source 304 can provide a fourth current to the first terminal 320a of the second reference sensor 320. In some embodiments, the first current and the fourth current have the same magnitude.

Method 400 can further include electrically uncoupling, from the reference sensor, the first current source providing the first current; and coupling, to the second reference sensor, the first current source providing the fourth current. For example, the first switch 330 can open (not conduct), electrically uncoupling the reference sensor 310 to the first current source 304. The second switch 332 can close (conduct), coupling the second reference sensor 320 to the first current source 304.

Method 400 includes generating, from the fourth current, a second voltage at a second terminal of the second reference sensor (step 404). For example, due to the fourth current and the impedance of the second reference sensor 320, a voltage drop across the reference sensor 320 and a voltage at the second terminal 320b are generated.

Method 400 includes providing a fifth current to a first terminal of a second active sensor (step 406). For example, a second current source 306 can provide a fifth current to the first terminal 322a of the second active sensor 322. In some embodiments, the second current and the fifth current can have the same value.

Method 400 can further include electrically uncoupling, from the active sensor, a second current source providing the second current; and coupling, to the second active sensor, the second current source providing the fifth current. For example, the third switch 334 can open (not conduct), electrically uncoupling the active sensor 312 to the second current source 306. The fourth switch 336 can close (conduct), coupling the second active sensor 322 to the second current source 306.

In some embodiments, the fourth current and the fifth current are constant. In some embodiments, the first current source and the second current source are configured to output an equal magnitude of current in a same direction relative to the respective first terminals. For example, currents provided by the first current source 304 and second current source 306 can flow toward a reference potential 320. In some embodiments, the reference potential 320 is a reference voltage driven by a voltage source. In another embodiment, the reference potential 320 is a ground.

In some embodiments, the first current source and the second current source are selected from the group of an athermal voltage source and resistor, a high-impedance athermal transistor current source, and a Wilson current mirror.

As an exemplary advantage, since constant and athermal current sources can be used to provide the currents of the readout circuit, the output impedance of the current sources can be high compared to the sensors. Thus, the efficiency of the circuit increases because more signal current enters the readout element, instead of being divided by a resistive divider formed by reference and active sensors.

Method 400 includes driving, at the second voltage, a second terminal of the second active sensor (step 408). For example, the second terminal 320b of the second reference sensor 320 is electrically coupled to the second terminal 322b of the active sensor 322, and the second voltage at this node is driven by voltage driver 308 at output 309. In some embodiments, the second voltage is a bias voltage for the second active sensor. For example, as described earlier, the bias voltage is reflective of common mode effects. By biasing the second active sensor at the voltage, these common mode effects can be compensated.

In some embodiments, the second voltage is driven by an op amp, and the first terminals of the reference sensors are electrically coupled to a negative input of the op amp. In some embodiments, the method further includes feeding back from the second terminal of the reference sensor to the first terminal of the reference sensor using a feedback element.

In some examples, the fourth current causes a voltage drop across the second reference sensor; the second voltage is generated with an amplifier outputting to the second terminal of the second reference sensor; and the first terminal of the second reference sensor is electrically coupled to a negative terminal of the amplifier.

Method 400 includes exposing the second active sensor to the sensor image (step 410). For example, the second active sensor 322 is exposed to a sensor image. In some embodiments, exposing the second active sensor to the sensor image further includes changing an impedance of the second active sensor. For example, the second active sensor is a second active bolometer pixel. The second active bolometer pixel is exposed to a thermal scene. The impedance of the second active bolometer pixel can change in response to exposure to the thermal scene. In some embodiments, exposing the second active sensor to the sensor image includes exposing the second active sensor to LWIR radiation.

Method 400 includes measuring a sixth current from the first terminal of the second active sensor to the input of a readout element (step 412). For example, a current entering or exiting input 303 of the readout element 302 is measured. In some embodiments, the sixth current is caused by the mechanisms described in this disclosure.

Accordingly, the readout data of the currently selected active sensor can be subsequently processed. This process can be repeated for subsequent rows until the entire sensor array has been scanned or until the intended sensors have been scanned.

Although row-to-row readout operation for an active sensor column is described, it is understood that the operation is not limited to one column. The operation can be performed in sequence or simultaneously for more than one column of active sensors using more than one column of reference sensors.

Figure 5:
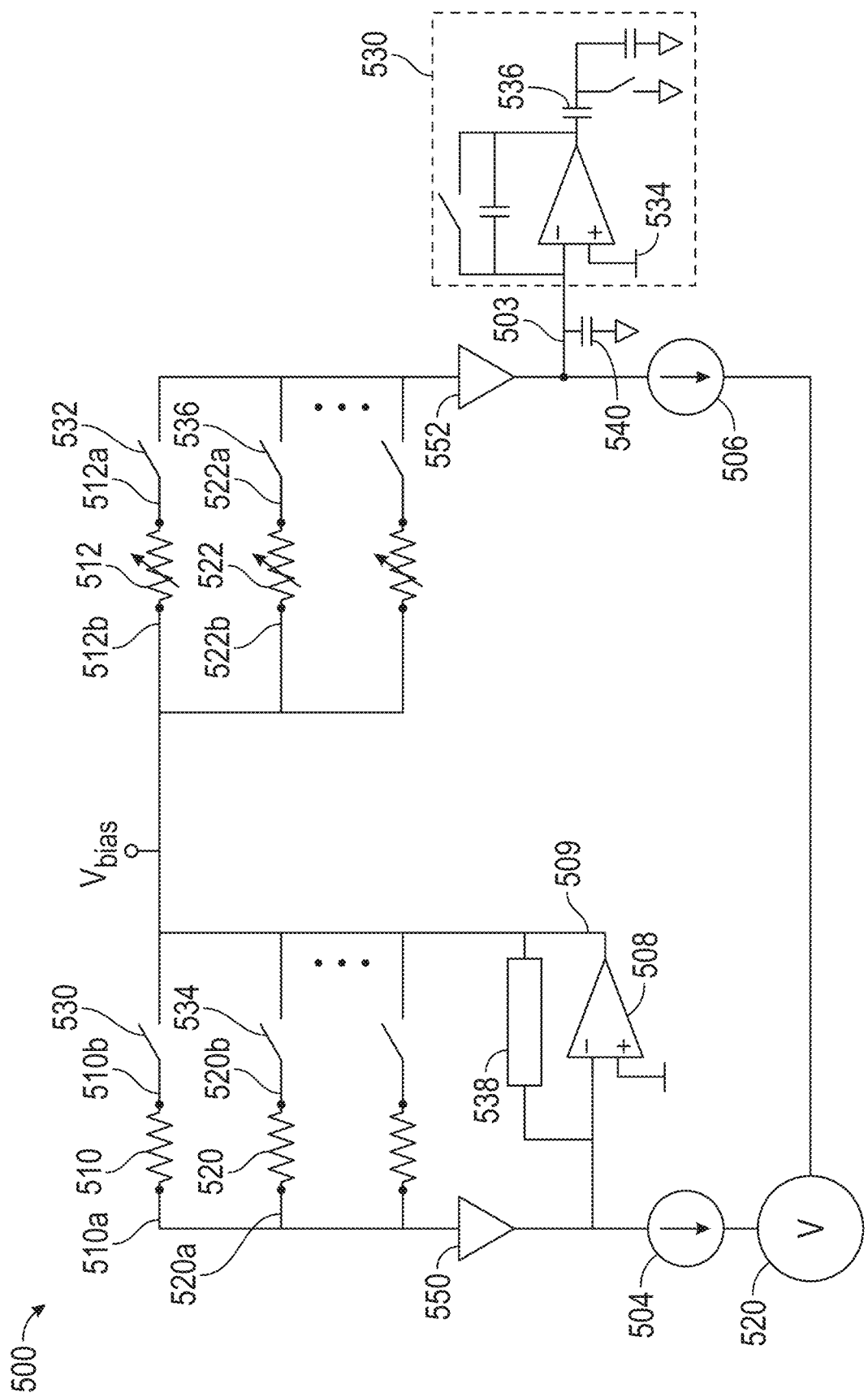
FIG. 5 illustrates a sensor readout circuit, in accordance with an embodiment.

FIG. 5 illustrates a sensor readout circuit, in accordance with an embodiment. The readout circuit 500 includes components that are substantially similar to those described in FIGS. 1 and 3. Like components in FIG. 5 are given like numerals as the corresponding components in FIGS. 1 and 3. For the sake of brevity, those like components are not described again with respect to FIG. 5. In some embodiments, components of circuit 500 are utilized in conjunction with the readout circuits described elsewhere in the disclosure. Some embodiments include a method of manufacturing the readout circuit 500.

The circuit 500 further includes a stage 530 of a readout element that can be substantially similar to the readout elements described in this disclosure. In some embodiments, the stage of the readout element is a CTIA. In some embodiments, because of the symmetric constructions between the reference sensor and active sensor branches, the voltage at the input 503 can ideally equal the voltage of the positive terminal 534 when the reference sensor 510 and the active sensor 512 have the same impedance (for example, when the sensors are both exposed to only the ambient conditions). In some embodiments, the voltage at the positive terminal 534 is a reference voltage. In some embodiments the voltage at the positive terminal 534 is a ground voltage.

First current buffer 550 is coupled between the reference sensors and the first current source 504. A second current buffer 552 is coupled between the active sensors and the input 503. In some embodiments, the current buffers shield the effects of feedback at the input nodes (e.g., input 503, negative terminal of voltage driver 508) from signals generated by the reference and active sensors. For example, undesired current can be injected into the input nodes and modulate the voltages at these nodes. The current buffers prevent the signal currents from being affected by the undesired injected currents.

Although a current buffer is illustrated each for the reference and active branches, it is understood that the readout circuit can include no current buffer (e.g., the current sources are electrically coupled to the reference and active sensors) or more than one current buffer (e.g., parallel current buffers, a current buffer for each branch) without departing from the scope of this disclosure.

The symbol illustrating current buffers 550 and 552 are used for illustrative purposes only. The symbol does not necessary imply that current buffering is performed using only drivers or amplifiers. It is apparent to a person of ordinary skill in the art that different methods and circuits can be utilized to buffer the current between the sensors and the current sources.

In some embodiments, the voltage at the output of the CTIA is proportional to an impedance difference between the reference sensor and the active sensor during readout of a sensor. For example, the voltage at the output 536 of the CTIA is V, the voltage at the input 503 of the CTIA is $V_n$, an effective capacitance at the input of the CTIA is $C_p$, the open loop gain of the CTIA is A, the feedback capacitor of the CTIA can have a value of $C_{CTIA}$, the impedance of the reference sensor 510 is $Z_{ref}$, the impedance of the active sensor 512 is $Z_{active}$, the bias voltage (i.e. the voltage at the second terminal 512b) of the active sensor 512 is Vbias, the first current source 504 can provide a current of $I_1$, the second current source 506 can provide a current of $I_2$, and a voltage at reference potential 520 is $V_{ref}$. The following equations can be used to calculate V:

$$V_{bias} = I_1 \times Z_{ref} \qquad (1)$$

$$\frac{(V_{bias} - V_n)}{Z_{active}} + sC_{CTIA}(V - V_n) + I_2 - sC_p V_n = 0 \qquad (2)$$

$$-AV_n = V \qquad (3)$$

The polarities of the above variables are denoted only to solve the circuit parameters. It is understood that the currents in the circuit can be in any direction and the voltages in the circuit can be in any polarity.

Combining the above equations, V can be isolated:

$$V = I_1 \times A \times \frac{\left(\frac{Z_{ref}}{Z_{active}} - 1\right)}{\frac{1}{Z_{active}} + \frac{I_1}{V_{ref}} + s(C_{CTIA}(A+1) + C_p)} \qquad (4)$$

The term $\xi$ is a gain coefficient:

$$\xi = \frac{A}{\frac{1}{Z_{active}} + \frac{I_1}{V_{ref}} + s(C_{CTIA}(A+1) + C_p)} \qquad (5)$$

The CTIA can be effectively an ideal integrator. In other words, the open loop can be substantially large compared to the other variables in the gain coefficient. In these cases, the variable A can effectively approach infinity. In some examples, the open loop gain A is greater than 20. As such, the gain coefficient can be approximated:

$$\xi \approx \frac{1}{sC_{CTIA}} \qquad (6)$$

The effective integration capacitance of the CTIA is:

$$C_e = C_{CTIA}(A+1) + C_p \qquad (7)$$

The effective integration resistance of the CTIA is:

$$R_e = 1 \Big/ \left(\frac{1}{Z_{active}} + \frac{I_1}{V_{ref}}\right) \qquad (8)$$

Assuming the CTIA is effectively an ideal integrator:

$$sR_e C_e \gg 1 \qquad (9)$$

Therefore, the CTIA has an integration time:

$$\tau \ll R_e C_e \qquad (10)$$

Since the CTIA can be effectively an ideal integrator, the following relationship is derived for V:

$$V = I_1 \xi \left(\frac{Z_{ref} - Z_{active}}{Z_{active}}\right) \qquad (11)$$

The reference sensor 510 and the active sensor 512 are identical in structure. In other words, the two sensors can have the same impedance when exposed to same conditions. Therefore, V can be further simplified:

$$\Delta Z = Z_{ref} - Z_{active} \qquad (12)$$

Where $\Delta Z$ is an impedance difference between the reference and active sensors. Since the terms $I_1$ and $\xi$ are effectively constant during the readout time, V is proportional to $\Delta Z$, independent of any other parameters.

$$V \propto \Delta Z / Z_{active} \qquad (13)$$

Using the readout circuits described in this disclosure, a sensor image can be computed based only on an impedance difference between the reference and active sensors, independent of any other parameters. It is noted that in addition to removing common mode effects from the measurement, the disclosed constant current readout circuits and methods also yield the elegant result shown above.

From the above derivation, one can see that an exemplary advantage of the disclosed circuits and methods is that an output voltage of the readout circuit can be substantially proportional to an impedance difference of a reference sensor and an active sensor. As a consequence of reading out in a constant current mode, some of the approximations and cancellations in the above derivation can be made; the sensor image can be simply computed based on the proportional relationship. In some examples, the simple proportional relationship allows the sensor image to be more easily computed. As a result, less processing is required. In other examples, the simple proportional relationship includes less varying and unknown elements (in the equations and on the circuit). As a result, the sensor image is more accurate.

Although the term proportional is used to describe the relationship between an output voltage and a sensor impedance difference, it is understood that the term "proportional" is not limited to an exact linear relationship. Without departing from the scope of this disclosure, the term "proportional" can be used to describe an approximate linear relationship between two quantities. The term "proportional" can also be used to describe a relationship between two quantities that are different by a scaling factor.

Although the approximations above are made with the above assumptions, it is understood that the above variables can approach their approximated values when the assumptions are met in the circuit. The approximated value can be replaced in the equation, for the purpose of calculation, without any unexpected consequences.

The circuit 500 can have an additional load. The additional load can be represented by capacitor 540 at input 532 of the stage 530. It is understood that the representative capacitor 540 is illustrative and not an actual capacitor or capacitive component electrically coupled to ground. In some embodiments, the representative capacitor 540 is an effective capacitance at the input 503 node, which is representative of non-ideal capacitances (e.g., sensor load capacitances, current source capacitances, mismatches, wiring capacitances, parasitics) of the circuit.

To remove the undesired additional load, the readout circuit can include a CDS circuit. In some embodiments, the CDS circuit is included as part of the CTIA. To remove the additional load, prior to reading out a selected sensor, the effect on the circuit caused by the additional load is determined. For example, the effective charge caused by the effective representative additional load (e.g., capacitance 540) is sampled. The effect of the additional load is canceled prior to reading out the selected sensor.

In some embodiments, the additional non-idealities can include voltage and current non-idealities caused by elements of the readout circuit (not symbolically represented). In some embodiments, the CDS circuit removes the additional non-idealities as well as the effects of the non-ideal capacitances in the circuit.

A method of sensor readout can include converting a current inputted to the readout element to a readout voltage of the readout element. For example, a CTIA can convert the current to a readout voltage of the readout element. In some embodiments, a voltage at an output of the CTIA is proportional to an impedance difference between the reference sensor and the active sensor.

The readout circuit can further include a CDS circuit. The CDS circuit can remove an offset in the readout circuit. In some embodiments, the CDS circuit is included as part of the CTIA.

In some embodiments, the method further includes: determining an offset generated by the input of the readout element; and canceling the offset prior to measuring the current to the input of the readout element.

In some embodiments, the circuit can include additional non-idealities such as voltage and current non-idealities caused by elements of the readout circuit (not symbolically represented). In some embodiments, the CDS circuit removes the additional non-idealities as well as the offset in the circuit.

Figure 6:
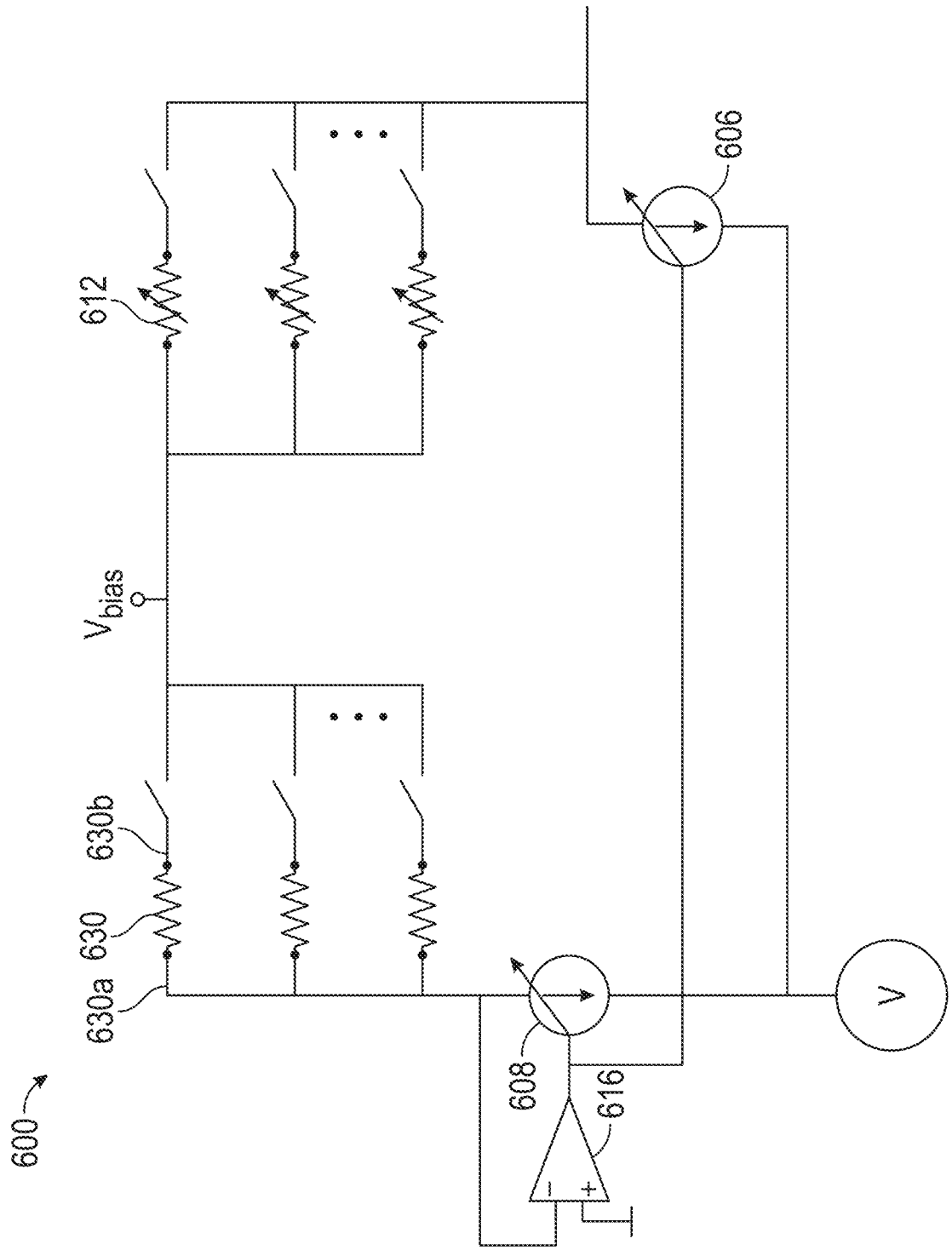
FIG. 6 illustrates a sensor readout circuit, in accordance with an embodiment.

FIG. 6 illustrates a sensor readout circuit, in accordance with an embodiment. The readout circuit 600 can include components that are substantially similar to those described in FIGS. 1, 3, and 5. For the sake of brevity, those like components are not described again with respect to FIG. 6. In some embodiments, components of circuit 600 are utilized in conjunction with the readout circuits described elsewhere in the disclosure. Some embodiments include a method of manufacturing the readout circuit 600.

In some embodiments, the readout circuit 600 includes a third reference sensor 630 and a third current source 608. The third reference sensor 630 includes a first terminal 630a and a second terminal 630b that are electrically coupled to a voltage driver (not shown). The third current source 608 is electrically coupled to the first terminal 630a of the third reference sensor 630, and is configured to output a seventh current reflective of self-heating generated by the third reference sensor 630. The value of the second current provided by second current source 606 adjusts in accordance with the seventh current. In an example, the second current source is substantially similar to the second current described in this disclosure, and the third reference sensor is a reference or blind bolometer pixel.

In an embodiment, the seventh current is provided by a controlled current source. The controlled current source is controlled using feedback loop 616, which tracks the voltage at the first terminal 630a of the third reference sensor 630, and hence, its self-heating. For a currently selected row of sensors, the seventh current can change due to the tracked self-heating of the third reference sensor 630, which is reflective of self-heating experienced by the active sensors. The voltage at the first terminal 630a is held constant by the op-amp of feedback loop 616 in a negative feedback configuration. The output voltage of the op-amp updates to track the changes in current due to self-heating. The seventh current is mirrored to the second current source 606, which is electrically coupled to active sensor 612 to compensate for self-heating of the selected active sensor.

A negative feedback amplifier is shown merely for exemplary purposes. It is understood that other components and methods can track and control the currents 606 and 608 without departing from the scope of the invention. Although a voltage driver is not shown to drive the bias voltage, it is understood that a voltage driver can be electrically coupled across the reference sensor to drive the bias voltage, as described in this disclosure. Although one reference column and one active column are illustrated, it is understood that one or more reference columns can track self-heating and one or more active columns can be compensated for self-heating.

Figure 7:
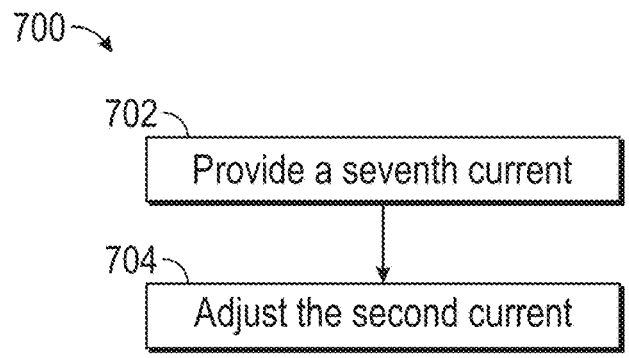
FIG. 7 illustrates a method of current adjustment, in accordance with an embodiment.

FIG. 7 illustrates a method 700 of current adjustment, in accordance with an embodiment. For example, a current provided to an active bolometer pixel is compensated for self-heating by tracking a blind bolometer pixel.

Method 700 includes: providing a seventh current to a first terminal of a third reference sensor (step 702), the seventh current reflective of self-heating generated by the third reference sensor; and adjusting a value of the second current in accordance with the seventh current (step 704). Method 700 can be achieved using readout circuit 600 or other suitable self-heating compensating components. For example, the seventh current is provided by third current source 608 and tracked by feedback loop 616. The tracked current is mirrored to a current (e.g., current provided by second current source 606) provided to an active sensor.

Alternatively, in an embodiment, the voltage across the reference sensor is kept constant. In other words, the third reference sensor 630 is not exposed to ambient conditions and no voltage driver is electrically coupled in parallel with the third reference sensor 630. In this embodiment, the third reference sensor does not generate the bias voltage and adjust the average bias current to track ambient changes. However, it is necessary to generate a bias voltage and adjust the bias current with respect to ambient conditions in order to maintain a constant gain in the pixel response.

Figure 8:
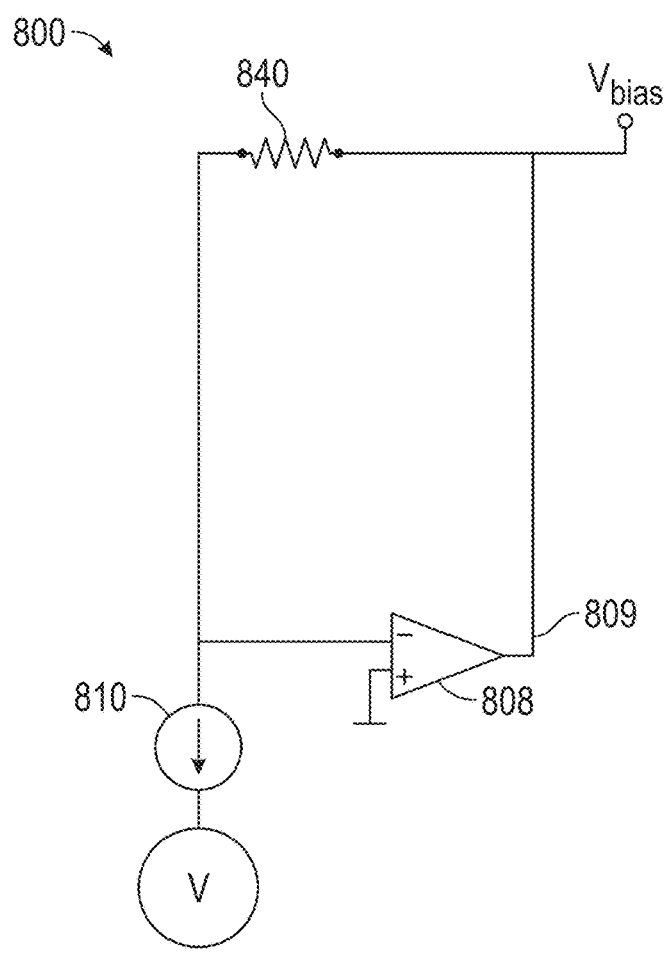
FIG. 8 illustrates a sensor bias circuit, in accordance with an embodiment.

FIG. 8 illustrates a sensor bias circuit, in accordance with an embodiment. The readout circuit 800 can include components that are substantially similar to those described in FIGS. 1, 3, 5, and 6. For the sake of brevity, those like components are not described again with respect to FIG. 8. In some embodiments, components of circuit 800 are utilized in conjunction with the readout circuits described elsewhere in the disclosure. Some embodiments include a method of manufacturing the circuit 800.

The sensor bias circuit 800 separately tracks the ambient condition and is independent of the described self-heating compensation components. Circuit 800 includes a reference sensor 840, a current source 810, and a voltage driver 808. For example, the reference sensor 802 is a thermally shorted (blind or reference) bolometer pixel. In some embodiments, the current source 810 and the voltage driver 808 is substantially the same as the first current source and voltage driver described in the disclosure. The bias voltage, which tracks the ambient conditions, is generated in a substantially the same manner as described in this disclosure. The bias voltage output 809 is electrically coupled to the bias voltage nodes of the readout circuits described in this disclosure to generate the active sensor bias currents.

By separating ambient condition tracking from the self-heating compensation, faster self-heating compensation can be achieved. Compensation response can be faster by adjusting current mirrors at each respective column, instead of using a global amplifier to drive a relatively large load at the bias voltage node. Since circuit sizing is less restricted by the load at the bias voltage node, a greater range of pixel array sizes can be compatible with same periphery circuits. In other words, the readout circuits can be more scalable. Although one voltage driver and one bias circuit are illustrated in the figure, it is understood that one or more of the illustrated components can be used to form one or more sensor bias circuits.

In some embodiments, a voltage follower is electrically coupled between the bias voltage node and second terminals of one or more active sensors, in a manner similar to the voltage followers described herein. In some embodiments, the voltage follower acts as a voltage buffer. The voltage follower can reduce the output loading of the voltage driver 808. In some embodiments, an active column includes more than one active sensor. In some embodiments, the bias voltage is driven to more than one active column. The loading (e.g., capacitive load) at the active bias voltage node increases as the size of the column and/or the number of columns being driven increases. The voltage follower can maintain the size of the voltage driver 808 and a desirable active bias voltage response.

Figure 9:
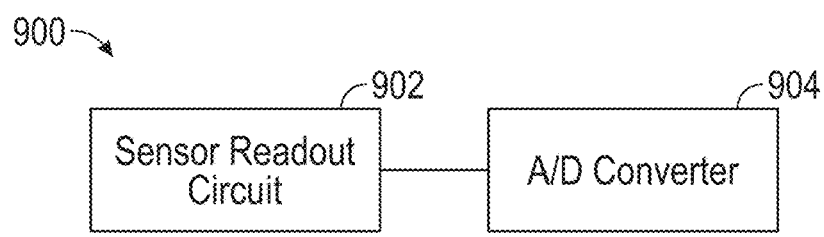
FIG. 9 illustrates a sensor readout system, in accordance with an embodiment.

FIG. 9 illustrates a sensor readout system, in accordance with an embodiment. Sensor readout system 900 includes sensor readout circuit 902 and ADC 904. The sensor readout circuit 902 can be a readout circuit described in this disclosure. The sensor readout circuit 902 can electrically couple to ADC 904. Some embodiments include a method of manufacturing the circuit 900.

In some embodiments, the ADC can sample a current or charge from the first terminal of the active sensor to the input of the readout element, as described in this disclosure. In some embodiments, the ADC 904 includes one or more Sigma-Delta ADCs. In some examples, a first stage of the ADC is a CTIA. In these examples, common components (e.g., CTIA) between the readout circuit and the ADC are advantageously shared, optimizing system area and power.

In some embodiments, a method of sensor readout includes sampling a voltage generated by the current or charge to the input of the readout element. For example, the readout element can include a Sigma-Delta ADC, and the voltage being sampled is generated by a CTIA. In some embodiments, a first current buffer is coupled between reference sensors and a first current source. A second current buffer is coupled between active sensors and an input of the Sigma-Delta ADC. In some embodiments, the current buffers shield the effects of feedback at input nodes (e.g., the input of the Sigma-Delta ADC) from signals generated by reference and active sensors. For example, undesired current can be injected into the input nodes and modulate the voltages at these nodes. The current buffers reduce the undesired injected currents' effect on the signal currents.

The input current of the CTIA is a difference generated by an active bolometer pixel exposed to a thermal scene. In some examples, the CTIA is a first stage of the Sigma-Delta ADC.

Examples of the disclosure are directed toward MEMS sensor calibration circuits and methods that overcome the herein-identified drawbacks. In some embodiments, the sensor calibration circuits include a calibration sensor and a calibration readout element. In some embodiments, the sensor calibration circuits include a calibration current source. In some embodiments, a shutter is included with the sensor calibration circuits.

In some embodiments, the methods include measuring a voltage of the calibration sensor and computing a calibrated readout voltage based on the measured calibration sensor voltage. In some embodiments, the methods include measuring a readout voltage of a readout element electrically coupled to the calibration current source and computing an output based on the readout voltage. In some embodiments, the methods include measuring readout voltages when the shutter is closed and when the shutter is opened and computing a difference between the readout voltages.

As an exemplary advantage, the disclosed circuits and methods remove noise at reduced costs. The circuits presented herein efficiently and compactly remove noises in the sensor array. Thus, the clarity of measured sensor images can be improved.

Figure 10:
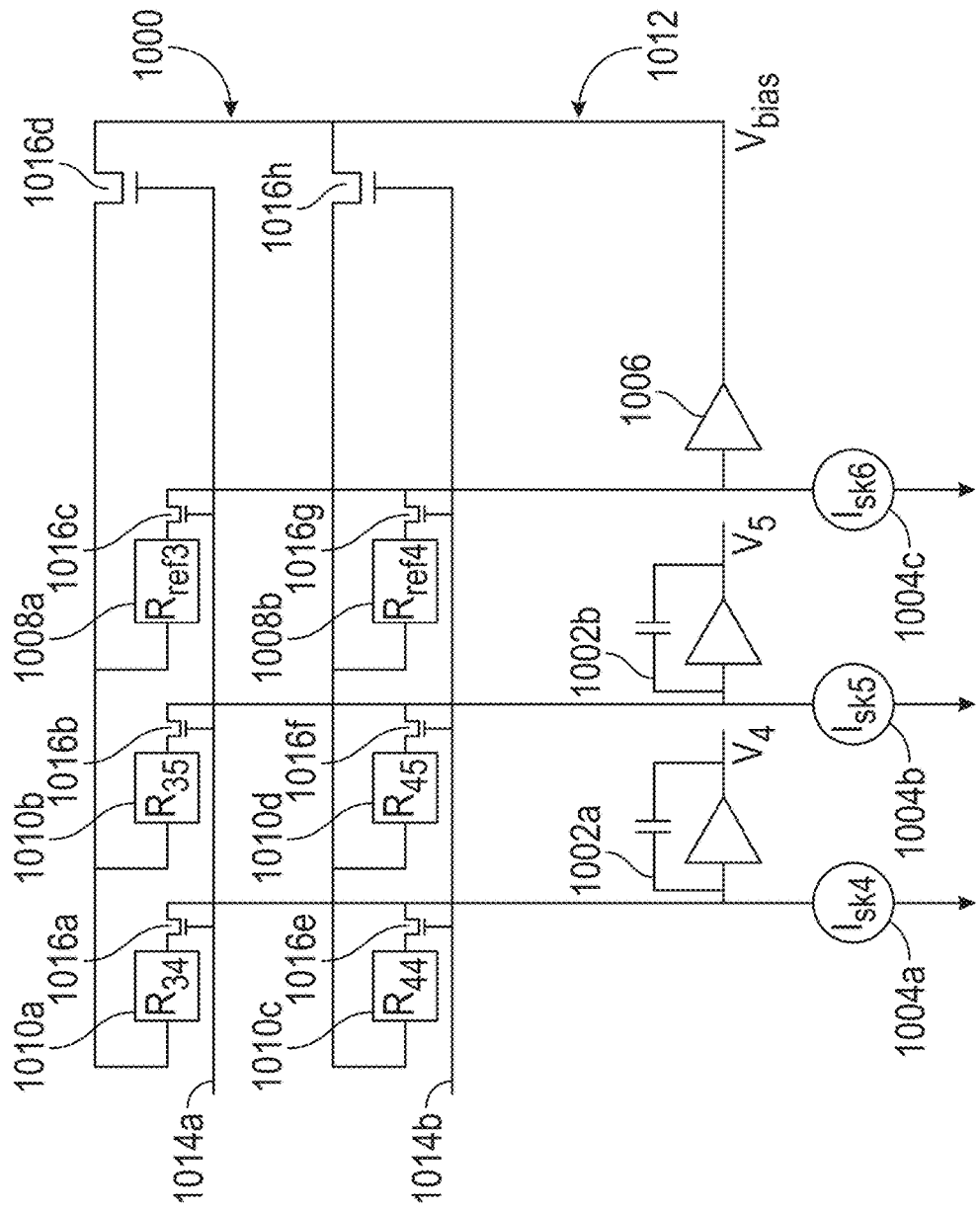
FIG. 10 illustrates a sensor readout circuit, in accordance with an embodiment.

FIG. 10 illustrates a sensor readout circuit 1000, in accordance with an embodiment. The sensor readout circuit 1000 includes readout elements 1002a and 1002b, current sources 1004a to 1004c, a voltage driver 1006, reference sensors 1008a and 1008b, active sensors 1010a to 1010d, and switches 1016a to 1016h. Some embodiments include a method of manufacturing the readout circuit 1000.

In some embodiments, elements of the sensor readout circuit 1000 correspond to elements of the sensor readout circuit 100. In some embodiments, readout element 1002a corresponds to readout element 102, current source 1004a corresponds to second current source 106, current source 1004c corresponds to first current source 104, voltage driver 1006 corresponds to voltage driver 108, reference sensor 1008a corresponds to reference sensor 110, and active sensor 1010a corresponds to active sensor 112.

The topology, as exemplified in FIG. 10, uses one voltage driver, which provides a bias voltage. Without adding circuitry to reduce undesired common mode effects, the topology can reduce undesired common effects without increasing complexity, size, and cost, introducing more parasitics and unknowns, consuming more power, and adding noise inducing components.

In some embodiments, the reference sensors 1008a and 1008b are shielded from the sensor image and the active sensors 1010a to 1010d are exposed to the sensor image. The reference sensors can be exposed to an ambient condition common to the reference sensors and active sensors. For example, the reference sensor is a reference or blind bolometer pixel that is exposed to ambient temperatures, but is not exposed to a thermal scene, and the active sensor is an active bolometer pixel, which is exposed to both the ambient temperatures and the thermal scene. Generally, the sensors include two terminals and can have a variable impedance value between the two terminals that depends on a sensor image. Although block symbols are used to represent the sensors in this disclosure, it is understood that the described sensor properties and components are exemplary.

In some embodiments, during sensor readout, each row is readout sequentially. For example, at a first row readout time, row control 1014a is driven by a voltage that turns on the switches of the corresponding row (e.g., switches 1016a to 1016d) while row control 1014b is driven by a voltage that turns off the switches of the corresponding row (e.g., switches 1016e to 1016h). At a second row readout time, row control 1014b is driven by a voltage that turns on the switches of the corresponding row (e.g., switches 1016e to 1016h) while row control 1014a is driven by a voltage that turns off the switches of the corresponding row (e.g., switches 1016a to 1016d). When switches of a corresponding row are turned on, the active and reference sensors of the corresponding row are electrically coupled to the bias voltage node 1012 and corresponding current sources while sensors of the other rows are electrically uncoupled from the bias voltage node 1012 and corresponding current sources. It is understood that the described readout operation is exemplary.

In some embodiments, a selected reference sensor generates an adjustable bias voltage at the bias voltage node 1012 that tracks both ambient conditions and self-heating. In such examples, the readout circuit operates in a constant current mode. Since no other branch is electrically coupled between current source 1004c and the selected reference sensor, the current through the selected reference sensor is constant.

Because the reference sensor is exposed to ambient conditions, the impedance of the reference sensor stabilizes to a value that is reflective of the ambient conditions. Although the impedance of the sensor can be substantially fixed at a stable state, it is understood that the impedance of the reference sensor can vary according to the ambient conditions. A voltage drop is generated across the reference sensor due to the current and the reference sensor impedance. The voltage at the bias voltage node 1012 is dictated by the voltage drop.

The voltage at the bias voltage node 1012 is driven by voltage driver 1006. In an embodiment, voltage driver 1006 can act substantially as an ideal voltage source. In other words, the voltage driver 1006 can provide (or absorb) the necessary current to maintain the generated voltage at the bias voltage node 1012.

The symbol illustrating voltage driver 1006 is used for illustrative purposes only. It is apparent to a person of ordinary skill in the art that different methods and circuits can be utilized to drive the bias voltage.

The bias voltage can be significant because it is reflective of common mode effects, such as self-heating and ambient conditions, observed by the reference sensor. As such, the selected active sensors are biased at the bias voltage, and the common mode effects (which can disadvantageously reduce the dynamic range of subsequent stages) have been effectively compensated, because the bias voltage is reflective of common mode conditions.

In some embodiments, an active sensor is substantially the same as a reference sensor, and the current sources 1004a-1004c provide substantially the same current.

In some examples, the readout elements can have a low input resistance, such as an input of a charge amplifier. In these examples, if the reference and active sensors are exposed to substantially the same conditions, and the current sources provide substantially the same currents, no current would enter or exit the input of the readout elements because the current traversing a respective selected active sensor would be the same as the current provided by a respective current source. An example of this condition is when the exposed sensor image is the ambient condition itself.

Conversely, if the reference and active sensors are exposed to different conditions (i.e., the exposed sensor image is different than the ambient conditions), then a current would enter or exit the input of the readout element because the impedance of a respective selected active sensor is different from the impedance of a selected reference sensor, and the values of the provided currents remain the same after exposure. The current or total charge entering or exiting a respective readout element is captured and measured.

Since common mode effects such as self-heating and ambient conditions have been compensated by the bias voltage, the measured current or charge is independent of these common mode components. As a result, the dynamic range of subsequent stages can be reduced. Since the measured current or charge is independent of undesired common mode components, these common mode components are not part of the measurement.

In some embodiments, the sensors are located on a glass substrate. In some embodiments, the glass substrate includes a plurality of TFTs that are used as switches for the sensor array (e.g., switches 1016a-1016h). In some embodiments, non-sensor and non-switching elements off the array (e.g., readout elements, voltage drivers, current sources) are implemented on one or more chips away from the array.

Although FIG. 10 illustrates the sensor readout circuit as having a two-by-two active sensor array, two reference sensors, and other described elements, it is understood that the disclosed sensor readout circuit is exemplary.

Although the measured current or charge is independent of common mode effects, it may be susceptible to noise, which affects accuracy of the sensor image measurement and clarity of the sensor image. As an example, bolometer noise can be overwhelming and the thermal image can be distorted due to noise. Noise in a bolometer array can include non-patterned noises and patterned noises. Examples of non-patterned noises include 1/f noise, thermal noise and process dependent noises in the pixels. Examples of patterned noises include row-to-row patterns and column-to-column patterns.

Figure 11:
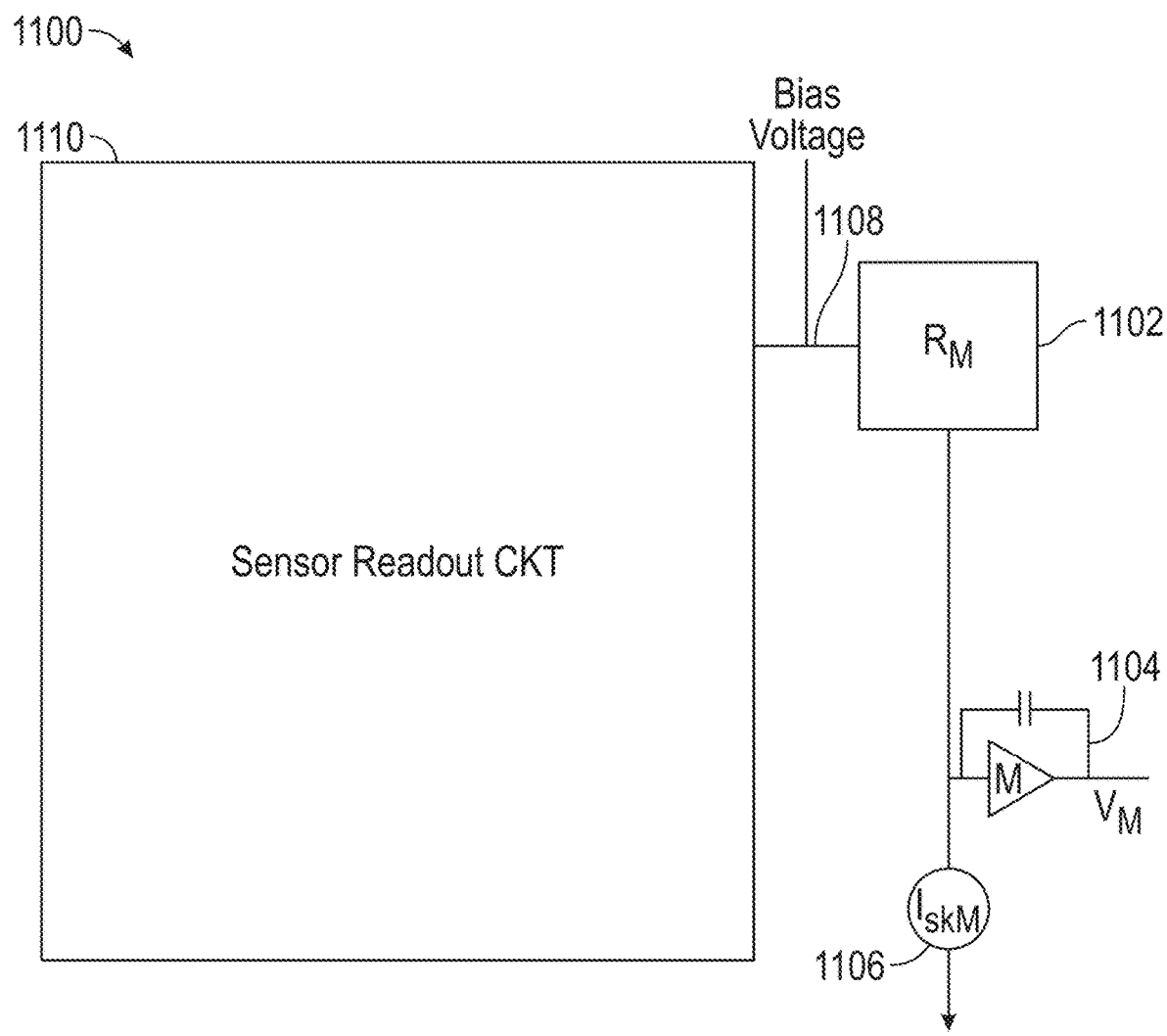
FIG. 11 illustrates a sensor calibration circuit, in accordance with an embodiment.

FIG. 11 illustrates a sensor calibration circuit, in accordance with an embodiment. In an embodiment, the sensor calibration circuit 1100 includes a calibration sensor 1102, a calibration readout element 1104, and a current source 1106. In some embodiments, the calibration readout element 1104 is substantially the same as one of readout elements 1002a or 1002b. In some embodiments, current source 1106 is substantially the same as one of the current sources 1004a, 1004b, or 1004c. Some embodiments include a method of manufacturing the circuit 1100.

The calibration sensor 1102 can include two terminals: a first terminal electrically coupled to bias voltage node 1108 of sensor readout circuit 1110 and a second terminal electrically coupled to the calibration readout element 1104 and current source 1106.

For example, the sensor readout circuit 1110 is substantially the same as sensor readout circuit 1000. The bias voltage node 1108 can be shared by active sensors of the sensor readout circuit 1110. In some embodiments, the calibration sensor is shielded from a sensor image that is exposed to active sensor elements of the sensor readout circuit 1110.

As another example, the sensor readout circuit 1110 is a bolometer readout circuit that measures a thermal image; the bolometer readout circuit includes a full array of bolometers and associated row and column readout circuitries. In this example, the calibration sensor electrically coupled to the bolometer readout circuit is a calibration bolometer.

The sensor readout circuit 1000 is merely exemplary. It is understood that the sensor readout circuit 1110 can have different configurations and components without departing from the scope of the disclosure.

In some embodiments, the impedance of calibration sensor 1102 is substantially the same as the nominal impedance of an active sensor in the calibration readout circuit 1110. In other words, the impedance ratio of the two sensors is one. In some embodiments, the impedance ratio is temperature independent. In some embodiments, the nominal impedance of a sensor is the impedance of the sensor when the sensor is not exposed to a sensor image. In some examples, the nominal impedance of the active sensor is in the range of 10 kiloohms to 100 megaohms.

In some embodiments, the calibration sensor 1102 has a higher electrical carrier count than an electrical carrier count of an active sensor (e.g., one of active sensors 1010a to 1010d) in the calibration readout circuit 1110. As an example, the calibration sensor has a higher electrical carrier count than the electrical carrier count of the active sensor if the calibration sensor has a greater quantity of electrically conductive material compared to the active sensor.

For example, the calibration sensor and the active sensor can have the same impedance while the calibration sensor has a higher electrical carrier count when the calibration sensor and the active sensor have the same aspect ratio (e.g., both are squares), but the physical dimensions of the calibration sensor are greater than those of the active sensor. In some embodiments, the calibration sensor is formed by more than one sensor; the sensors are connected in series and parallel to achieve total impedance that is substantially the same as the active sensor. Since the calibration sensor has a higher electrical carrier count, the calibration sensor has less 1/f noise compared to an active sensor.

In some embodiments, the calibration sensor and the active sensor are fabricated from materials having a same temperature coefficient of resistance (TCR). In some embodiments, the calibration sensor and active sensors are created from one or more of amorphous silicon, vanadium oxide, platinum, titanium, titanium oxide, tungsten oxide, and molybdenum. In some examples, the calibration sensor and the active sensor are fabricated from a substantially same material.

In some embodiments, the calibration readout element is an analog-to-digital converter (ADC). For example, the calibration readout element is an ADC that is substantially the same as an ADC electrically coupled to a column of the active sensors.

In some embodiments, the calibration readout circuit 1100 is used to calibrate for noise in the measurement of active sensors. Specifically, the calibration readout circuit 1100 is used to calibrate the measurement for row-to-row pattern noises, which are noises that varies from one row to another.

In an exemplary sensor calibration, during readout time, the readout voltages of selected active sensors (e.g., sensors of a selected row) and the readout voltage of the calibration sensor are measured with respective readout elements. As described, the readout voltages of selected active sensors are generated by currents caused by the active sensor's exposure to a sensor image. In some embodiments, the readout voltage of the calibration sensor is created by a current traversing between the first and second terminals of the calibration sensor and is measured by the calibration readout element 1104. The current is generated from current source 1106.

After the readout voltages of the selected active sensors and the readout voltage of the calibration sensor are measured, a calibrated readout voltage can be computed for a $j^{th}$ column while the $i^{th}$ row is being measured:

$$A_{cal,ij}(t) = A_{sij}(t) - A_{iM}(t)\frac{Z_M}{Z_{sij}} \tag{14}$$

The index (i, j) is associated with a specific active sensor of the selected sensors. For example, the sensors of the $i^{th}$ row are being selected for readout and each of the selected sensors corresponds to a $j^{th}$ column. Although the index (i,j) is used to described an exemplary sensor, it is understood that the subscripts can be used to describe any active sensor.

The quantity $A_{cal,ij}$ is the calibrated readout voltage associated with sensor (i,j)'s exposure to a sensor image. The quantity $A_{s,ij}$ is the (non-calibrated) readout voltage of sensor (i, j) at a respective readout element of the $j^{th}$ column. The quantity $A_{iM}$ is the readout voltage of the calibration sensor when the bias voltage node is driven with a bias voltage associated with the reference sensor of $i^{th}$ row (e.g., bias voltage associated with the common mode conditions of the $i^{th}$ row). $Z_M$ is the impedance of the calibration sensor, and $Z_{sij}$ is the nominal impedance of the sensor (i,j) (e.g., when shielded from the sensor image). In some embodiments, the two impedances are substantially equal, so the factor $(Z_M/Z_{sij})$ is one.

By including simple parameters such as the calibration sensor's impedance and its readout voltage, equation (14) removes undesired row-to-row pattern noises, such as noise in the bias voltage, from the active sensor readout voltage. The inclusion of the calibration sensor, an associated readout element, and an associated current source may be important for deriving a measurement that is free of row-to-row pattern noises. Without these elements and equation (14), the bias voltage may not be measured directly and the effects of bias voltage noise may not be correctly captured, because, due to pixel self-heating, the bias voltage is a time varying voltage during ADC conversion time. Since undesired bias voltage effect can be removed for each row, the need to calibrate the skimming current sources can be eliminated, reducing the complexity of the readout circuit.

The exemplary sensor calibration shows how a selected row of sensors during readout can be calibrated with the calibration sensor, removing undesired row-to-row pattern noises, such as bias voltage noise. In some embodiments, the described method is repeated for other selected rows during readout. For example, after a selected first row of sensors is calibrated with the calibration sensor electrically coupled to a reference sensor of the first row (e.g., reference sensor 1008a) (i.e., bias voltage associated with the common mode conditions of the first row), the first row of sensors is deselected and a second row of sensors is selected for readout. The selected second row of sensors is calibrated with the calibration sensor, which is now electrically coupled to a reference sensor of the second row (e.g., reference sensor 1008b) (i.e., bias voltage associated with the common mode conditions of the second row). Row-to-row pattern noises, such as bias voltage noise associated with the second row, can be removed in a similar manner as described.

While more than one row of sensors can be calibrated during readout and every row of sensors can be calibrated during readout, calibration may not be necessary for an entire sensor array. For example, a subset of all rows can be calibrated with the calibration sensor. The frequency of calibration with the calibration sensor may depend on noise characteristics of the system or environment.

Figure 12:
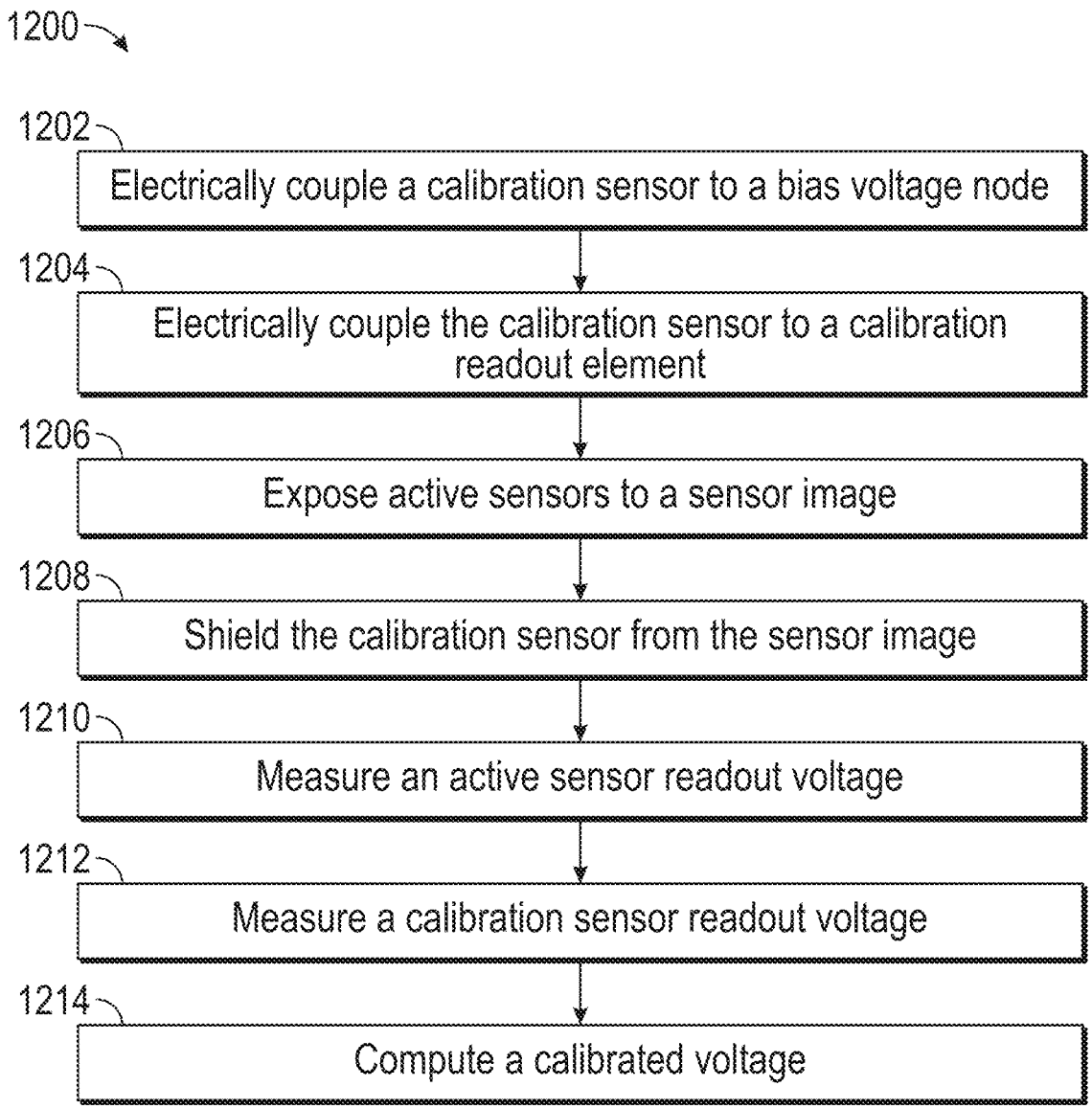
FIG. 12 illustrates a method of sensor calibration according to examples of the disclosure.

FIG. 12 illustrates a method 1200 of sensor calibration, in accordance with an embodiment. Method 1200 includes electrically coupling a first terminal of a calibration sensor to a bias voltage node shared by a plurality of active sensors (step 1202). For example, referring to FIG. 11, the calibration sensor 1102 is electrically coupled to bias voltage node 1108.

Method 1200 includes electrically coupling a second terminal of the calibration sensor to a calibration readout element (step 1204). For example, referring to FIG. 11, the calibration sensor 1102 is electrically coupled to the calibration readout element 1104.

Method 1200 includes exposing the plurality of active sensors to a sensor image (step 1206). For example, referring to FIG. 11, a plurality of active sensors in sensor readout circuit 1110 is exposed to a sensor image.

Method 1200 includes shielding the calibration sensor from the sensor image (step 1208). For example, referring to FIG. 11, the calibration sensor 1102 is shielded from the sensor image.

Method 1200 includes measuring, with a readout element, a readout voltage of an active sensor of the plurality of active sensors (step 1210). For example, referring to FIG. 11, $A_{sij}$, the non-calibrated readout voltage of sensor (i, j), is measured.

Method 1200 includes measuring, with the calibration readout element, a readout voltage of the calibration sensor (step 1212). For example, referring to FIG. 11, the readout voltage of calibration readout element 1104 is measured.

Method 1200 includes computing a calibrated voltage (step 1214). For example, the calibrated voltage is computed as a difference between (1) the readout voltage of the active sensor and (2) the readout voltage of the calibration sensor weighted by a ratio between an impedance of the calibration sensor and an impedance of the active sensor. For example, referring to FIG. 11 and equation (14), the quantity $A_{cal,ij}$ is computed based on the measured quantities and sensor impedances.

In some embodiments, the impedance of the calibration sensor is the same as the impedance of the active sensor, and an electrical carrier count of the calibration sensor is greater than an electrical carrier count of the active sensor. In some embodiments, the ratio is one. In some embodiments, the ratio is temperature independent.

In some embodiments, the calibration sensor and the active sensor are made from materials having a same TCR.

In some embodiments, the method 1200 includes electrically coupling a current source of a plurality of current sources to the second terminal of the calibration sensor and to the calibration readout element; electrically coupling a column of a plurality of columns of active sensors to the readout element, the column of active sensors including the active sensor; and electrically coupling a second current source of the plurality of current sources to the readout element. For example, referring to FIGS. 10 and 11, current source 1106 is electrically coupled to calibration readout element 1104, a column of active sensors is electrically coupled to a readout element in the sensor readout circuit 1000, and a current source is electrically coupled to a readout element in the sensor readout circuit 1000.

In some embodiments, the method 1200 includes closing a shutter; measuring, with the readout element, a first readout voltage corresponding to the closed shutter; and measuring, with the calibration readout element, a second readout voltage corresponding to the closed shutter; and after computing the calibrated voltage, computing a second difference between (1) the calibrated voltage and a difference between (2a) the first readout voltage and (2b) the second readout voltage weighted by the ratio, where the second difference is a shutter calibrated voltage. Examples of these embodiments will be described below with reference to equations (22) and (23).

In some embodiments, the calibration readout element includes an ADC. In some embodiments, the readout element includes an ADC.

In some embodiments, the plurality of active sensors and the calibration sensor are bolometers, and the sensor image is a thermal image.

Figure 13:
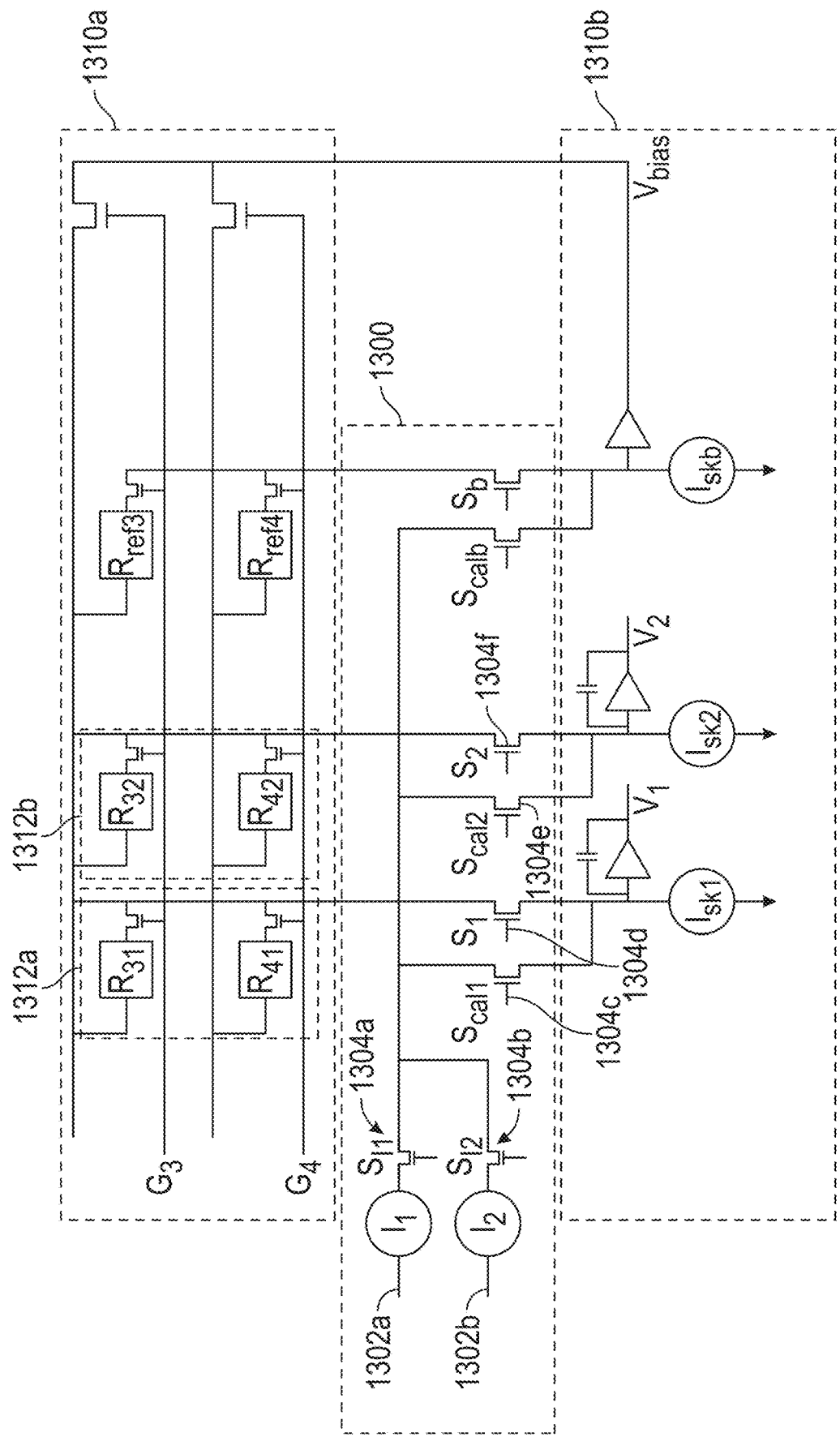
FIG. 13 illustrates a sensor calibration circuit, in accordance with an embodiment.

FIG. 13 illustrates a sensor calibration circuit, in accordance with an embodiment. In an embodiment, the sensor calibration circuit 1300 includes calibration current sources 1302a and 1302b and switches 1304a to 1304f. Some embodiments include a method of manufacturing the circuit 1100.

The sensor calibration circuit 1300 is electrically coupled to sensor readout circuit 1310, which includes sections 1310a and 1310b. In some examples, the sensor readout circuit 1310 is sensor readout circuit 1000.

The switches 1304c and 1304d are associated with a first column 1312a of active sensors. The switches 1304e and 1304f are associated with a second column 1312b of active sensors, different from the first column. The switches 1304c and 1304e can electrically couple or electrically uncouple the calibration current source and a readout element of the column. The switches 1304d and 1304f can electrically couple or electrically uncouple active sensors of their respective column and a readout element of the column (e.g., readout elements 1002a and 1002b). In some embodiments, the readout element is an ADC.

It is understood that the sensor readout circuit 1000 is merely exemplary and any number of columns and any number of switches can electrically couple or uncouple the calibration current source or active sensors and the active sensor columns. Although the columns of sensors are symbolically included in a box that represents sensor readout circuit 1310 and the calibration circuit 1310 is symbolically illustrated outside the representative box, it is understood that the term "column" is not necessarily arranged in a straight line. In some embodiments, a column of sensors is associated with one readout element. A column of sensors can come in any shape or form without departing from the scope of the disclosure.

The switches 1304a and 1304b can electrically couple the current sources 1302a and 1304b, respectively, and a column that is under calibration. In an embodiment, the switches 1302a and 1304b electrically couple one of the current sources and the sensor columns at a time.

Although transistor symbols are used to visually represent the switches, it is understood that other implementations of switching can exist without departing from the scope of the disclosure.

Although FIG. 13 illustrates the sensor calibration circuit 1300 as having two current sources and two associated switches, it is understood that any number of calibration current sources and associated switches can exist without departing from the scope of the disclosure. In another embodiment, the sensor calibration circuit 1300 has one calibration current source and one associated switch.

In an exemplary sensor calibration, a first column is in calibration mode; a readout element of the first column is electrically coupled to a first calibration current source of the calibration current sources.

For example, the column 1312a is in calibration while a first row of sensors is being readout. Switch 1304c is closed (conducting) and switch 1304d is opened (non-conducting). A first calibration current of the calibration current sources (e.g., calibration current source 1302a through switch 1304a or calibration current source 1302b through switch 1304b) is electrically coupled to the readout element of the first column (e.g., readout element 1002a).

While the first column is in calibration, columns that are not in calibration are in the readout mode. The readout elements of the columns in the readout mode are electrically coupled to selected active sensors of the respective columns.

For example, the column 1312b is in readout mode while the first row of sensors is being readout. Switch 1304e is opened (non-conducting) and switch 1304f is closed (conducting). The currently selected active sensor (e.g., active sensor 1010b) is electrically coupled to the column's readout element (e.g., readout element 1002b).

The readout voltages of the columns (i.e., the columns in readout mode and the column in calibration) are measured. The readout voltage caused by the first calibration current (e.g., readout voltage of the column electrically coupled to calibration current source 1302a or calibration current source 1302b, readout voltage of readout element 1002a) can be denoted as $A_{1j}(t)$.

During the readout of the first row, at a second time, the first column may still be in calibration, and the other columns may still be in the readout mode. At this time, the readout element of the first column is electrically uncoupled from the first calibration current source and electrically coupled to a second current source of the calibration current sources.

For example, at this second time, the column 1312a is in calibration mode while a first row of sensors is being readout. Switch 1304c is closed (conducting), and switch 1304d is opened (non-conducting). A second calibration current source of the calibration current sources (e.g., calibration current source 1302b through switch 1304b or calibration current source 1302a through switch 1304a) is electrically coupled to the readout element of the first column (e.g., readout element 1002a). The readout voltage caused by the second calibration current (e.g., from calibration current source 1302a or calibration current source 1302b), can be denoted as $A_{2j}(t)$. In some embodiments, since the values of the first and second calibration currents are known, the values $A_{1j}(t)$ and $A_{2j}(t)$ capture a drift of the respective readout element (e.g., readout element 1002a).

With the measurement of $A_{1j}(t)$ and $A_{2j}(t)$, readout voltage of any active sensor in the calibrated column can be calibrated. The readout voltage of the active sensor can be denoted as $A_{sij}(t)$, where an active sensor associated with the $i^{th}$ row and $j^{th}$ column is being measured.

In this particular example, during this particular time, since the selected active sensor of the calibrated column (e.g., active sensor 1010a) is not electrically coupled to the readout element, the current readout voltage of this sensor is not measured (e.g., readout voltage associated with active sensor 1010a). In some embodiments, a previous value of $A_{sij}$ or an interpolated value based on adjacent sensors is used for $A_{sij}(t)$.

In other embodiments, a current readout voltage $A_{sij}(t)$ is measured even when a column is being calibrated; the calibration current sources are electrically uncoupled from the readout element and the active sensor is electrically coupled to the readout element, where the current readout voltage of the active sensor is measured.

With the measurements of the terms $A_{sij}(t)$, $A_{1j}(t)$, and $A_{2j}(t)$, an output $D_{sij}(t)$ can be computed for a column $j^{th}$ while the $i^{th}$ row is being measured:

$$D_{sij}(t) = \frac{A_{sij}(t) - (A_{1j}(t) + A_{2j}(t))/2}{A_{2j}(t) - A_{1j}(t)} \tag{15}$$

Where the quantity $D_{sij}(t)$ is a term that is linear to the current into the readout element of a column j (e.g., the current caused by the sensor image, as described). Since equation (15) accounts for the drift in the readout element, the term is independent of effects such as ADC gain, offset, skimming currents, and any time-varying quantities except I(t), which is the current into a respective readout element. In some embodiments, the quantity $D_{sij}(t)$ is a stabilized digital output, which is a stabilized version of an output of a readout element (e.g., an ADC).

$$D(t) = \frac{A_1(t) - (A_1(t) + A_2(t))/2}{A_2(t) - A_1(t)} = \frac{I(t) - \bar{I}}{\Delta I} \tag{16}$$

Where:

$$\bar{I} = \frac{I_1 + I_2}{2} \tag{17}$$

$$\Delta I = I_2 - I_1 \tag{18}$$

$I_1$ is the first calibration current. $I_2$ is the second calibration current.

In some embodiments, since the column has been calibrated, in subsequent row readouts (e.g., selection of the second row for readout), the quantities $A_{1j}(t)$ and $A_{2j}(t)$ are used to compute subsequent outputs corresponding to subsequent rows of the column that are being read out, until the column is calibrated again (i.e., $A_{1j}(t)$ and $A_{2j}(t)$ are updated).

For example, a second row (e.g., active sensors 1010c-1010d) is being selected for readout and the first column is no longer being calibrated (since the quantities $A_{1j}(t)$ and $A_{2j}(t)$ corresponding to the first column have been measured). In this example, the column 1312a is in readout mode while the second row of sensors is being readout. Switch 1304c is opened (non-conducting), and switch 1304d is closed (conducting). The currently selected active sensor (e.g., active sensor 1010c) is electrically coupled to the column's readout element (e.g., readout element 1002a). As such, during the second row readout time, the term $A_{sij}(t)$ is the readout voltage of the active sensor 1010c. With the measurements of the terms $A_{sij}(t)$, $A_{1j}(t)$, and $A_{2j}(t)$, an output $D_{sij}(t)$ can be computed for the active sensor of the first column and second row. Generally, after the quantities $A_{1j}(t)$ and $A_{2j}(t)$ have been measured, the output $D_{sij}(t)$ can be computed for any active sensor of the column using equation (15) when a respective sensor is being readout.

By including the calibration current sources and measuring readout voltages of the columns, an output $D_{sij}(t)$ is computed. The quantity $D_{sij}(t)$ can be linearly proportional to the active sensor current (i.e., current caused by the sensor image), free of any other time-varying or column-dependent noise parameter. Equation (15) removes undesired column-to-column pattern noises, such as mismatches between skimming currents, ADC gains, and ADC offsets. In addition, these undesired noises can be removed while the active sensors are being readout. In other words, the configuration described with respect to FIG. 4 can allow calibration and readout to be performed in parallel. Therefore, under this configuration, dedicated calibration time (i.e., no readout while calibration is being performed) may not be needed and more rows can be readout during a given amount of time, improving performance and accuracy of the readout circuit.

The inclusion of the calibration currents (e.g., calibration current sources 1302a and 1302b) and associated switches (e.g., switches 1304a, 1304b, 1304c, and 1304e) can be used for deriving a quantity (e.g., the output) that can be free of column-to-column pattern noises while readout is being concurrently performed. Without these elements and equation (15), column-dependent noises, such as skimming current mismatches, ADC gain mismatches, and ADC offset mismatches, may be reflected on the sensor image, distorting the clarity of the sensor image or dedicated calibration time would be needed to remove these noises, degrading the performance of the readout circuit.

In some embodiments, one calibration current source (e.g., calibration current source 1302a or 1302b) is used for calibration, instead of two calibration current sources. In these embodiments, only the steps associated with the first calibration current source are performed (i.e., with one calibration current source, the steps associated with the second time of a row readout time are not performed). For example, when a column is in calibration with one calibration current source, a readout element of the column is electrically coupled to only one of the calibration current sources.

For example, the column 1312a is in calibration mode while a first row of sensors is being readout. Switch 1304c is closed (conducting), and switch 1304d is opened (non-conducting). A first calibration current of the calibration current sources (e.g., calibration current source 1302a through switch 1304a or calibration current source 1302b through switch 1304b) is electrically coupled to the readout element of the first column (e.g., readout element 1002a).

While the column is in calibration, columns that are not in calibration mode are in the readout mode. The readout elements of the columns in the readout mode are electrically coupled to selected active sensors of the respective columns.

For example, the column 1312b is in readout mode while the first row of sensors is being readout. Switch 1304e is opened (non-conducting), and switch 1304f is closed (conducting). The currently selected active sensor (e.g., active sensor 1010b or 1000d) is electrically coupled to the column's readout element (e.g., readout element 1002b).

During this time, the readout voltages of the columns (i.e., the columns in readout mode and the column in calibration) are measured. The readout voltage caused by the calibration current (e.g., readout voltage of the column electrically coupled to calibration current source 1302a or calibration current source 1302b, readout voltage of readout element 1002a) can be denoted as $A_j(t)$. $A_{sij}(t)$ can be measured in the same manner as described (i.e., interpolated with adjacent sensors or estimated with a previous measurement when the respective column is in calibration; active sensor readout voltage is measured when the respective column is in readout mode).

Using one calibration current, with the measurements of the terms $A_{sij}(t)$ and $A_j(t)$, an output $D_{sij}(t)$ can be computed for a column $j^{th}$ while the $i^{th}$ row is being measured:

$$D_{sij}(t)=A_{sij}(t)-A_j(t) \qquad (19)$$

The method associated with equation (19) removes the effect of ADC mismatches in a simpler manner compared to the method associated with equation (15) (e.g., less measurements, less required elements, simpler computation).

The above calibration methods with the calibration current(s) can be performed throughout the sensor readout circuit during readout. The exemplary methods can be repeated by putting different columns in calibration.

For example, during readout time, a first row is selected for readout. A first column is in the calibration mode, as described, while the remaining columns are in the readout mode; the quantities $A_{1j}(t)$ and $A_{2j}(t)$ associated with the first column are measured and outputs D(t) associated with the active sensors of the column can be computed using the method as described.

After the readout of the first row is complete, a second row is selected for readout. A second column is in calibration, which is similar to how the first column is calibrated, as described. The remaining columns (e.g., columns other than the second column) are in the readout mode, which is similar to that of the method as described.

During the calibration of the second column, the quantities $A_{1j}(t)$ and $A_{2j}(t)$ associated with the second column are measured (e.g., readout voltages caused by the first calibration current and the second calibration current on the readout element 1002b) and outputs D(t) associated with the active sensors of the second column can be computed using the method as described (i.e., interpolated with adjacent sensors or estimated with a previous measurement when the respective column is in calibration; active sensor readout voltage is measured when the respective column is in readout mode).

In some embodiments, generally, after a column is calibrated (i.e., the quantities $A_{1j}(t)$ and $A_{2j}(t)$ associated with the column are measured), outputs D(t) associated with the active sensors of the column can be computed using the method as described (i.e., a respective active sensor readout voltage (e.g., $A_{sij}(t)$) is measured; since $A_{1j}(t)$ and $A_{2j}(t)$ are known after calibration, the terms can yield corresponding outputs $D_{sij}(t)$).

In this example, different columns are calibrated during subsequent row readouts. However, it is understood that same columns can be repeatedly calibrated. It is also understood that calibration may not be necessary during readout of every row. It is understood that the frequency of calibration mode activation may depend on system requirements or the noise environment without departing from the scope of the disclosure. Although one column is being calibrated during each row readout time, it is understood that more than one column may be calibrated without departing from the scope of the disclosure. For example, the quantities $A_{1j}(t)$ and $A_{2j}(t)$ may be measured for multiple columns during a row readout time and the multiple columns are calibrated during one row readout time.

In some embodiments, the calibration mode is enabled periodically. In some embodiments, for a particular column, the calibration period is defined by a time between a first calibration of the particular column and subsequent calibration of the particular column (i.e., time between updates of $A_{1j}$ and/or $A_{2j}$ for the particular column). In some embodiments, the calibration period is determined by a drift of the readout element. For example, if the readout element drifts quickly, the calibration period is short. In another example, if the readout element drifts slowly, the calibration period is long.

In some embodiments, during the successive calibrations of the particular column, the column is calibrated when different rows are being readout. For example, during a first calibration time, a first column is calibrated when a first row is being readout; during a second calibration time, the first column is calibrated when a second row is being readout. In this manner, a same active sensor's actual readout voltage would not be always left out (e.g., would not always being estimated with a previous value or an interpolated value). For example, if the first column is always being calibrated during the first row readout time, then the current readout voltage of the active sensor of the first column and first row would always be interpolated with adjacent active sensors or estimated with previous readout voltages.

In some embodiments, calibration mode is enabled every one second. In some embodiments, calibration mode frequency is determined by noise characteristics of the sensor readout circuit. In some embodiments, the column selected for calibration mode is based on noise characteristics of the sensor readout circuit.

Figure 14:
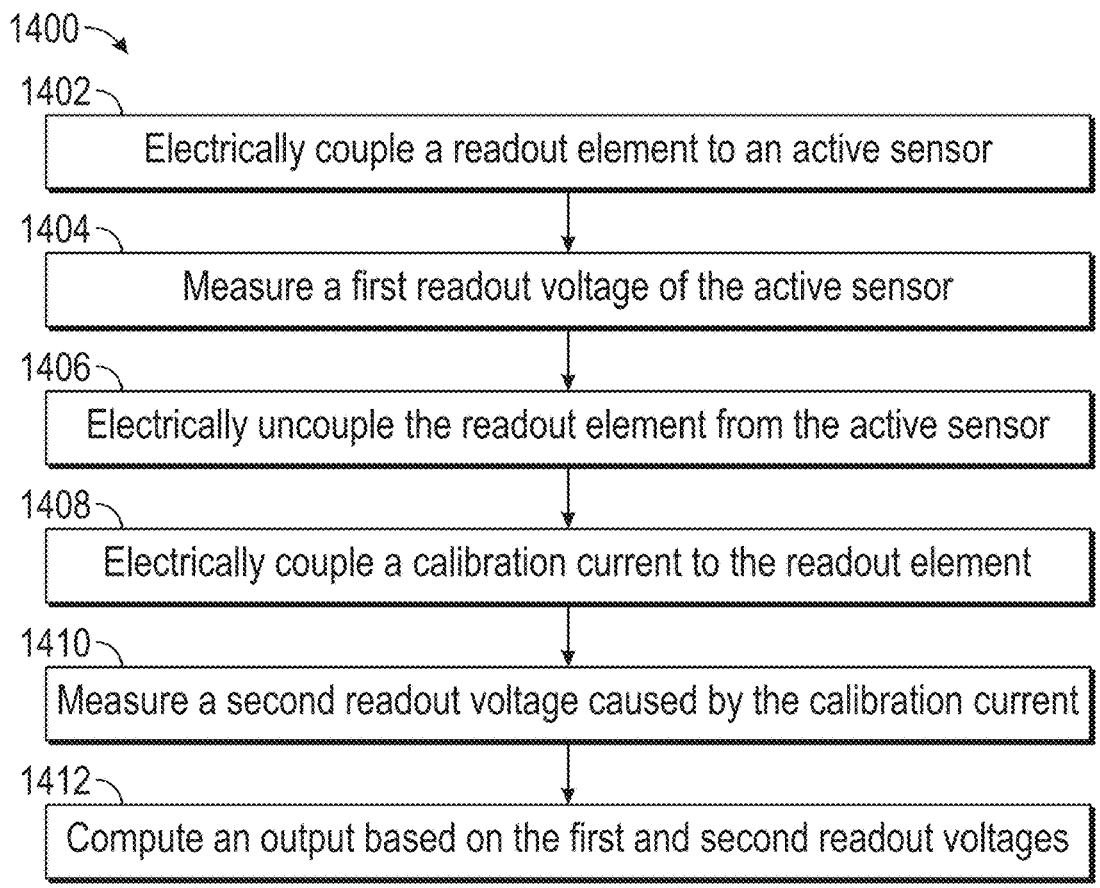
FIG. 14 illustrates a method of sensor calibration, in accordance with an embodiment.

FIG. 14 illustrates a method 1400 of sensor calibration, in accordance with an embodiment. Method 1400 includes electrically coupling a readout element to an active sensor (step 1402). For example, referring to FIG. 13, a readout element of sensor readout circuit 410 is electrically coupled to an active sensor of sensor readout circuit 1310.

Method 1400 includes measuring, with the readout element, a first readout voltage of the active sensor (step 1404). For example, referring to FIG. 13 and equations (15) and (19), a first readout voltage (e.g., $A_{sij}(t)$) is measured with the readout element.

Method 1400 includes electrically uncoupling the readout element from the active sensor (step 1406). For example, referring to FIG. 13, the readout element of sensor readout circuit 1310 is electrically uncoupled from the active sensor of sensor readout circuit 1310.

Method 1400 includes electrically coupling a calibration current to the readout element (step 1408). For example, referring to FIG. 13, calibration current 1302a or calibration current 1302b is electrically coupled to the active sensor of sensor readout circuit 1310.

Method 1400 includes measuring, with the readout element, a second readout voltage caused by the calibration current (step 1410). For example, referring to FIG. 13 and equations (15) and (19), a second readout voltage (e.g., $A_j(t)$, $A_{1j}(t)$) is measured with the readout element.

Method 1400 includes computing an output based on (1) the first readout voltage and (2) the second readout voltage (step 1412). In some examples, the output is proportional to a readout current of the active sensor. For example, referring to equations (15) and (19), the output D(t) is computed based on the first and second readout voltages.

In some embodiments, the method 1400 includes electrically coupling a respective active sensor of a plurality of active sensors to a respective readout element of a plurality of readout elements; measuring, with the respective readout element, a first readout voltage of the respective active sensor; electrically uncoupling the respective readout element from the respective active sensor; electrically coupling the calibration current to the respective readout element; measuring, with the respective readout element, a second readout voltage caused by the calibration current on the respective readout element; and computing an output proportional to a readout current of the respective active sensor based on (1) the first readout voltage of the respective active sensor and (2) the second readout voltage caused by the calibration current. For example, referring to FIG. 4, a column 1312b is calibrated (i.e., $A_j(t)$ associated with column 1312b is measured, the drift of the column is measured) after column 1312a is calibrated (i.e., $A_j(t)$ associated with column 1312a is measured, the drift of the column is measured).

In some embodiments, the method 1400 includes, after computing the first output: electrically uncoupling the calibration current source from the readout element; electrically coupling the readout element to a second active sensor, the second active sensor belonging to a same column as the first active sensor; measuring, with the readout element, a third readout voltage of the second active sensor; and computing a second output proportional to a readout current of the second active sensor based on (1) the third readout voltage and (2) the second readout voltage caused by the calibration current. For example, referring to FIG. 13, after output D(t) is computed for a first row on column 1312a (i.e., the drift of the column is measured), an output D(t) associated with a second row on column 1312a can be computed based on $A_j(t)$ and readout voltage of the active sensor on the second row.

In some embodiments, a time between successive measurements of the second readout voltage on the same column caused by the calibration current is a calibration period. In some embodiments, the calibration period is one second. In some embodiments, the calibration period is based on a drift of the readout element.

In some embodiments, different rows are being readout during the successive measurements of the second readout voltage. For example, referring to FIG. 13, the quantity $A_j(t)$ is measured at a first time for column 1312a when a first row is readout. At a subsequent time, the quantity $A_j(t)$ is measured for column 1312a when a second row, different from the first row, is readout.

In some embodiments, the method 1400 includes electrically uncoupling the readout element from the first calibration current source; electrically coupling the readout element to a second calibration current source; and measuring, with the readout element, a third readout voltage caused by the second calibration current on the readout element, where the output is further based on the third readout voltage caused by the second calibration current. For example, referring to FIG. 13 and equation (15), both calibration currents 1302a and 1302b are used to measure the quantities $A_{1j}(t)$ and $A_{2j}(t)$, and the output D(t) is based on the quantities $A_{1j}(t)$ and $A_{2j}(t)$.

In some embodiments, the readout element includes an ADC.

In some embodiments, the method 1400 includes closing a shutter; computing the output corresponding to a closed shutter; and computing a difference proportional to an impedance difference of the active sensor caused by a sensor image between (1) the output corresponding to an opened shutter and (2) the output corresponding to the closed shutter. Examples of these embodiments will be described below with reference to equations (22) and (23).

In some embodiments, the first active sensor is a bolometer exposed to a thermal scene.

Figure 15:
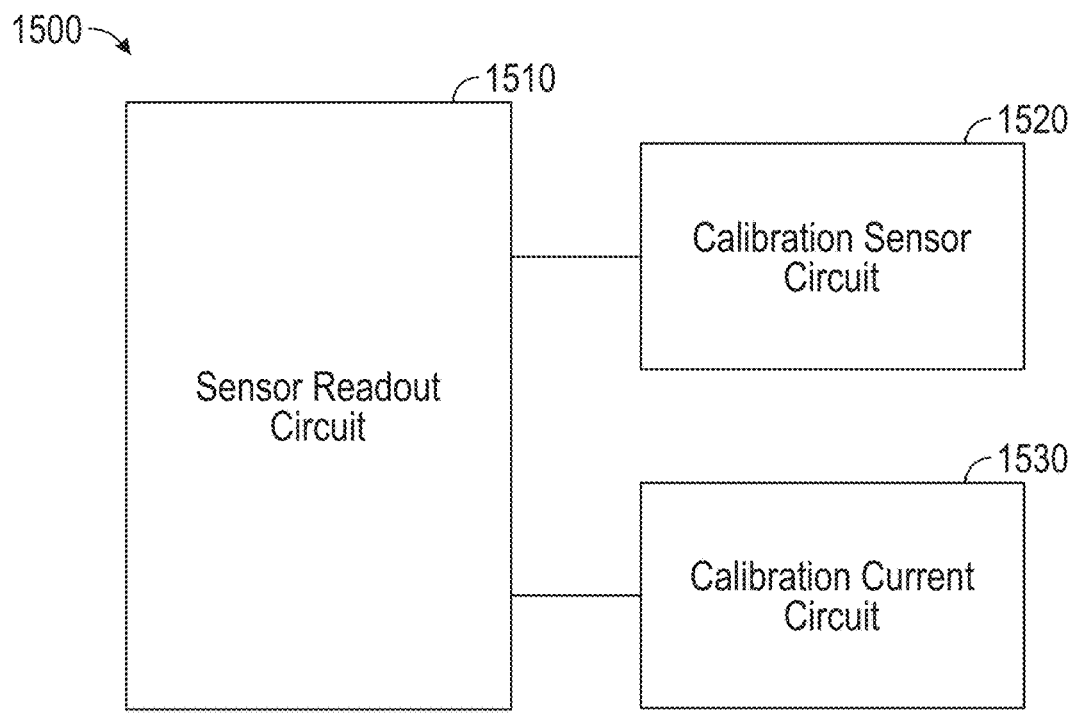
FIG. 15 illustrates a sensor calibration circuit, in accordance with an embodiment.

FIG. 15 illustrates a sensor calibration circuit, in accordance with an embodiment. The calibration circuit 1500 includes calibration sensor circuit 1520 and calibration current circuit 1530. In some embodiments, the calibration circuit 1500 is a combined circuit that performs the calibration methods as described. For example, calibration sensor circuit 1520 can be similar to sensor calibration circuit 1100. Calibration current circuit 1530 can be similar to calibration current circuit 1300. The calibration circuit 1500 is electrically coupled to sensor readout circuit 1510. In some embodiments, the sensor readout circuit 1510 can be substantially similar to sensor readout circuit 1000. It is understood that readout circuit 1510 can include a sensor array of any size and corresponding readout circuities without departing from the scope of the disclosure. Some embodiments include a method of manufacturing the circuit 1500.

Figure 16:
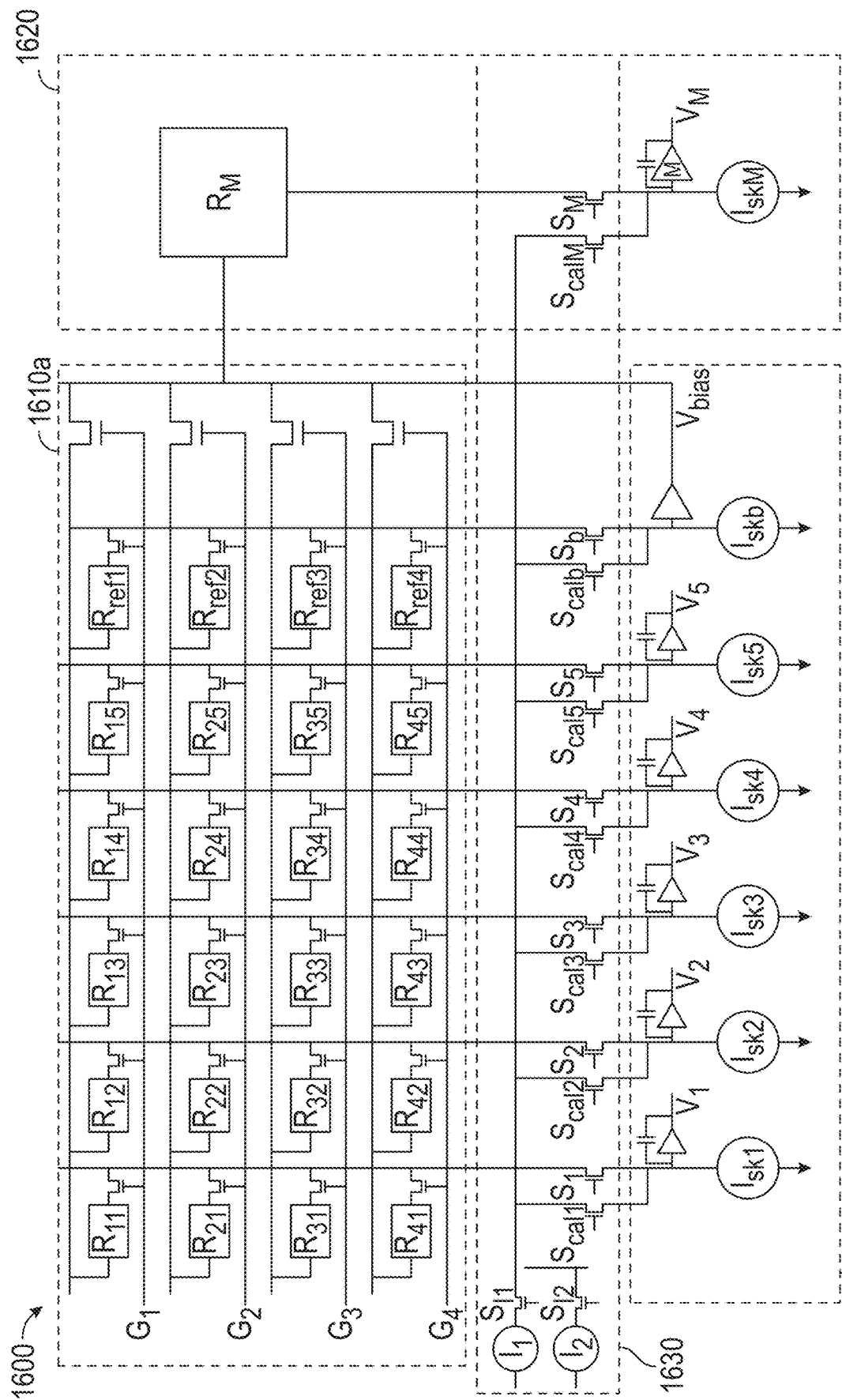
FIG. 16 illustrates a sensor calibration circuit, in accordance with an embodiment.

FIG. 16 illustrates a sensor calibration circuit, in accordance with an embodiment. For example, sensor calibration circuit 1600 is an embodiment of the sensor calibration circuit 1500. The sensor calibration circuit 1600 includes calibration sensor circuit 1620 and calibration current circuit 1630. The sensor calibration 1600 is electrically coupled to sensor readout circuit 1610, which includes section 1610*a* and 1610*b*, as shown. It is understood that FIG. 16 is illustrative and its elements are symbolic. Other configurations of the sensor calibration circuit 1600 and connections between the sensor calibration circuit and the sensor readout circuit 1610 can exist without departing from the scope of the disclosure. Some embodiments include a method of manufacturing the circuit 1600.

Although some sections of the circuits are illustrated with dashed boxes, it is understood that the dashed boxes are merely added for clarity and are not meant to be limiting.

In some embodiments, the combined calibration circuit (e.g., sensor calibration circuit 1600) concurrently performs the calibration methods associated with FIGS. 11 and 13. For example, while a selected row of sensors is being readout, a calibration sensor is used to calibrate the bias voltage associated with the selected row and the calibration currents are used to calibrate the ADCs and skimming currents for particular column(s). The combined calibration using the calibration sensor and calibration currents includes substantially the same steps as each of the individual methods as described. For the sake of brevity, the similar steps are not repeated here.

Using substantially the same method as described, an output associated with the calibration sensor is computed:

$$D_{iM}(t) = \frac{A_{iM}(t) - (A_{M1}(t) + A_{M2}(t))/2}{A_{M2}(t) - A_{M1}(t)} \quad (20)$$

Where the terms $A_{M1}(t)$ is the readout voltage of the calibration readout element when the first calibration current is electrically coupled to the calibration readout element and $A_{M2}(t)$ is the readout voltage of the calibration readout element when the second calibration current is electrically coupled to the calibration readout element. In some embodiments, since calibrating the calibration readout element precludes the bias voltage from being calibrated (i.e., the calibration sensor is electrically uncoupled from the calibration readout element), a blank row readout time (e.g., one row readout time delay) can be used to make the $A_{M1}(t)$ and $A_{M2}(t)$ measurements by electrically coupling and uncoupling the respective calibration current to the calibration readout element. In some embodiments, the bias voltage is calibrated before the calibration sensor is electrically uncoupled from the calibration readout element to make the $A_{M1}(t)$ and $A_{M2}(t)$ measurements.

In the combined sensor calibration method, equations (15) and (20) can be combined into equation (14). For the sake of brevity, the terms associated with these equations are not described again. In another embodiment, when one calibration current is used, equation (20) is reduced to be substantially similar to equation (19) in a similar manner that equation (20) is derived from equation (15).

$$P_{ij} = (D_{sij}(t)) - (D_{iM}(t))\frac{Z_M}{Z_{sij}} \cong -\frac{1}{\Delta I}\frac{V_{baisi}}{R_{ij}}\frac{\Delta R_{ij}}{R_{ij}} \quad (21)$$

Since the term $P_{ij}$ is computed by combining the calibration sensor and calibration current methods, the term $P_{ij}$ is free of both row-to-row and column-to-column pattern noises. The sensor calibration circuit 1600 includes the benefits associated with sensor calibration circuit 1100 and sensor calibration circuit 1300, as described.

In some embodiments, a shutter can be added to supplement the described sensor readout circuits (e.g., sensor readout circuit 1000) to remove noises associated with sensor variation and 1/f noise.

For example, at t=0, the shutter closes, temporarily shielding the active sensors from the sensor image. Readout voltages of each column are measured when the shutter is closed. The readout voltages measured while the shutter is closed can be denoted as $A_{sij}(0)$. At a different time (e.g., at time t), the shutter opens, exposing the active sensors to the sensor image. Readout voltages of each column are measured when the shutter is opened. The readout voltages measured while the shutter is opened can be denoted as $A_{sij}(t)$.

With $A_{sij}(t)$ and $A_{sij}(0)$, the impedance change caused by the sensor image (e.g., $\Delta Z_{ij}$) can be computed:

$$A_{sij}(t) - A_{sij}(0) \cong -g\frac{V_{biasi}}{Z_{ij}}\frac{\Delta Z_{ij}}{Z_{ij}(t)} \quad (22)$$

Where g is the gain of the readout element associated with measurements, $V_{biasi}$ is the bias voltage associated with the reference sensor of the $i^{th}$ row (i.e., the currently selected row), and $Z_{ij}(t)$ is the absolute impedance of sensor (i,j) when $A_{sij}(t)$ is measured (e.g., when the shutter is opened).

Shutter calibration can remove noise patterns due to sensor variation and reset 1/f noise associated with the sensors and circuit elements. In some embodiments, sensor requirements determine the frequency of the shutter. For example, a sensor requirement is bolometer pixel noise equivalent temperature difference (NETD).

In some embodiments, the described shutter calibration method is combined with the sensor calibration method associated with any of FIGS. 11, 13, 15, and 16. For the sake of brevity, the combination of the shutter calibration method and sensor calibration methods associated with FIGS. 15 and 16 is expressively described. A person of ordinary skill in the art would recognize that computations associated with combinations of the calibration methods that are not explicitly disclosed can be easily derived from the disclosure and are within the scope of the disclosure.

In some embodiments, when the shutter is closed, the calibration quantities associated with the active sensors (e.g., equation (15), $D_{sij}(0)$) and calibration sensor (e.g., equation (20), $D_{iM}(0)$) are computed. As such, equations (21) and (22) are combined to compute the quantity $P_{ij}$, which is associated with shutter calibration, the calibration sensor, and the calibration currents.

$$P_{ij} = (D_{sij}(t) - D_{sij}(0)) - (D_{iM}(t) - D_{iM}(0))\frac{Z_M}{Z_{sij}} \quad (23)$$

Equation (23) yields the term $P_{ij}$, which is substantially proportional to changes in the sensor image (i.e., change in active sensor impedance, $\Delta Z_{ij}$). For example, the sensors are bolometers and the sensor image is incoming thermal radiation.

$$P_{ij} \cong -\frac{1}{\Delta I}\frac{V_{biasi}}{Z_{ij}}\frac{\Delta Z_{ij}}{Z_{ij}} \quad (24)$$

In some embodiments, the combined shutter calibration, calibration sensor, and calibration current method utilizes one calibration current. In these embodiments, the term $P_{ij}$ is substantially proportional to changes in the sensor image as follows:

$$P_{ij} \cong -g_j\frac{V_{biasi}}{Z_{ij}}\frac{\Delta Z_{ij}}{Z_{ij}} \quad (25)$$

For the sake of brevity, terms described in other equations are not described again.

Figure 17:
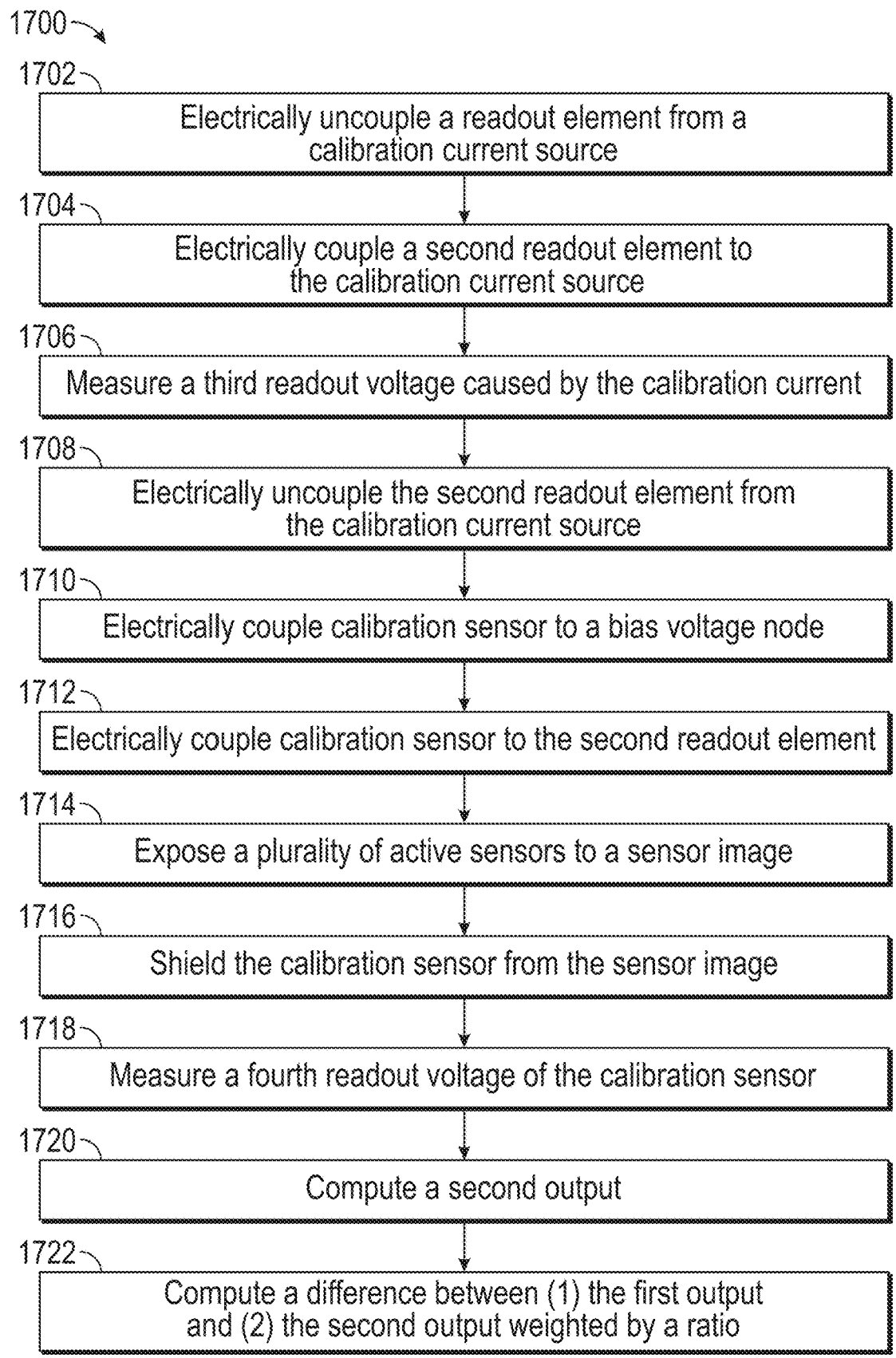
FIG. 17 illustrates a method of sensor calibration, in accordance with an embodiment.

FIG. 17 illustrates a method 1700 of sensor calibration, in accordance with an embodiment. In some embodiments, method 1700 is included in method 1400.

Method 1700 includes electrically uncoupling a readout element from a first calibration current source (step 1702). For example, referring to FIG. 16, the calibration current sources in calibration current circuit 1630 are electrically uncoupled from the readout elements in sensor readout circuit 1610.

The method 1700 includes electrically coupling a second readout element to the calibration current source (step 1704). For example, referring to FIG. 16, one of the calibration current sources in calibration current circuit 1630 is electrically coupled to the calibration readout element in calibration sensor circuit 1620.

The method 1700 includes measuring, with the second readout element, a third readout voltage caused by the calibration current (step 1706). For example, referring to FIG. 16, a readout voltage caused by the calibration current source is measured with the calibration readout element.

The method 1700 includes electrically uncoupling the second readout element from the calibration current source (step 1708). For example, referring to FIG. 16, the calibration current sources in calibration current circuit 1630 is electrically uncoupled from the calibration readout element in calibration sensor circuit 1620.

The method 1700 includes electrically coupling a first terminal of a calibration sensor to a bias voltage node shared by a plurality of active sensors and the active sensor (step 1710). For example, referring to FIG. 16, the bias voltage node in sensor readout circuit 1610 is electrically coupled to the calibration sensor in calibration sensor circuit 1620.

The method 1700 includes electrically coupling a second terminal of the calibration sensor to the second readout element (step 1712). For example, referring to FIG. 16, the calibration sensor in calibration sensor circuit 1620 is electrically coupled to the calibration readout element in calibration sensor circuit 1620.

The method 1700 includes exposing a plurality of active sensors and the active sensor to a sensor image (step 1714). For example, referring to FIG. 16, the plurality of active sensors in sensor readout circuit 1610 is exposed to a sensor image.

The method 1700 includes shielding the calibration sensor from the sensor image (step 1716). For example, referring to FIG. 16, the calibration sensor in calibration sensor circuit 1620 is shielded from the sensor image.

The method 1700 includes measuring, with the second readout element, a fourth readout voltage of the calibration sensor (step 1718). For example, referring to FIG. 16, a readout voltage of the calibration sensor in calibration sensor circuit 1620 is measured with calibration readout element in calibration sensor circuit 1620.

The method 1700 includes computing a second output. In some examples, the output is based on the third readout voltage and the fourth readout voltage (step 1720). For example, referring to FIG. 7 and equation (20), D(t) associated with the calibration sensor column is computed based on the third and fourth readout voltages.

The method 1700 includes computing a difference. In some examples, the difference is between (1) the first output and (2) the second output weighted by a ratio between an impedance of the calibration sensor and an impedance of the active sensor (step 1722). For example, referring to FIG. 7 and equation (21), the term $P_{ij}$ is computed based on the outputs $D_{sij}(t)$ and $D_{iM}(t)$.

Figure 18A:
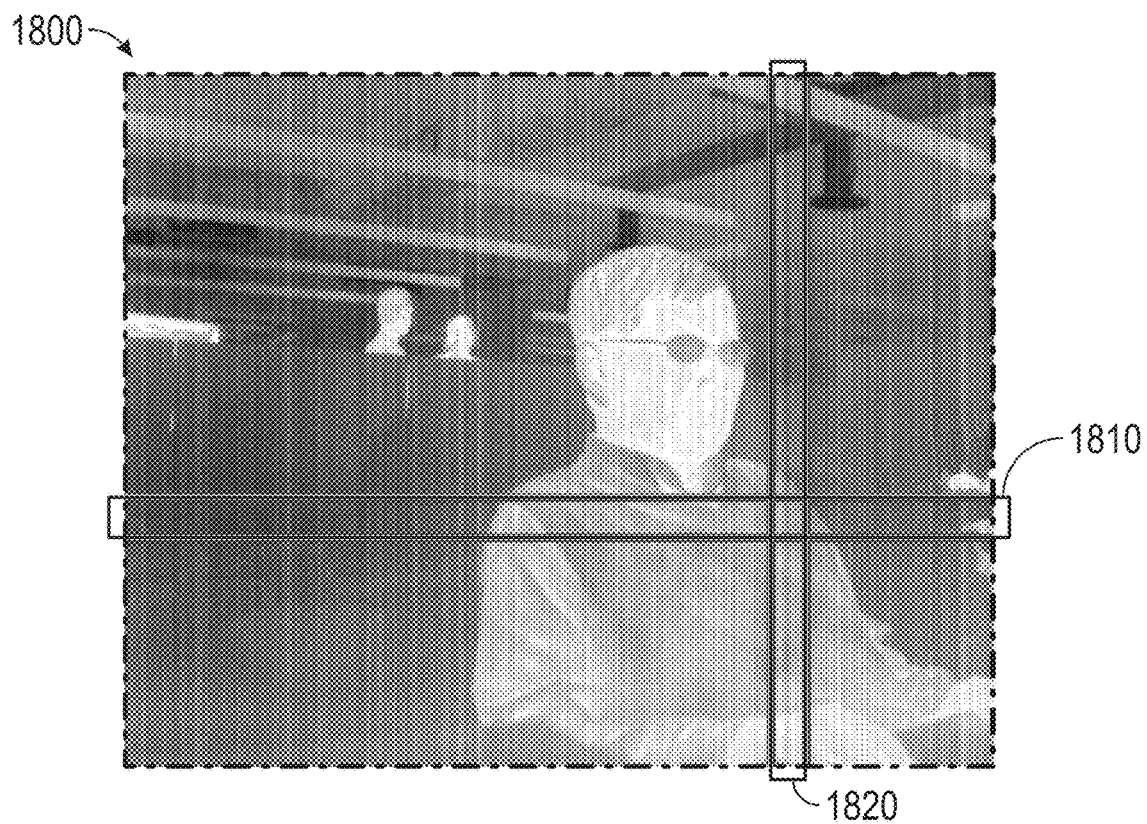
FIGS. 18A and 18B illustrate exemplary sensor images, in accordance with an embodiment.

FIG. 18A illustrates an exemplary sensor image. Due to pattern noises, horizontal noise patterns (an artifact of which is indicated with 1810) and vertical noise patterns (an artifact of which is indicated with 1820) are present in sensor image 1800.

Figure 18B:

FIG. 18B illustrates an exemplary sensor image after the disclosed calibration methods are used. By using the disclose calibration methods, sensor image 1850 is free of the horizontal and vertical noise patterns that are observed in sensor image 1800.

Some MEMS systems utilize capacitive elements (e.g., sensors, capacitors) to store charge for readout. For example, x-ray imaging systems can implement a two dimensional array of sensor pixels that either (1) directly convert x-ray photons to electrons or (2) utilize a scintillator plate to convert x-ray photons into visible photons which are then converted into photoelectrons by photodetectors that are sensitive to visible light. The amount of electrons or photoelectrons incident on a sensor pixel can be represented by a charge stored in an equivalent capacitor (e.g., the junction capacitance in a photodiode, a pixel capacitor storing the photo-generated charge prior to readout).

In a typical x-ray imaging system, the charge of each sensor is readout one row at a time; each column of sensors connects to a CTIA followed by an ADC. These architectures can require a large chip area and a significant amount of power (e.g., 3-5 mW per channel) in order to achieve a desired sensitivity and resolution. A typical panel with over 3,000 columns would require the same amount of CTIAs. In typical x-ray imaging systems, a CTIA can include a high gain op-amp and a relatively large capacitor (e.g., 1-5 pF) to match the x-ray pixel capacitance. The high gain nature of the op-amp results in high power dissipation, which scales with the number of columns.

Examples of the disclosure are directed toward MEMS sensor circuits and methods that reduce chip size and power dissipation of traditional MEMS systems, while reducing cost and increasing reliability and portability. In some embodiments herein, a sensor circuit includes a plurality of sensors each configured to store a charge, a Sigma-Delta ADC configured to receive the charge of each sensor, and a plurality of switches (each switch corresponding to a respective one of the plurality of sensors) configured to sequentially couple each of the plurality of sensors to the Sigma-Delta ADC. In some embodiments, the sensor circuit does not include a CTIA. In some embodiments, the sensor circuit does not include a CTIA electrically positioned between the plurality of sensor pixels and the Sigma-Delta ADC. In some instances, replacing a CTIA and an ADC with a Sigma-Delta ADC reduces the readout element's power and area because the CTIA's high-gain op-amp and large capacitor of the CTIA are no longer in the circuit. If Sigma-Delta ADCs replace CTIAs for all sensor columns, then the power and area reduction would be scaled by the number of sensor columns (see above—in some instances, an imaging system includes 3,000 columns), which can provide significant power and area savings without compromising sensitivity, resolution, or noise. Reduction of power and area can reduce cost and increase reliability and portability of a system (e.g., an x-ray imaging system, a CMOS imaging system, a CCD imaging system) that includes the sensor circuit.

Figure 19A:
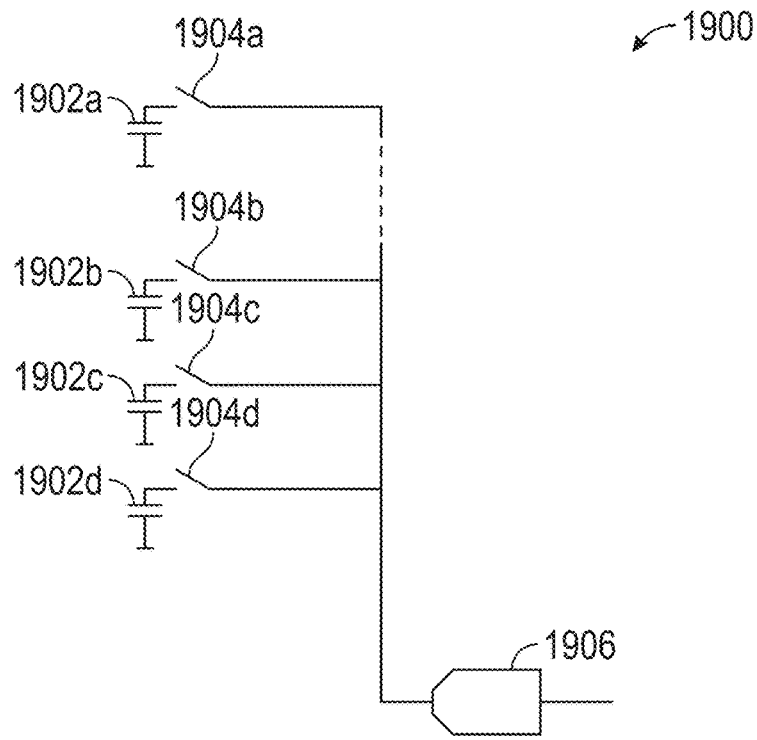
FIGS. 19A and 19B illustrate exemplary sensor circuits, in accordance with an embodiment.

FIG. 19A illustrates an exemplary sensor circuit 1900. As illustrated, the sensor circuit 1900 includes sensors 1902A-1902D, switches 1904A-1904D, and ADC 1906. In some embodiments, the ADC 1906 is a Sigma-Delta ADC that is configured to capture the charge of a selected sensor. In some instances, when a sensor is selected for readout, the discharge current from the selected sensor is a time-varying (e.g., exponentially decaying, step) signal. In some embodiments, the Sigma-Delta ADC is configured to receive the time-varying signal and capture substantively the total charge of the selected sensor. In some instances, a Sigma-Delta ADC can measure the total charge from the time-varying signal with sufficient resolution to satisfy accuracy requirements of a system. In some embodiments, a switch electrically couples a respective sensor to the Sigma-Delta ADC when a row of the respective sensor is selected (e.g., switch 1904A electrically couples sensor 1902A, which corresponds to a specific row, to the Sigma-Delta ADC). In some embodiments, the sensor circuit does not include a CTIA electrically positioned between the plurality of sensors and the Sigma-Delta ADC. Some embodiments include a method of manufacturing the circuit 1900.

In some embodiments, with respect to the sensor circuits described in FIGS. 1-18, the sensor circuit 1900 can be included in the described readout element in place of a CTIA. For example, readout element 102 or 1002 includes ADC 1906.

It is understood that the capacitor symbols used to schematically represent the sensors are merely exemplary and not limiting. In some embodiments, the sensor 1902 is a sensor pixel. In some embodiments, the sensor 1902 is a sensor that receives radiation (e.g., X-ray) and converts the radiation into charge. In some embodiments, a charge is stored in a sensor pixel while the sensor pixel is sensing, and the capacitor is representative of the sensor pixel's charge storing operation. For example, the sensor is an x-ray sensor photodiode, and the sensor accumulates charge in response to exposure to x-ray radiation; the total accumulated charge is representative of the x-ray radiation level and the capacitor symbol is used to represent the charge storing operation. As another example, the sensor is an x-ray sensor pixel that directly converts x-ray photons into electrons and the electrons are stored in a capacitor (e.g., a pixel capacitor storing the photo-generated charge prior to readout).

It is understood that the sensor circuit 1900 is merely exemplary. In some embodiments, the sensor circuit 1900 represents one column of sensors, and each sensor of the column belongs to a row (not shown) of sensors; each sensor of a column is readout at a different row time (e.g., during different discharge time windows). In some embodiments, a second sensor of the column is readout at a subsequent readout time using the same method described herein. For example, a first switch decouples a first sensor from the Sigma-Delta ADC and a second switch electrically couples a second sensor to the Sigma-Delta ADC during a second row time (e.g., a second discharge time window).

In some instances, a Sigma-Delta ADC may be more suitable for receiving near-DC signals. Therefore, converting the discharge signal into a near-DC signal (e.g., a constant current) would be more desirable when including a Sigma-Delta ADC in a sensor circuit. A CTIA and a sample-and-hold circuit may be included between the sensors and the Sigma-Delta ADC to generate a near DC input for Sigma-Delta analog-to-digital conversion. This may be particularly advantageous where a signal directly readout from a sensor includes high peaks and rapid transitions. If the signal includes sharp features, ADC resolution may be lost as the signal may not be adequately captured by the Sigma-Delta ADC. However, as discussed earlier, adding a CTIA for each column of a sensor array can increase readout power and area of the readout chip.

Figure 19B:
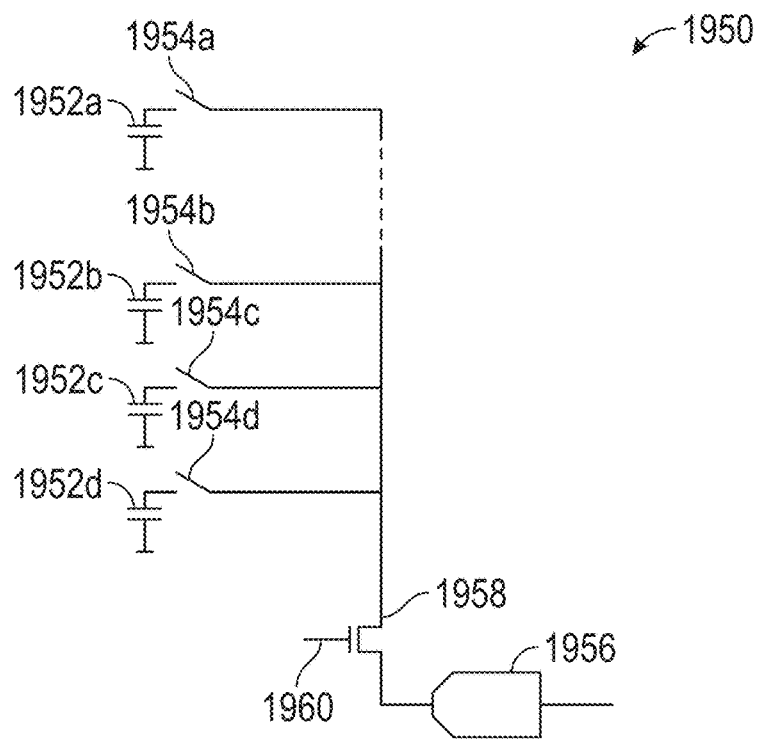

In some embodiments, a CTIA and a sample-and-hold circuit are not included with a Sigma-Delta ADC. FIG. 19B illustrates an exemplary sensor circuit 1950. As illustrated, the sensor circuit 1950 includes sensors 1952A-1952D, switches 1954A-1954D, ADC 1956, variable resistor 1958, and control voltage 1960. In some embodiments, the ADC 1956 is a Sigma-Delta ADC that is configured to capture a total charge of a selected sensor. In some instances, when a sensor is selected for readout, the discharge current from the selected sensor is a time-varying (e.g., exponentially decaying, step) signal. In some embodiments, the variable resistor is configured to receive the time-varying signal and output the total charge to the Sigma-Delta ADC. In some embodiments, the sensor circuit does not include a CTIA electrically positioned between the plurality of sensors and the Sigma-Delta ADC. In some embodiments, sensors 1952A-1952D correspond to sensors 1902A-1902D, switches 1954A-1954D correspond to switches 1904A-1904D, and ADC 1956 correspond to ADC 1906. For the sake of brevity, elements similar to the ones described in FIG. 19A will not be described again. Some embodiments include a method of manufacturing the circuit 1950.

In some embodiments, with respect to the sensor circuits described in FIGS. 1-18, the sensor circuit 1950 can be included in the described readout element in place of a CTIA. For example, readout element 102 or 1002 includes ADC 1956 and variable resistor 1958. In some embodiments, the variable resistor 1958 is electrically coupled to sensor 110, 112, 1008, or 1010 and is controlled with the methods described herein to minimize the time-varying effects of self-heating.

Variable resistor 1958 in front of Sigma-Delta ADC allows the discharge of a capacitor to be controlled during readout to reduce high peak amplitude and sharp features of an uncontrolled discharge signal. As an example, during sensor readout (e.g., when the accumulated charge of an x-ray sensor photodiode discharges to readout circuitry), the discharge signal can be controlled by varying the resistance of the variable resistor and matching a discharge time window with a row time of the readout operation. In some embodiments, a row time is when a row of sensors is readout.

In some embodiments, the variable resistor 1958 is implemented with a MOS transistor. In some embodiments, the resistance of the MOS transistor can be controlled with a control voltage 1960, which controls the transconductance of the transistor. It is understood that the transistor symbol is used to represent the variable resistor 1958 and the control voltage 1960 connected to the variable resistor are not limiting; other implementations of the variable resistor 1958 can exist without departing from the scope of the disclosure.

In some embodiments, the variable resistor 1958 is implemented with a weighted bank of resistors (not shown) in which discrete levels of resistance can be achieved (e.g., each combination between resistors of the weighted bank of resistors is unique). For example, the weighted bank of resistors includes a plurality of resistors that can be selectively electrically coupled in parallel or series and a plurality of corresponding switches. In some embodiments, each resistor has a unique value such that every different combination of resistors result in a different total resistance (e.g., the resistors' values form a set of basis values that span a range of resistances from high to low in a stepwise manner (e.g., by increments of 50 ohms from 5.05 k-ohms to 5 ohms)).

As an example, the variable resistor 1958 is a MOS transistor. In this example, the beginning of the discharge time window matches the beginning of a row time. During this time (e.g., t=0), the resistance of the variable resistor 1958 is at an initial resistance (e.g., $R_0$), and the switch 1954 electrically couples the sensor 1952 to the variable resistor 1958. As time progresses during this discharge time window, the resistance of the variable resistor 1958 decreases from $R_0$. In this example, the resistance is decreased linearly from $R_0$ to zero by the end of the discharge time window (e.g., t=T). In some embodiments, T is 20 microseconds. In some embodiments, T is 40 microseconds. In some embodiments, T is between 10 microseconds and 1 millisecond. In some embodiments, the discharge time window is several magnitudes longer than a rise time of a signal turning on a comparable MOS transistor. Therefore, reducing a resistance of the variable resistor 1958 over the discharge time window may be different than merely turning on a transistor. For example, the discharge time window is in the microsecond range and a rise time of the signal turning on the MOS transistor is in nanosecond range. The resistance of the variable resistor 1958 can be calculated as follows:

$$R(t) = R_0\left(1 - \frac{t}{T}\right) \quad (26)$$

In some embodiments, to control the resistance, the control voltage 1960 is electrically coupled to the gate of the MOS transistor and increases the drain-to-source transconductance from low to high (i.e., resistance decreases from high to low) (e.g., by increasing the gate voltage) for each row time during readout. As described with the above equation, the resistance of the variable resistor is linearly decreasing from t=0 to t=T; the resistance at t=0 (e.g., R(0)) is $R_0$, the initial resistance, after t=0, the resistance is linearly decreasing as described with respect to the equation, and the resistance (e.g., R(T)) approaches substantially zero at t=T. In some embodiments, the variable resistor 1958 is implemented with a weighted bank of resistors (not shown) in which discrete levels of resistance can be achieved (e.g., each combination between resistors of the weighted bank of resistors is unique). In these embodiments, R(t) can be approximated with a stepwise function of the resistors of the weighted bank.

Although equation (26) shows that, in an ideal case, R(t) reaches zero at t=T, it is understood that components used to implement the variable resistor 1958 may not reach exactly zero resistance at an end of a discharge time window. In some embodiments, this resistance is the variable resistor's lowest resistance. For example, if the variable resistor is a MOS transistor, then the lowest resistance is determined by the conductance of the transistor (e.g., the transistor's "on" resistance). As another example, if the variable resistor is a weighted bank of resistors, the lowest resistance is achieved by electrically coupling all the resistors of the bank in parallel.

The capacitance of the sensor 1902 can be represented with C. The current going into the variable resistor 1958 can be calculated as follows:

$$C\frac{dV}{dt} = -\frac{V}{R(t)} \quad (27)$$

By solving for V(t), the voltage across the variable resistor 1958 can be calculated as a function of time:

$$V(t) = V(0)\left[1 - \frac{t}{T}\right]^{\frac{T-CR_0}{CR_0}} \quad (28)$$

The current I(t) across the variable resistor 1958 can be expressed as:

$$I(t) = \frac{V(0)\left[1 - \frac{t}{T}\right]^{\frac{T}{CR_0}}}{R_0\left(1 - \frac{t}{T}\right)} = \frac{V(0)\left[1 - \frac{t}{T}\right]^{\frac{T-CR_0}{CR_0}}}{R_0} \quad (29)$$

As shown with equation (29), if the discharge time window T is set to be equal to the initial time constant (e.g., T=C×$R_0$), the current output can be substantially constant (e.g., I=V(0)/$R_0$). Accordingly, in some embodiments, the $R_0$ of the variable resistor is determined by the effective capacitance (e.g., 1-5 pF) of the sensor 1902 and the discharge time window (e.g., row time). By converting the discharge current to a constant current, a higher resolution can be achieved with a Sigma-Delta ADC (e.g., 16 bits conversion (14 effective numbers of bits)) without the above-described larger area and power penalties. Therefore, if a row time is known or determined (e.g., by system requirements), and sensor capacitance is known, the variable resistor can be designed to convert the discharge current into a constant current. By converting to the constant current using the sensor circuit 1950, resolution degradation due to high peak and/or sharp discharge signals being inputted to a Sigma-Delta ADC can be reduced without including a CTIA. Although the term "constant current" is used in this example, it is understood that the converted current may include variations that do not substantively reduce the resolution of a Sigma-Delta ADC.

In some embodiments, at an end of a discharge time window, the charge of a sensor may not be completely readout. In some embodiments, the remaining charge may be discharged into the Sigma-Delta ADC with additional discharge paths. In some embodiments, the remaining charge may be ignored without substantively affecting ADC measurement.

It is understood that the sensor circuit 1950 is merely exemplary. In some embodiments, the sensor circuit 1950 represents one column of sensors, and each sensor of the column belongs to a row of sensors; each sensor of a column is being readout at a different row time (e.g., at different discharge time windows). In some embodiments, a second sensor of the column is readout at a subsequent readout time using the same method described herein. For example, a second switch electrically couples a second sensor to the variable resistor during a second row time (e.g., a second discharge time window), and the current of the second sensor is converted to be near-DC for the Sigma-Delta ADC using the methods described herein.

Although the sensor circuit 1950 is described with one variable resistor, it is understood that a column of sensors can be associated with more than one variable resistor.

In some embodiments, $R_0$ can be adjusted in response to an updated row time requirement. For example, a weighted bank of resistors can be adjusted to set a different initial resistance. As another example, initial resistance of the variable resistor can be adjusted before readout.

Although the above examples are sometimes described with reference to x-ray sensor photodiodes, it is understood that other types of sensors can use a similar current-controlling circuit without departing from the scope of the disclosure. For example, the described circuits can be used for CMOS or CCD imaging systems.

Figure 20A:
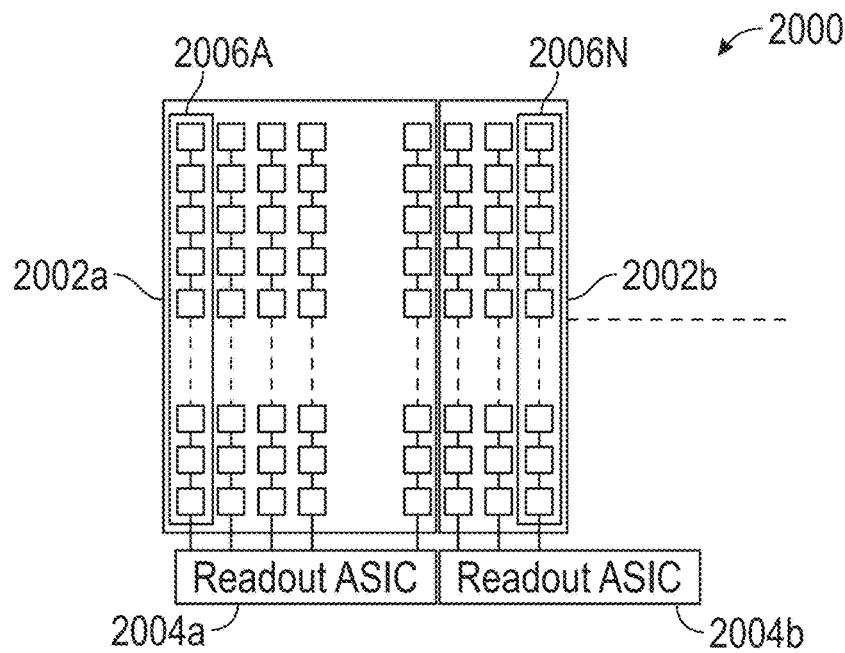
FIGS. 20A and 20B illustrate exemplary sensor circuits, in accordance with an embodiment.

FIG. 20A illustrates an exemplary sensor circuit 2000. The sensor circuit includes sensors 2002A-2002B and readout circuits 2004A-2004B. In some embodiments, the readout circuits include readout circuits 1900 or 1950. Because sensor circuit 2000 may not include a CTIA, the sensor circuit can enjoy the herein-described power, area, and resolution benefits.

As illustrated, the sensors 2002 are organized by N columns 2002A to 2002N. It is understood that "N" can be any number of columns. As described with respect to FIGS. 20A and 20B, "a column of sensors" is a plurality of sensors included in an array of sensors, arranged along a first dimension of the array, and bounded by boundaries of the array. Each sensor of the plurality sensors belongs to a unique row along a second dimension of the array. For example, as illustrated in FIG. 20A, the sensors 2002A and 2002B are spatially arranged by vertical columns of sensors (e.g., columns 2002A to 2002N). As another example, a column of sensor is electrically coupled to the Sigma-Delta ADC in circuits 1900 and 1950. As illustrated, readout circuit 2004A is configured to readout sensors 2002A, and readout circuit 2004B is configured to readout sensors 2002B.

In some embodiments, the sensors are x-ray sensor photodiodes and are part of an x-ray panel. In some embodiments, the sensors are part of a CMOS or CCD panel. In some embodiments, the readout circuits include Sigma-Delta ADCs. In some embodiments, the readout circuits do not include CTIA.

Figure 20B:
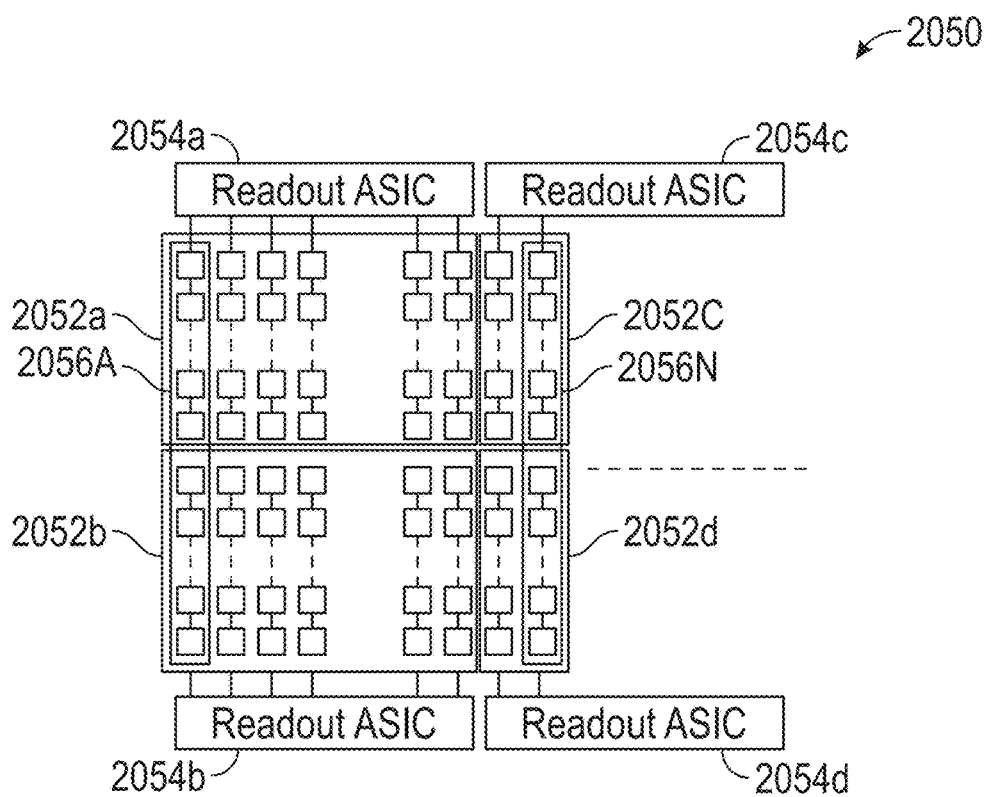

FIG. 20B illustrates an exemplary sensor circuit 2050. As illustrated, the sensors 2052 are organized by N columns 2056A to 2056N. The sensor circuit includes sensors 2052A-2052D and readout circuits 2054A-2054D. In some embodiments, the sensors are x-ray sensor photodiodes and are part of an x-ray panel having a same size as the panel described in FIG. 20A. In some embodiments, the sensors are part of a CMOS or CCD panel. In some embodiments, the sensors are arranged in columns, and each column includes a first plurality of sensors connected to a first readout circuit and a second plurality of sensors connected to a second readout circuit. For example, sensors 2052A includes the first plurality of sensors, and sensor 2052B includes the second plurality of sensors; the combination of sensors 2052A and 2052B correspond to sensors 2002A described in FIG. 20A. As another example, column 2056A includes sensor from the first plurality of sensors and from the second plurality of sensors. In these instances, the panel is split—the first plurality of sensors includes a first half of the column sensors (as defined with respect to FIG. 20A), and the second plurality of sensors includes a second half of the column of sensors (e.g., the numbers of the first and second plurality of sensors are equal).

As illustrated, readout circuit 2004A is configured to readout sensors 2002A, readout circuit 2004B is configured to readout sensors 2002B, readout circuit 2004C is configured to readout sensors 2002C, and readout circuit 2004D is configured to readout sensors 2004D. In some embodiments, a column is readout bi-directionally. For example, the first and second pluralities of sensors are readout at a same time with readout circuits 2004A and 2004B.

By reading different parts of a column at the same time, the parasitic capacitance and resistance involved in the readout can be reduced. For example, the parasitic resistances and capacitances of column 2056A at the inputs of the respective readout circuits are each halved. By reducing the parasitic RC of a column, readout delays can be reduced. Additionally, by "breaking up" a column, row addressing complexity can be reduced. For example, the total row addresses are reduced because there are half as many rows to readout for each readout ASIC (compared the arrangement in FIG. 20A).

In some embodiments, each of the readout circuits includes the sensor circuit 1900 or 1950 (for brevity, they will not be described again) and a Sigma-Delta ADC corresponding to each of the plurality of sensors. In some embodiments, the readout circuits do not include a CTIA. In the described example, even though the number of readout circuits double in a split-panel configuration, the total readout circuits area and power dissipation in the architecture described in FIG. 20B (e.g., readout circuits including Sigma-Delta ADC, readout circuits not including a CTIA) can be less than a non-split column system including one CTIA per column.

For example, for the 3072×3072 sensor array, due to area saving benefits (e.g., replacing CTIA, reduced addressing complexity, reduced column loading), eight chips can be used in the split panel configuration (compared to twelve chips in a non-split column system including one CTIA per column). By using sensor circuit 1900 or 1950 in the split panel configuration, system power can also be reduced because a CTIA not used for readout. For example, power per column can reduce from 3-5 mW per column to below 1 mW per column. By splitting each column into sub-columns and reducing the parasitic RC electrically coupled to the readout circuits (thereby reducing the propagation delay caused by parasitic effects), system performance can be improved. For example, parasitic capacitance of a column can range between 50-200 pF and parasitic resistance of a column can range between 1 kiloohm to 100 kiloohms; if a column is split into half as described herein, the parasitic values would respectively be reduced by a factor of two.

FIGS. 21A-21D and table 1 show simulation results of the Sigma-Delta ADC, demonstrating conversion of time varying signals during a time period. Table 1 shows Effective Number of Bits (ENOB) as a function of Over Sampling Rate (OSR) and the input signal shapes described with respect to FIGS. 21A-21D.

Figure 21A:
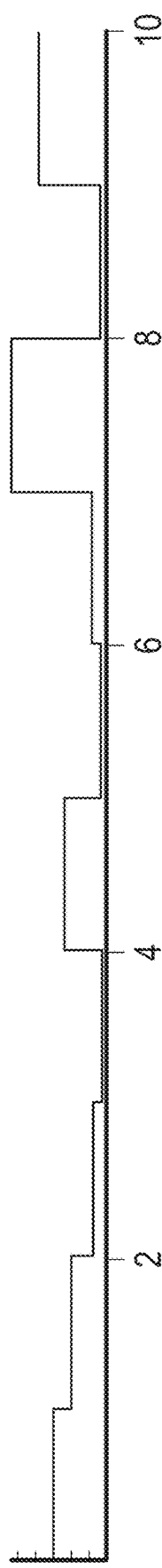
FIGS. 21A to 21D illustrate exemplary inputs, in accordance with an embodiment.
Figure 21B:
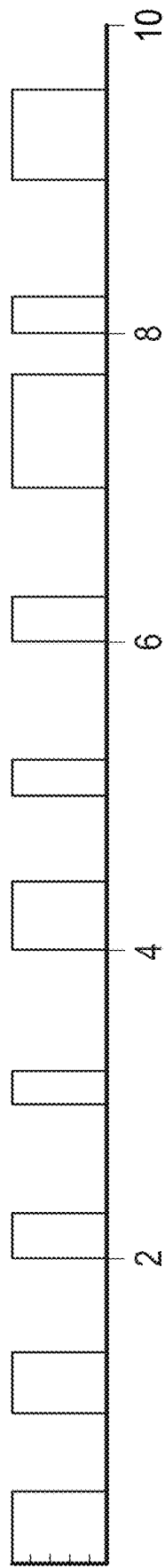
Figure 21C:
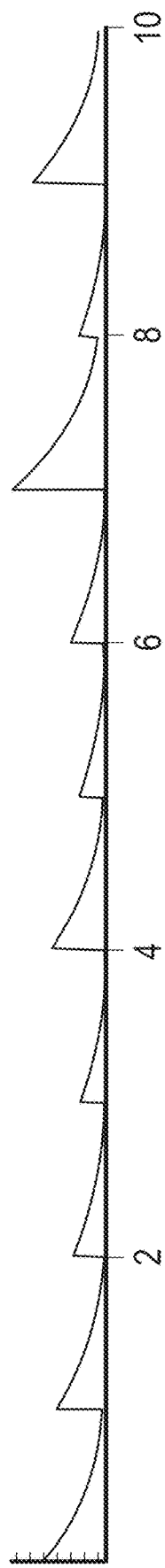
Figure 21D:
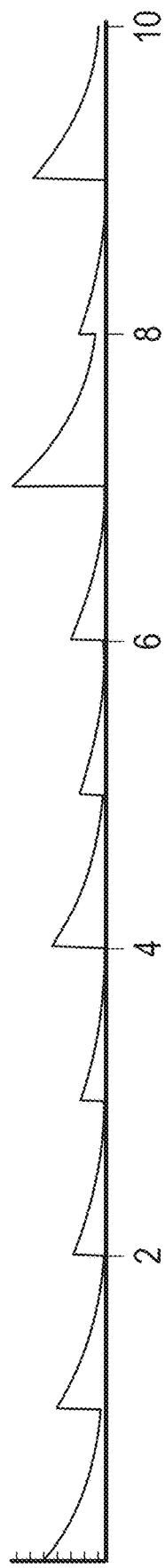

The curve in FIG. 21A shows random ideal constant inputs which generate the ENOB shown in Table 1. The curve in FIG. 21B shows a current clamped signal; a current clamp on a column forces a current inputted to the ADC to be constant until the charge is completely depleted, effectively creating pulse-width modulated inputs. The curve in FIG. 21C is an exponentially decaying signal that has a length of two RC time constants. In some embodiments, if the charge is not yet fully depleted after two time constants, a low resistance switch is used to discharge the remaining charge into the ADC. The curve in FIG. 21D is an exponentially decaying signal that has a length of five RC time constants. As shown in table 1, if the signal is allowed to decay for five time constants, the ENOB is reduced compared to the two time constant signal. In some embodiments, the curves illustrated in FIGS. 21C and 21D are representative of a sensor readout charge signal (e.g., a sensor's total charge is discharged into the ADC). It is understood that the curves are presented for illustrative purposes and are not necessarily drawn to scale.

TABLE 1

Effective Number of Bits (ENOB) as a function of OverSampling Rate (OSR) and input signal shape.

| Signal shape | ENOB @OSR = 128 | ENOB @OSR = 256 |
|---|---|---|
| Constant | 13.0 | 15.3 |
| Current clamped (width modulation) | 6.4 | 7.4 |
| 2 Time constant decay | 11.4 | 13.8 |
| 5 Time constant decay | 9.4 | 11.2 |

In some embodiments, for a time-varying input signal, a digital filter is used with the Sigma-Delta ADC to improve performance. For example, the digital filter is used to process digital signals outputted from circuit 1900 or 1950. In some embodiments, the digital filter is a Finite Impulse Response (FIR) filter. The coefficients of the Finite Impulse Response (FIR) filter can be chosen to reduce quantization error and increase linearity. As an example, for the current clamped waveform (e.g., FIG. 21B), a FIR filter with the same value for all coefficients (e.g., a rectangular window) can be used to improve performance. As another example, for the exponentially decaying waveforms (e.g., FIGS. 21C, FIG. 21D, a sensor discharge current), a Blackman or Hamming window can be used for the FIR filter to improve performance.

In some embodiments, a CEP (cyclic excitation process) effect is implemented on amorphous-Silicon. This may increase the sensitivity of the sensor pixel. For example, an x-ray sensor pixel can be manufactured with an amorphous Si based nip (n-type/intrinsic/p-type) structure for indirect detection or an x-ray sensitive photoconductor (e.g., Selenium) with electrode structures to allow for photoelectrons to be addressed. In both cases, producing internal gain for the photoexcited (primary) charged carriers can reduce the x-ray radiation levels required to produce detectable signals. CEP produces high gain without the high electric fields (as may be the case for conventional avalanche multiplication effects). In some instances, CEP devices can be used in for x-ray indirect detection. In some embodiments, CEP effect is harnessed in conjunction with x-ray photoconductors such as selenium.

Figure 22:
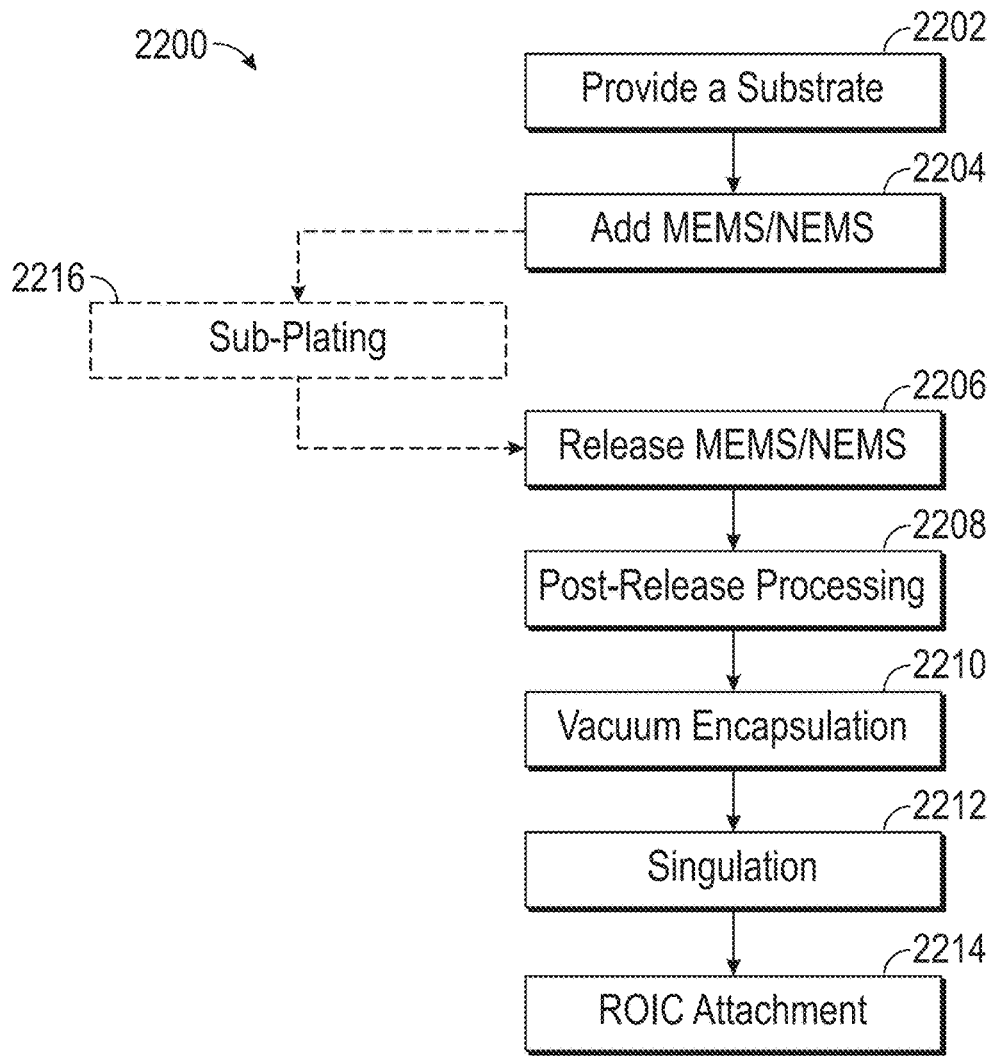
FIG. 22 illustrates a method of manufacturing MEMS products, in accordance with an embodiment.

FIG. 22 illustrates a method 2200 of manufacturing an electromechanical system, in accordance with an embodiment. As non-limiting examples, the electrochemical system could be associated with circuits 100, 300, 500, 600, 800, 900, 1000, 1100, 1300, 1500, 1600, 1900, 1950, 2000, and 2050 (and related methods). To manufacture an electromechanical system, all or some of the process steps in method 2200 could be used and used in a different order. As a non-limiting example, Step 2214 could be performed before Step 2212.

Method 2200 includes Step 2202, providing a substrate. In some embodiments, the substrate is made of glass. In some embodiments, the substrate is low temperature polycrystalline silicon. In some embodiments, the substrate is a borosilicate that contains additional elements to fine tune properties. An example of a borosilicate is by Corning Eagle™, which produces an alkaline earth boro aluminosilicate (a silicate loaded with boron, aluminum, and various alkaline earth elements). Other variations are available from Asahi Glass™ or Schott™.

In some embodiments, a flat panel glass process is used to manufacture the electromechanical system. In some embodiments, a liquid crystal display (LCD) process is used to manufacture the electromechanical system. In some embodiments, an OLED display process or an x-ray panel process is used. Employing a flat panel glass process may allow for increased substrate sizes, thereby allowing for a higher number of electrochemical systems per substrate, which reduces processing costs. "Panel level" sizes can include 620 mm×750 mm, 680 mm×880 mm, 1100 mm×1300 mm, 1300 mm×1500 mm, 1500 mm×1850 mm, 1950 mm×2250 mm, and 2200 mm×2500 mm. Further, thin film transistors (TFTs) in panel level manufacturing can also reduce cost and so, for example, LCD-TFT processes can be beneficial.

Method 2200 includes Step 2204, adding MEMS to the substrate. Although MEMS is used to describe the addition of structures, it should be appreciated that other structures could be added without deviating from the scope of this disclosure. In embodiments using panel level processing, the MEMS structures may be added using an LCD-TFT process.

Step 2204 may be followed by optional Step 2216, sub-plating. Step 2216 may be used when the substrate is larger than the processing equipment used in subsequent steps. For example, if using a panel level process (such as LCD), some embodiments will include (at Step 2204) cutting the panel into wafer sizes to perform further processing (using, for example, CMOS manufacturing equipment). In other embodiments, the same size substrate is used throughout method 2200 (i.e., Step 2216 is not used).

Method 2200 includes Step 2206, releasing the MEMS from the substrate.

Method 2200 includes Step 2208, post-release processing. Such post-release processing may prepare the MEMS structure for further process steps, such as planarization. In wafer-level processing, planarization can include chemical mechanical planarization. In some embodiments, the further process steps include etch back, where a photoresist is spun onto the topography to generate a more planar surface, which is then etched. Higher control of the etch time can yield a smoother surface profile. In some embodiments, the further process steps include "spin on glass," where glass-loaded organic binder is spun onto the topography and the result is baked to drive off organic solvents, leaving behind a surface that is smoother.

Method 2200 includes Step 2210, vacuum encapsulation of the MEMS structure, where necessary. Vacuum encapsulation may be beneficial to prolong device life.

Method 2200 includes Step 2212, singulation. Some embodiments may include calibration and chip programming, which may take into account the properties of the sensors. Methods described herein may be advantageous in glass substrate manufacturing processes because uniformity in glass lithography capabilities is limited. As a further advantage, glass has a lower thermal conductivity and so a glass substrate can be a better thermal insulator; by manufacturing thin structures separating a bolometer pixel from a glass substrate, embodiments herein may better serve to thermally isolate the glass bolometer pixel from the packaging environment.

Method 2200 includes Step 2214, attachment of a readout integrated circuit (ROIC) and flex/PCB attachment. As non-limiting examples, the readout circuits could be associated with circuits 100, 300, 500, 600, 800, 900, 1000, 1100, 1300, 1500, 1600, 1900, 1950, 2000, and 2050 (and related methods). Processes and devices described herein may have the further advantage that the area required for signal processing can be much smaller than the sensing area which is dictated by the sensing physics. Typically, sensors are integrated on top of CMOS circuitry, and area driven costs lead to a technology node that is not optimal for the signal processing task. Processes described herein can use a more suitable CMOS and drive down the area required for signal processing, freeing the sensor from any area constraints by leveraging the low cost of FPD (flat panel display) manufacturing. In some embodiments, the ROIC is specifically designed for sensing a specific electromagnetic wavelength (such as X-Rays, THz, LWIR).

Figure 23:
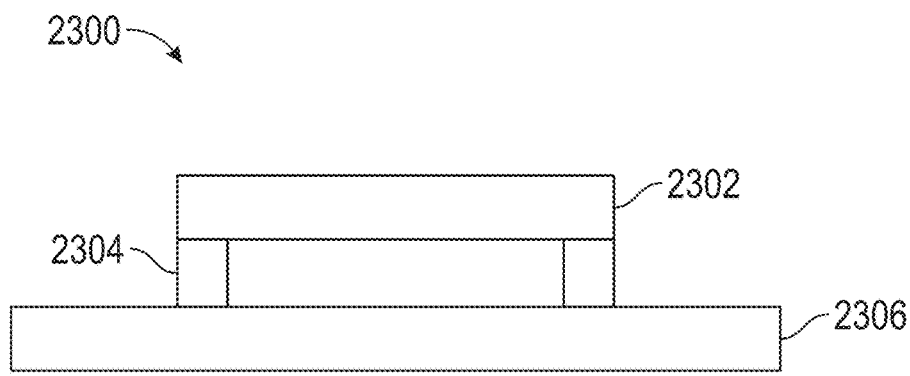
FIG. 23 illustrates a bolometer, in accordance with an embodiment.

FIG. 23 illustrates an exemplary sensor. In some embodiments, sensor 2300 is manufactured using method 2200. Sensor 2300 includes glass substrate 2306, structure 2304 less than 250 nm wide coupled to glass substrate 2306, and a sensor pixel 2302 coupled to the structure 2304. In some embodiments of sensor 2300, structure 2304 is a hinge that thermally separates the active area from the glass. In some embodiments, sensor 2300 receives an input current or charge and outputs an output current or charge based on the received radiation (e.g., the resistance between two terminals of the sensor changes in response to exposure to LWIR radiation).

In some embodiments, a sensor includes a glass substrate, a structure manufactured from any of the methods described herein and coupled to the glass substrate, and a sensor pixel coupled to the structure.

In some embodiments, a sensor includes a MEMS or NEMS device manufactured by a LCD-TFT manufacturing process and a structure manufactured by any of the methods described herein.

By way of examples, sensors can include resistive sensors and capacitive sensors. Bolometers can be used in a variety of applications. For example, long wave infra-red (LWIR, wavelength of approximately 8-14 µm) bolometers can be used in the automotive and commercial security industries. For example, LWIR bolometers with QVGA, VGA, and other resolution. Terahertz (THz, wavelength of approximately 1.0-0.1 mm) bolometers can be used in security (e.g., airport passenger security screening) and medical (medical imaging). For example, THz bolometers with QVGA resolution and other resolutions. Some electrochemical systems can include X-Ray sensors or camera systems. Similarly, LWIR and THz sensors are used in camera systems. Some electromechanical systems are applied in medical imaging, such as endoscopes and exoscopes. X-ray sensors include direct and indirect sensing configurations.

Other electromechanical systems include scanners for light detection and ranging (LIDAR) systems. For example, optical scanners where spatial properties of a laser beam could be shaped (for, e.g., beam pointing). Electromechanical systems include inertial sensors (e.g., where the input stimulus is linear or angular motion). Some systems may be used in bio sensing and bio therapeutic platforms (e.g., where biochemical agents are detected).

In one aspect, a sensor readout circuit includes a readout element, a first current source, a second current source, a voltage driver, a reference sensor, and an active sensor. The readout element includes an input. The voltage driver includes an output. The reference sensor includes a first terminal and a second terminal; the first terminal is electrically coupled to the first current source and the second terminal is electrically coupled to the output of the voltage driver. The active sensor includes a first terminal and a second terminal; the first terminal is electrically coupled to the second current source and the input of the readout element and the second terminal is electrically coupled to the output of the voltage driver. The active sensor is configured for exposure to a sensor image.

In some aspects of the above circuit, the first current and the second current are constant.

In some aspects of the each of the above circuits, the voltage driver generates a bias voltage for the active sensor.

In some aspects of the each of the above circuits, the active sensor is further configured to change a current from the first terminal of the active sensor to the input of the readout element when the active sensor is exposed to the sensor image.

In some aspects of the each of the above circuits, the active sensor is further configured to change an impedance of the active sensor when the active sensor is exposed to the sensor image.

In some aspects of the each of the above circuits, the reference sensor is a reference bolometer pixel and the active sensor is an active bolometer pixel.

In some aspects of the each of the above circuits, the circuit further includes a second reference sensor, a second active sensor, a first switch, a second switch, a third switch, and a fourth switch. The second reference sensor includes a first terminal and a second terminal; the first terminal is electrically coupled to the first current source and the second terminal is electrically coupled to the voltage driver. The second active sensor includes a first terminal and a second terminal; the first terminal is electrically coupled to the second current source outputting the second current and the second terminal is electrically coupled to the output of the voltage driver. The second active sensor is configured to change the current from the first terminal to the input of the readout element. The first switch is configured to selectively electrically couple the reference sensor to the first current source. The second switch is configured to selectively electrically couple the active sensor to the second source. The third switch is configured to selectively electrically couple the second reference sensor to the first current source. The fourth switch is configured to selectively electrically couple the second active sensor to the second current source.

In some aspects of the each of the above circuits, the circuit further includes a CDS circuit that is configured to remove an offset.

In some aspects of the each of the above circuits, the voltage of the readout element is proportional to an impedance difference between the reference sensor and the active sensor.

In some aspects of the each of the above circuits, the circuit further includes an output of an op amp electrically coupled to the second terminal of the reference sensor.

In some aspects of the each of the above circuits, the circuit further includes a feedback element that is electrically coupled to the first and second terminals of the reference sensor.

In some aspects of the each of the above circuits, the circuit further includes a third reference sensor and a third current source. The third reference sensor includes a first terminal and a second terminal that is electrically coupled to the output of the voltage driver. The third current source is electrically coupled to the first terminal of the third reference sensor, and is configured to output a seventh current reflective of self-heating generated by the third reference sensor. The value of the second current adjusts in accordance with the seventh current.

In some aspects of the each of the above circuits, the circuit further includes an ADC that is configured to sample the change of the current from the first terminal to the input of the readout element.

In some aspects of the each of the above circuits, the first current source and the second current source that are configured to output an equal magnitude of current in a same direction relative to the respective first terminals.

In some aspects of the each of the above circuits, the readout element includes a CTIA.

In some aspects of the each of the above circuits, the first current source and the second current source are selected from the group of an athermal voltage source and resistor, a high-impedance athermal transistor current source, and a Wilson current mirror.

In some aspects of the each of the above circuits, the circuit further includes an amplifier that outputs to the second terminal of the reference sensor. The first terminal of the reference sensor electrically couples to a negative input of the amplifier. The first current source is configured to generate a voltage drop across the negative input and the output.

In some aspects of the each of the above circuits, the reference sensor is a reference bolometer pixel, and the active sensor is a bolometer pixel configured to detect LWIR radiation.

In some aspects of the each of the above circuits, the readout element includes a Sigma-Delta ADC.

In some aspects of the each of the above circuits, a first stage of the Sigma-Delta ADC includes a CTIA.

In some aspects of the each of the above circuits, the reference sensor is shielded from a sensor image.

In some aspects of the each of the above circuits, the circuit further includes a voltage follower electrically coupled between the output of the voltage driver and the second terminal of the active sensor.

In some aspects of the each of the above circuits, the circuit further includes two or more current buffers, the two or more current buffers including a first current buffer electrically coupled between the first current source and the reference sensor and a second current buffer electrically coupled between the second current source and the active sensor.

In some aspects of the each of the above circuits, the circuit further includes a fifth switch configured to selectively electrically couple the active sensor to the voltage driver.

In another aspect, a method of sensor readout includes: providing a first current to a first terminal of a reference sensor; generating, from the first current, a voltage at a second terminal of the reference sensor; providing a second current to a first terminal of the active sensor; driving, at the voltage, a second terminal of an active sensor; exposing the active sensor to a sensor image; and measuring a third current from the first terminal of the active sensor to an input of a readout element.

In some aspects of the above method, the first current and the second current are constant.

In some aspects of each of the above methods, the voltage is a bias voltage for the active sensor.

In some aspects of each of the above methods, exposing the active sensor to the sensor image further includes changing the third current.

In some aspects of each of the above methods, exposing the active sensor to the sensor image further includes changing an impedance of the active sensor.

In some aspects of each of the above methods, the method further includes: providing a fourth current to a first terminal of a second reference sensor; generating, from the fourth current, a second voltage at a second terminal of the second reference sensor; providing a fifth current to a first terminal of a second active sensor; driving, at the second voltage, a second terminal of the second active sensor; exposing the second active sensor to the sensor image; and measuring a sixth current from the first terminal of the second active sensor to the input of a readout element.

In some aspects of each of the above method, the method includes: electrically uncoupling, from the reference sensor, a first current source providing the first current; coupling, to the second reference sensor, the first current source providing the fourth current; electrically uncoupling, from the active sensor, a second current source providing the second current; and coupling, to the second active sensor, the second current source providing the fifth current.

In some aspects of each of the above methods, the method further includes: determining an offset generated by the input of the readout element; and canceling the offset prior to measuring the current to the input of the readout element.

In some aspects of each of the above methods, a voltage at an output of the readout element is proportional to an impedance difference between the reference sensor and the active sensor.

In some aspects of each of the above methods, the voltage is driven by an op amp, and the first terminal of the reference sensor is electrically coupled to a negative input of the op amp.

In some aspects of each of the above methods, the method further includes feeding back from the second terminal of the reference sensor to the first terminal of the reference sensor using a feedback element.

In some aspects of each of the above methods, the method further includes: providing a seventh current to a first terminal of a third reference sensor, the seventh current reflective of self-heating generated by the third reference sensor; and adjusting a value of the second current in accordance with the seventh current.

In some aspects of each of the above methods, the method further includes sampling a voltage generated by the current to the input of a readout element.

In some aspects of each of the above methods, the first current and the second current are equal in magnitude and in a same direction relative to the respective first terminals of the reference sensor and active sensor.

In some aspects of each of the above methods, the method further includes converting the third current to a readout voltage of the readout element.

In some aspects of each of the above methods, the first current and the second current are each provided by current sources selected from the group of an athermal voltage source and resistor, a high-impedance athermal transistor current source, and a Wilson current mirror.

In some aspects of each of the above methods, driving the second terminal of the active sensor at the voltage further includes driving, from an output of a voltage driver, the second terminal of the reference sensor and the second terminal of the active sensor.

In some aspects of each of the above methods, the method further includes causing a voltage drop across the reference sensor from the first current; generating the voltage using an amplifier outputting to the second terminal of the reference sensor; and electrically coupling the first terminal of the reference sensor to a negative terminal of the amplifier.

In some aspects of each of the above methods, the reference sensor is a reference bolometer pixel and the active sensor is an active bolometer pixel.

In some aspects of each of the above methods, exposing the active sensor to the sensor image further includes exposing the active sensor to LWIR radiation.

In some aspects of each of the above methods, the readout element includes a Sigma-Delta ADC.

In some aspects of the above method, a first stage of the Sigma-Delta ADC includes a CTIA.

In some aspects of each of the above methods, the method further includes exposing the reference sensor to an ambient condition common to the reference sensor and active sensor; and shielding the reference sensor from the sensor image.

In some aspects of each of the above methods, driving the second terminal of the active sensor at the voltage further includes buffering between the second terminal of the active sensor and a voltage source providing the voltage.

In some aspects of each of the above methods, the method further includes: buffering the first current; and buffering the second the current.

In another aspect, a method of manufacturing a sensor readout circuit includes providing a readout element including an input; providing a first current source; providing a second current source; providing a voltage driver including an output; providing a reference sensor including a first terminal and a second terminal; electrically coupling the first terminal of the reference sensor to the first current source; electrically coupling the second terminal of the reference sensor to the output of the voltage driver; providing an active sensor including a first terminal and a second terminal, the active sensor configured for exposure to a sensor image; electrically coupling the first terminal of the active sensor to the second current source and the input of the readout element; and electrically coupling the second terminal of the active sensor to the output of the voltage driver.

In some aspects of the above method of manufacturing, the first current and the second current sources are constant current sources.

In some aspects of each of the above methods of manufacturing, the voltage driver is configured to generate a bias voltage for the active sensor.

In some aspects of each of the above methods of manufacturing, the active sensor is further configured to change a current from the first terminal of the active sensor to the input of the readout element when the active sensor is exposed to the sensor image.

In some aspects of each of the above methods of manufacturing, the active sensor is further configured to change an impedance of the active sensor when the active sensor is exposed to the sensor image.

In some aspects of each of the above methods of manufacturing, the reference sensor is a reference bolometer pixel and the active sensor is an active bolometer pixel.

In some aspects of each of the above methods of manufacturing, the method of manufacturing further includes: providing a second reference sensor including a first terminal and a second terminal; electrically coupling the first terminal of the second reference sensor to the first current source; electrically coupling the second terminal of the second reference sensor to the voltage driver; providing a second active sensor including a first terminal and a second terminal, the second active sensor configured for exposure to the sensor image; electrically coupling the first terminal of the active sensor to the second current source; electrically coupling the second terminal of the active sensor to the output of the voltage driver, and the second active sensor is configured to change a current from the first terminal of the active sensor to the input of the readout element; and providing a first switch configured to selectively electrically couple the reference sensor to the first current source; providing a second switch configured to selectively electrically couple the active sensor to the second current source; providing a third switch configured to selectively electrically couple the second reference sensor to the first current source; and providing a fourth switch configured to selectively electrically couple the second active sensor to the second current source.

In some aspects of each of the above methods of manufacturing, the method of manufacturing further includes providing a CDS circuit configured to remove an offset.

In some aspects of each of the above methods of manufacturing, the readout element is configured to generate a voltage proportional to an impedance difference between the reference sensor and the active sensor.

In some aspects of each of the above methods of manufacturing, the method of manufacturing further includes: providing an op amp; and electrically coupling an output of an op amp to the second terminal of the reference sensor.

In some aspects of each of the above methods of manufacturing, the method of manufacturing further includes: providing a feedback element; and electrically coupling the feedback element to the first and second terminals of the reference sensor.

In some aspects of each of the above methods of manufacturing, the method of manufacturing further includes: providing a third reference sensor including a first terminal and a second terminal; electrically coupling the second terminal of the third reference sensor to the output of the voltage driver; providing a third current source configured to output a seventh current reflective of self-heating generated by the third reference sensor, where a value of the second current adjusts in accordance with the seventh current; and electrically coupling the third current source to the first terminal of the third reference sensor.

In some aspects of each of the above methods of manufacturing, the method of manufacturing further includes providing an ADC configured to sample the change of the current from the first terminal to the input of the readout element.

In some aspects of each of the above methods of manufacturing, the first current source and the second current source are configured to output an equal magnitude of current in a same direction relative to the respective first terminals.

In some aspects of each of the above methods of manufacturing, the readout element includes a CTIA.

In some aspects of each of the above methods of manufacturing, the first current source and the second current source are selected from the group of an athermal voltage source and resistor, a high-impedance athermal transistor current source, and a Wilson current mirror.

In some aspects of each of the above methods of manufacturing, the method of manufacturing further includes: providing an amplifier outputting to the second terminal of the reference sensor; and electrically coupling the first terminal of the reference sensor to a negative input of the amplifier, where the first current source is configured to generate a voltage drop across the negative input and the output.

In some aspects of each of the above methods of manufacturing, the reference sensor is a reference bolometer pixel and the active sensor is a bolometer pixel configured to detect LWIR radiation.

In some aspects of each of the above methods of manufacturing, the readout element includes a Sigma-Delta ADC.

In some aspects of the above method of manufacturing, a first stage of the Sigma-Delta ADC includes a CTIA.

In some aspects of each of the above methods of manufacturing, the reference sensor is shielded from a sensor image.

In some aspects of each of the above methods of manufacturing, the method of manufacturing further includes: providing a voltage follower; and electrically coupling the voltage follower between the output of the voltage driver and the second terminal of the active sensor.

In some aspects of each of the above methods of manufacturing, the method of manufacturing further includes: providing two or more current buffers including a first current buffer and a second current buffer; electrically coupling the first current buffer between the first current source and the reference sensor; and electrically coupling the second current buffer between the second current source and the active sensor.

In one aspect, a sensor circuit includes: a plurality of active sensors exposed to a sensor image and sharing a bias voltage node; a calibration readout element; and a calibration sensor shielded from the sensor image and including a first terminal electrically coupled to the bias voltage node and a second terminal electrically coupled to the calibration readout element.

In some aspects of the above circuit, an impedance of the calibration sensor is the same as an impedance of an active sensor of the plurality of active sensors, and where an electrical carrier count of the calibration sensor is greater than an electrical carrier count of the active sensor.

In some aspects of the above circuits, the sensor circuit further includes: a readout element corresponding to an active sensor of the plurality of active sensors and configured to measure a readout voltage of the active sensor, where the calibration readout element is configured to measure a readout voltage of the calibration sensor, and the sensor circuit is electrically coupled to: a processor; and a memory including instructions, which when executed by the processor, cause the processor to perform a method that includes: receiving the readout voltage of the active sensor; receiving the readout voltage of the calibration sensor; and computing a difference between (1) the readout voltage of the active sensor and (2) the readout voltage of the calibration sensor weighted by a ratio between an impedance of the calibration sensor and an impedance of the active sensor.

In some aspects of the above circuits, the ratio is one.

In some aspects of the above circuits, the ratio is temperature independent.

In some aspects of the above circuits, the sensor circuit further includes: a readout element corresponding to an active sensor of the plurality of active sensors and configured to measure a readout voltage of the active sensor, where the sensor circuit is electrically coupled to: a processor; and a memory including instructions, which when executed by the processor, cause the one or more processors to perform a method that includes: receiving a first readout voltage corresponding to a closed shutter; receiving a second readout voltage corresponding to an opened shutter; and computing a difference proportional to an impedance difference of the active sensor caused by the sensor image between (1) the first readout voltage and (2) the second readout voltage.

In some aspects of the above circuits, the plurality of readout elements includes a plurality of ADCs.

In some aspects of the above circuits, the calibration sensor and the plurality of active sensors are made from materials having a same thermal coefficient of resistance (TCR).

In some aspects of the above circuits, the plurality of active sensors includes a plurality of columns of active sensors, the circuit further includes: a plurality of current sources, where a current source of the plurality of current sources is electrically coupled to the second terminal of the calibration sensor and the calibration readout element; and a plurality of readout elements, where each of the plurality of columns of active sensors is electrically coupled to: a corresponding current source of the plurality of current sources at a corresponding readout node, and a corresponding readout element of the plurality of readout elements at the corresponding readout node.

In some aspects of the above circuits, the calibration readout element includes an analog-to-digital converter (ADC).

In some aspects of the above circuits, the plurality of active sensors and the calibration sensor are bolometers, and the sensor image is a thermal image.

In another aspect, a sensor circuit includes: a calibration current source providing a calibration current; an active sensor; a readout element; a first switch configured to selectively electrically couple the active sensor to the readout element; and a second switch configured to selectively electrically couple the calibration current source to the readout element.

In some aspects of the above circuits, the second switch is configured to electrically uncouple the calibration current source from the first readout element when the first switch electrically couples the active sensor to the readout element, and the first switch is configured to electrically uncouple the active sensor from the first readout element when the second switch electrically couples the calibration current to the readout element, and the sensor circuit is electrically coupled to: a processor; and a memory including instructions, which when executed by the processor, cause the processor to perform a method including: receiving a first readout voltage of the active sensor; receiving a second readout voltage caused by the calibration current; and computing an output proportional to a readout current of the active sensor based on (1) the first readout voltage and (2) the second readout voltage.

In some aspects of the above circuits, the sensor circuit further includes: a plurality of active sensors including the active sensor; and a plurality of readout elements including the first and second readout elements, each of the plurality of readout elements electrically coupled to a respective active sensor of the plurality of active sensors, where the method further includes: receiving, from a readout element of the plurality of readout elements, a first readout voltage of the respective active sensor; receiving a second readout voltage caused by the calibration current on a respective readout element; and computing a respective output proportional to a readout current of the respective active sensor based on (1) the readout voltage of the respective sensor and (2) the second readout voltage caused by the calibration current on the respective readout element.

In some aspects of the above circuits, the sensor circuit further includes a second active sensor belonging to a same column as the first active sensor, where the method further includes, after computing the first output: receiving a third readout voltage of the second active sensor; and computing a second output proportional to a readout current of the fourth active sensor based on (1) the third readout voltage and (2) the second readout voltage caused by the calibration current.

In some aspects of the above circuits, a time between successive receipts of the second readout voltage on the same column caused by the calibration current is a calibration period.

In some aspects of the above circuits, the calibration period is one second.

In some aspects of the above circuits, the calibration period is based on a drift of the readout element.

In some aspects of the above circuits, different rows are readout during the successive receipts of the second readout voltage.

In some aspects of the above circuits, the sensor circuit further includes: a second calibration current source; a third switch configured to selectively electrically couple the first calibration current source to the readout element; and a fourth switch configured to selectively electrically couple the second calibration current source to the readout element, and where when the third switch electrically uncouples the readout element from the first calibration current source: the fourth switch is configured to electrically couple the readout element to the second calibration current source, and the method further includes receiving a third readout voltage caused by the second calibration current; and the output is further based on the third readout voltage caused by the second calibration current.

In some aspects of the above circuits, the readout element includes an ADC.

In some aspects of the above circuits, the sensor circuit is electrically coupled to: a processor; and a memory including instructions, which when executed by the processor, cause the one or more processors to perform a method that includes: receiving a first readout voltage corresponding to a closed shutter; receiving a second readout voltage corresponding to an opened shutter; and computing a difference proportional to an impedance difference of the first active sensor caused by a sensor image between (1) the first readout voltage and (2) the second readout voltage.

In some aspects of the above circuits, the active sensor is a bolometer exposed to a thermal scene.

In some aspects of the above circuits, the active sensor is exposed to a sensor image and shares a bias voltage node with a plurality of active sensors, and the sensor circuit further includes: a second readout element; and a calibration sensor shielded from the sensor image and including a first terminal electrically coupled to the bias voltage node and a second terminal electrically coupled to the second readout element.

In another aspect, a method of calculating a calibrated voltage in a sensor circuit includes: electrically coupling a first terminal of a calibration sensor to a bias voltage node shared by a plurality of active sensors; electrically coupling a second terminal of the calibration sensor to a calibration readout element; exposing the plurality of active sensors to a sensor image; shielding the calibration sensor from the sensor image; measuring, with a readout element, a readout voltage of an active sensor of the plurality of active sensors; measuring, with the calibration readout element, a readout voltage of the calibration sensor; and computing the calibrated voltage as a difference between (1) the readout voltage of the active sensor and (2) the readout voltage of the calibration sensor weighted by a ratio between an impedance of the calibration sensor and an impedance of the active sensor.

In some aspects of the above circuit, the impedance of the calibration sensor is the same as the impedance of the active sensor, and where an electrical carrier count of the calibration sensor is greater than an electrical carrier count of the active sensor.

In some aspects of the above circuits, the ratio is one.

In some aspects of the above circuits, the ratio is temperature independent.

In some aspects of the above circuits, the calibration sensor and the active sensor are made from materials having a same TCR.

In some aspects of the above circuits, the method further includes: electrically coupling a current source of a plurality of current sources to the second terminal of the calibration sensor and to the calibration readout element; electrically coupling a column of a plurality of columns of active sensors to the readout element, the column of active sensors including the active sensor; and electrically coupling a second current source of the plurality of current sources to the readout element.

In some aspects of the above circuits, the method further includes: closing a shutter; measuring, with the readout element, a first readout voltage corresponding to the closed shutter; and measuring, with the calibration readout element, a second readout voltage corresponding to the closed shutter; and after computing the calibrated voltage, computing a second difference between (1) the calibrated voltage and a difference between (2a) the first readout voltage and (2b) the second readout voltage weighted by the ratio, where the second difference is a shutter calibrated voltage.

In some aspects of the above circuits, the calibration readout element includes an ADC.

In some aspects of the above circuits, the readout element includes an ADC.

In some aspects of the above circuits, the plurality of active sensors and the calibration sensor are bolometers, and the sensor image is a thermal image.

Some aspects include a method of manufacturing the above circuits.

In another aspect, a method of calculating an output in a sensor circuit includes: electrically coupling a readout element to an active sensor; measuring, with the readout element, a first readout voltage of the active sensor; electrically uncoupling the readout element from the active sensor; electrically coupling a calibration current to the readout element; measuring, with the readout element, a second readout voltage caused by the calibration current; and computing the output based on (1) the first readout voltage and (2) the second readout voltage, the output proportional to a readout current of the active sensor.

In some aspects of the above method, the method further includes: electrically coupling a respective active sensor of a plurality of active sensors to a readout element of a plurality of readout elements; measuring, with the respective readout element, a first readout voltage of the respective active sensor; electrically uncoupling the respective readout element from the respective active sensor; electrically coupling the calibration current to the respective readout element; measuring, with the respective readout element, a second readout voltage caused by the calibration current on the respective readout element; and computing an output proportional to a readout current of the respective active sensor based on (1) the first readout voltage of the respective active sensor and (2) the second readout voltage caused by the calibration current.

In some aspects of the above methods, the method further includes, after computing the first output: electrically uncoupling the calibration current source from the readout element; electrically coupling the readout element to a second active sensor, the second active sensor belonging to a same column as the first active sensor; measuring, with the readout element, a third readout voltage of the second active sensor; and computing a second output proportional to a readout current of the second active sensor based on (1) the third readout voltage and (2) the second readout voltage caused by the calibration current.

In some aspects of the above methods, a time between successive measurements of the second readout voltage on the same column caused by the calibration current is a calibration period.

In some aspects of the above methods, the calibration period is one second.

In some aspects of the above methods, the calibration period is based on a drift of the readout element.

In some aspects of the above methods, different rows are readout during the successive measurements of the second readout voltage.

In some aspects of the above methods, the method further includes: electrically uncoupling the readout element from the first calibration current source; electrically coupling the readout element to a second calibration current source; and measuring, with the readout element, a third readout voltage caused by the second calibration current on the readout element, where the output is further based on the third readout voltage caused by the second calibration current.

In some aspects of the above methods, the readout element includes an ADC.

In some aspects of the above methods, the method further includes: closing a shutter; computing the output corresponding to a closed shutter; and computing a difference proportional to an impedance difference of the active sensor caused by a sensor image between (1) the output corresponding to an opened shutter and (2) the output corresponding to the closed shutter.

In some aspects of the above methods, the active sensor is a bolometer exposed to a thermal scene.

In some aspects of the above methods, the method further includes: electrically uncoupling the readout element from the calibration current source; electrically coupling a second readout element to the calibration current source; measuring, with the second readout element, a third readout voltage caused by the calibration current; electrically uncoupling the second readout element from the calibration current source; electrically coupling a first terminal of a calibration sensor to a bias voltage node shared by a plurality of active sensors and the active sensor; electrically coupling a second terminal of the calibration sensor to the second readout element; exposing the plurality of active sensors and the active sensor to a sensor image; shielding the calibration sensor from the sensor image; measuring, with the second readout element, a fourth readout voltage of the calibration sensor; computing a second output based on the third readout voltage and the fourth readout voltage; and computing a difference between (1) the first output and (2) the second output weighted by a ratio between an impedance of the calibration sensor and an impedance of the active sensor.

In one aspect, a sensor circuit, includes: a plurality of sensor pixels, each configured to store a charge; a Sigma-Delta ADC configured to receive the charge of each sensor; and a plurality of switches configured to sequentially couple each of the plurality of sensor pixels to the Sigma-Delta ADC, each switch corresponding to a respective one of the plurality of sensor pixels.

In some aspects of the above circuit, the sensor circuit does not include a CTIA electrically positioned between the plurality of sensor pixels and the Sigma-Delta ADC.

In some aspects of the above circuits, the sensor circuit further includes a variable resistor electrically positioned between the plurality of sensors and the Sigma-Delta ADC, wherein the plurality of switches are configured to sequentially couple each of the plurality of sensor pixels to the variable resistor.

In some aspects of the above circuits, the variable resistor has a linearly decreasing resistance during a discharge time window; the variable resistor is at a lowest resistance at an end of the discharge time window; and the variable resistor has a resistance higher than the lowest resistance between the beginning and the end of the discharge time window.

In some aspects of the above circuits, the variable resistor is a MOS transistor; and the initial resistance, the linearly decreasing resistance, and the lowest resistance of the MOS transistor are controlled with a control voltage electrically coupled to the MOS transistor.

In some aspects of the above circuits, the discharge time window is between 10 microseconds and 1 millisecond.

In some aspects of the above circuits, during the first discharge time window, a first switch electrically couples a first sensor pixel and the Sigma-Delta ADC; during a second discharge time window, a second switch electrically couples a second sensor pixel and the Sigma-Delta ADC; and the first and second discharge time windows correspond to readout times of the first and second sensor pixels.

In some aspects of the above circuits, during the discharge time window, a constant current of the variable resistor is an initial voltage of the variable resistor divided by the initial resistance.

In some aspects of the above circuits, a switch electrically couples a respective sensor pixel and the variable resistor during a respective discharge time window, the discharge time window equal to a capacitance of the sensor pixel multiplied by an initial resistance of the variable resistor.

In some aspects of the above circuits, the variable resistor includes a weighted bank of resistors; the weighted bank of resistors include a plurality of resistors selectively electrically coupled in parallel or in series; and resistances of combinations of the selective electrically coupled resistors include an initial resistance at the beginning of a discharge time window, a linearly decreasing resistance, and a lowest resistance.

In some aspects of the above circuits, a sensor pixel includes an x-ray sensor photodiode and the charge is indicative of the x-ray sensor photodiode's exposure to x-ray.

In some aspects of the above circuits, a sensor pixel includes a storage capacitor storing the charge and the sensor pixel's exposure to x-ray generates the charge stored in the storage capacitor.

In some aspects of the above circuits, the sensor circuit further includes a second plurality of sensor pixels and a second Sigma-Delta ADC, wherein the second plurality of sensor pixels are configured to sequentially couple to the second Sigma-Delta ADC and the first and second pluralities of sensor pixels belong to a same column.

In some aspects of the above circuits, numbers of the first and second plurality of sensor pixels are equal.

In some aspects of the above circuits, at a first row time, a first sensor pixel of the first plurality of sensor pixels and a second sensor pixel of the second plurality of sensor pixels are simultaneously readout.

In some aspects of the above circuits, an input current to the Sigma-Delta ADC is constant.

In some aspects of the above circuits, the sensor circuit further includes a digital filter configured to receive a signal from the Sigma-Delta ADC.

Some aspects include a method of manufacturing the above circuits.

In one aspect, a sensor circuit includes a plurality of sensor pixels, a Sigma-Delta ADC, and a plurality of switches, each switch corresponding to a respective one of the plurality of sensor pixels; a method of readout of the sensor circuit includes: storing respective charges in each of the plurality of sensor pixels; sequentially electrically coupling, using the plurality of switches, each of the plurality of sensor pixels to the Sigma-Delta ADC; and sequentially receiving, at the Sigma-Delta ADC, the respective charge of each sensor pixel.

In some aspects of the above method, the sensor circuit does not include a CTIA electrically positioned between the plurality of sensor pixels and the Sigma-Delta ADC and the respective charge of each sensor pixel is not received by the CTIA.

In some aspects of the above methods, the sensor circuit further includes a variable resistor electrically positioned between the plurality of sensor pixels and the Sigma-Delta ADC and the method further includes sequentially electrically coupling, using the plurality of switches, each of the plurality of sensor pixels to the Sigma-Delta ADC further includes sequentially electrically coupling, using the plurality of switches, the each of the plurality of sensor pixels to the variable resistor.

In some aspects of the above methods, the method further includes linearly decreasing a resistance of the variable resistor during a discharge time window, wherein: the variable resistor is at a lowest resistance at an end of the discharge time window; and the variable resistor has a resistance higher than the lowest resistance between the beginning and the end of the discharge time window.

In some aspects of the above methods, the variable resistor is a MOS transistor electrically coupled to a control voltage and linearly decreasing the resistance of the variable resistor further includes driving the MOS transistor with the control voltage to generate the initial resistance, the linearly decreasing resistance, and the lowest resistance.

In some aspects of the above methods, the discharge time window is between 10 microseconds and 1 millisecond.

In some aspects of the above methods, sequentially electrically coupling, using the plurality of switches, each of the plurality of sensor pixels to the Sigma-Delta ADC further includes: during the first discharge time window, electrically coupling a first switch to a first sensor pixel and the Sigma-Delta ADC; during a second discharge time window, electrically coupling a second switch to a second sensor pixel and the Sigma-Delta ADC, wherein the first and second discharge time windows correspond to readout times of the first and second sensor pixels.

In some aspects of the above methods, during the discharge time window, a constant current of the variable resistor is an initial voltage of the variable resistor divided by the initial resistance.

In some aspects of the above methods, sequentially electrically coupling, using the plurality of switches, each of the plurality of sensor pixels to the Sigma-Delta ADC further includes electrically coupling a switch to a respective sensor pixel and the variable resistor during a respective discharge time window; and the discharge time window is equal to a capacitance of the sensor pixel multiplied by an initial resistance of the variable resistor.

In some aspects of the above methods, the variable resistor includes a weighted bank of resistors; the weighted bank of resistors include a plurality of resistors selectively electrically coupled in parallel or in series; and the method further includes linearly decreasing resistances of combinations of the plurality of resistors, from an initial resistance at a beginning of a discharge time window to a lowest resistance at an end of the discharge time window, by selective electrically coupling the resistors.

In some aspects of the above methods, a sensor pixel includes an x-ray sensor photodiode and the charge is indicative of the x-ray sensor photodiode's exposure to x-ray.

In some aspects of the above methods, storing respective charges in each of the plurality of sensor pixels further includes: exposing the each of the plurality of sensor pixels to x-ray and generating the respective charge; and storing the respective charges in a storage capacitor of the each of the plurality of sensor pixels.

In some aspects of the above methods, the sensor circuit further includes a second plurality of sensor pixels belonging to a same column as the first plurality of sensor pixels, a second plurality of switches, and a second Sigma-Delta ADC, the method further includes: sequentially electrically coupling, using the second plurality of switches, each of the plurality of sensor pixels to the second Sigma-Delta ADC; and sequentially receiving, at the second Sigma-Delta ADC, the respective charge of each sensor pixel of the second plurality of sensor pixels.

In some aspects of the above methods, numbers of the first and second plurality of sensor pixels are equal.

In some aspects of the above methods, at a first row time: the first Sigma-Delta ADC receives a first respective charge of a first sensor pixel of the first plurality of sensor pixels;

and the second Sigma-Delta ADC receives a second respective charge of a second sensor pixel of the second plurality of sensor pixels.

In some aspects of the above methods, the Sigma-Delta ADC receives a constant current.

Generally, as used herein, the term "substantially" is used to describe element(s) or quantit(ies) ideally having an exact quality (e.g., fixed, the same, uniformed, equal, similar, proportional), but practically having qualities functionally equivalent to the exact quality. For example, an element or quantity is described as being substantially fixed or uniformed can deviate from the fixed or uniformed value, as long as the deviation is within a tolerance of the system (e.g., accuracy requirements, etc.). As another example, two elements or quantities described as being substantially equal can be approximately equal, as long as the difference is within a tolerance that does not functionally affect a system's operation.

Likewise, although some elements or quantities are described in an absolute sense without the term "substantially", it is understood that these elements and quantities can have qualities that are functionally equivalent to the absolute descriptions. For example, in some embodiments, a ratio is described as being one. However, it is understood that the ratio can be greater or less than one, as long as the ratio is within a tolerance of the system (e.g., accuracy requirements, etc.).

As used herein, "substantially the same" sensors produce a similar response to a given stimulus. For example, "substantially the same" bolometers produce a similar resistance change for a given temperature change.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

We claim:

1. A system, comprising:
   a glass substrate;
   a sensor array comprising a reference sensor and an active sensor, wherein:
   the sensor array is disposed on the glass substrate, and
   the active sensor is configured for exposure to a sensor image; and
   a readout circuit comprising a voltage driver, wherein:
   the readout circuit is electrically coupled to the sensor array,
   the voltage driver is configured to provide a bias voltage via an output of the voltage driver,
   the output of the voltage driver is configured to electrically couple to the reference sensor,
   the bias voltage is generated based on a current through the reference sensor and an impedance of the reference sensor, and
   the active sensor is configured to electrically couple to the output of the voltage driver.

2. The system of claim 1, further comprising a calibration sensor electrically coupled to the output of the voltage driver, wherein an electrical carrier count of the calibration sensor is greater than an electrical carrier count of the active sensor.

3. The system of claim 2, wherein an impedance of the calibration sensor equals an impedance of the active sensor.

4. The system of claim 2, further comprising a second calibrations sensor electrically coupled to the output of the voltage driver.

5. The system of claim 2, wherein a temperature coefficient of resistance (TCR) of a calibration sensor material equals a TCR of an active sensor material.

6. The system of claim 1, wherein:
   the active sensor is associated with a pixel of the sensor image, and
   a readout voltage associated with the pixel is determined based on a difference between a voltage of the active sensor when exposed to the sensor image and a weighted voltage of the calibration sensor.

7. The system of claim 6, wherein the weighted voltage of the calibration sensor is the voltage of the calibration sensor.

8. The system of claim 1, further comprising an adjustable current source configured to electrically couple to the active sensor.

9. The system of claim 8, further comprising a readout element configured to electrically couple to the active sensor, wherein the adjustable current source is configured to adjust a voltage of the active sensor provided to the readout element.

10. The system of claim 1, wherein:
    the active sensor is associated with a pixel of the sensor image, and
    a readout voltage associated with the pixel is determined based on a difference between a voltage of the active sensor at a first condition and a voltage of the active sensor at a second condition.

11. The system of claim 10, further comprising a shutter, wherein:
    the first condition comprises the active sensor being exposed to the sensor image when the shutter is open, and
    the second condition comprises the active sensor not being exposed to the sensor image when the shutter is closed.

12. The system of claim 1, wherein the readout circuit further comprises a Sigma-Delta analog-to-digital converter.

13. The system of claim 1, wherein the readout circuit is electrically coupled to the sensor array via a flex attachment.

14. A method of sensor readout, the method comprising:
    exposing a sensor image to an active sensor of a sensor array,
    wherein the sensor array comprises a reference sensor and the active sensor, and
    wherein the sensor array is disposed on a glass substrate;
    electrically coupling an output of a voltage driver of a readout circuit to the reference sensor, wherein the readout circuit is electrically coupled to the sensor array;

electrically coupling the output of the voltage driver to the active sensor;

generating a bias voltage based on a current through the reference sensor and an impedance of the reference sensor; and providing the bias voltage via the output of the voltage driver.

15. The method of claim 14, further comprising:

electrically coupling a calibration sensor to the output of the voltage driver, wherein an electrical carrier count of the calibration sensor is greater than an electrical carrier count of the active sensor, wherein the active sensor is associated with a pixel of the sensor image; and determining a readout voltage associated with the pixel based on a difference between a voltage of the active sensor when exposed to the sensor image and a weighted voltage of the calibration sensor.

16. The method of claim 14, further comprising:

electrically coupling a readout element to the active sensor; and adjusting, via an adjustable current source, a voltage of the active sensor provided to the readout element.

17. The method of claim 14, further comprising:

determining a readout voltage associated with the pixel based on a difference between a voltage of the active sensor at a first condition and a voltage of the active sensor at a second condition, wherein the active sensor is associated with a pixel of the sensor image.

18. A method of manufacturing a system, comprising:

providing a glass substrate;

providing a sensor array comprising a reference sensor and an active sensor, wherein the active sensor is configured for exposure to a sensor image;

disposing the sensor array on the glass substrate;

providing a readout circuit comprising a voltage driver; and electrically coupling the readout circuit to the sensor array, wherein:

the voltage driver is configured to provide a bias voltage via an output of the voltage driver, the output of the voltage driver is configured to electrically couple to the reference sensor, the bias voltage is generated based on a current through the reference sensor and an impedance of the reference sensor, and the active sensor is configured to electrically couple to the output of the voltage driver.

19. The method of claim 18, wherein the readout circuit further comprises a Sigma-Delta analog-to-digital converter.

20. The method of claim 18, wherein the readout circuit is electrically coupled to the sensor array via a flex attachment.

* * * * *